United States Patent
Hersch et al.

(10) Patent No.: US 7,027,660 B2
(45) Date of Patent: *Apr. 11, 2006

(54) IMAGES INCORPORATING MICROSTRUCTURES

(75) Inventors: Roger David Hersch, Epalinges (CH); Bernard Wittwer, Puidoux (CH); Edouard Forler, Chavannes-près-Renens (CH); Patrick Emmel, Pratteln (CH); Daniel Biemann, Chardonne (CH); Daniel Gorostidi, Ecublens (CH); Dominique Bongard, Billens (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 63 days.

This patent is subject to a terminal disclaimer.

(21) Appl. No.: 10/483,104

(22) PCT Filed: Jul. 5, 2002

(86) PCT No.: PCT/IB02/02686

§ 371 (c)(1),
(2), (4) Date: Oct. 29, 2004

(87) PCT Pub. No.: WO03/006257

PCT Pub. Date: Jan. 23, 2003

(65) Prior Publication Data

US 2005/0052705 A1 Mar. 10, 2005

(30) Foreign Application Priority Data

Jan. 25, 2002 (EP) .................................. 02001158

(51) Int. Cl.
*G06K 9/42* (2006.01)

(52) U.S. Cl. ...................................... 382/257; 382/308

(58) Field of Classification Search ................ 382/293, 382/256–259, 308; 358/3.07, 3.28, 3.13
See application file for complete search history.

(56) References Cited

U.S. PATENT DOCUMENTS

| | | | |
|---|---|---|---|
| 4,557,596 A | 12/1985 | Muller et al. | |
| 4,814,594 A | 3/1989 | Drexler | |
| 5,589,276 A * | 12/1996 | Roth et al. | 427/146 |
| 5,995,638 A * | 11/1999 | Amidror et al. | 382/100 |
| 6,166,751 A | 12/2000 | Yamada | |
| 6,198,545 B1 * | 3/2001 | Ostromoukhov et al. | 358/3.09 |
| 6,473,525 B1 * | 10/2002 | Cheung et al. | 382/199 |
| 6,751,352 B1 * | 6/2004 | Baharav et al. | 382/183 |
| 6,819,775 B1 * | 11/2004 | Amidror et al. | 382/100 |
| 2003/0021437 A1 * | 1/2003 | Hersch et al. | 382/100 |

FOREIGN PATENT DOCUMENTS

| | | |
|---|---|---|
| DE | 100 15 097 A | 10/2001 |
| JP | 03 053972 A | 3/1991 |

\* cited by examiner

*Primary Examiner*—Joseph Mancuso
*Assistant Examiner*—Dennis Rosario
(74) *Attorney, Agent, or Firm*—Clifford W. Browning; Woodard, Emhardt, Moriarty, McNett & Henry LLP Patent and Trademark Attorneys

(57) ABSTRACT

A method of generating an image incorporating a microstructure includes the steps of obtaining an original image, generating a microstructure, and rendering a region or the whole said original image with said microstructure. The operation of generating the microstructure includes an automatic synthesis of microstructure elements from original microstructure shapes.

32 Claims, 44 Drawing Sheets

FIG. 2

Warping grid

Mask

Dithered image

R: Red    C: Cyan    W: White
G: Green    M: Magenta    K: Black
B: Blue    Y: Yellow

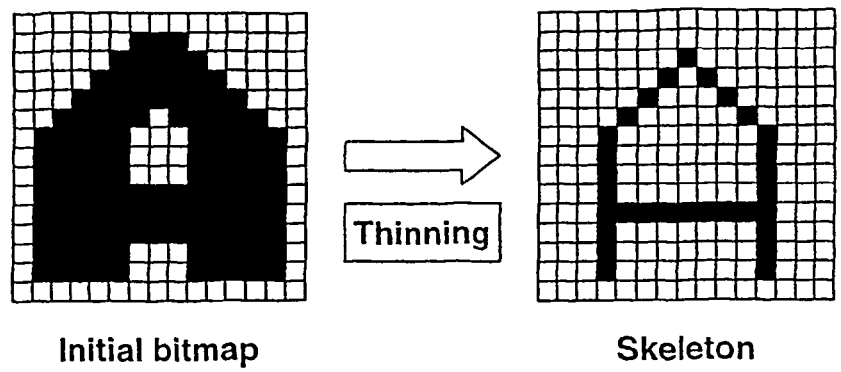
Initial bitmap     Skeleton
FIG. 18A     FIG. 18B
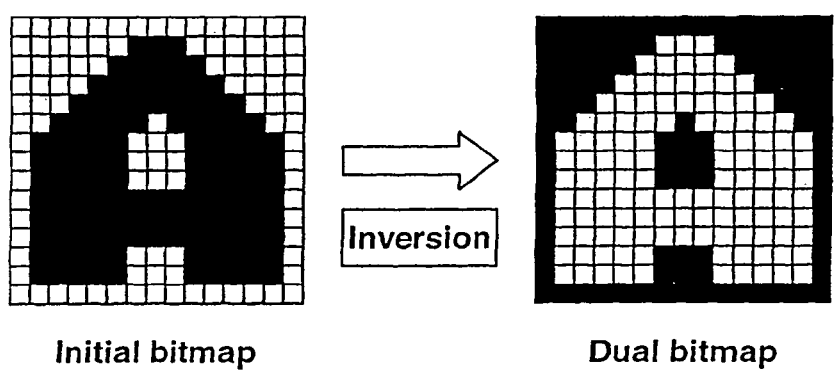
Initial bitmap     Dual bitmap
FIG. 19A     FIG. 19B
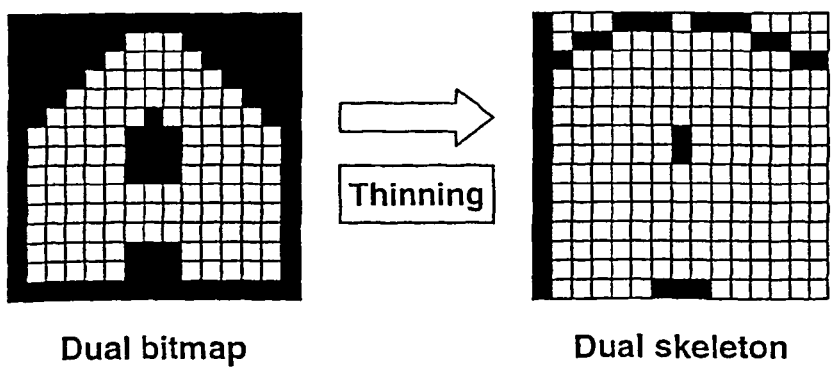
Dual bitmap     Dual skeleton
FIG. 20A     FIG. 20B

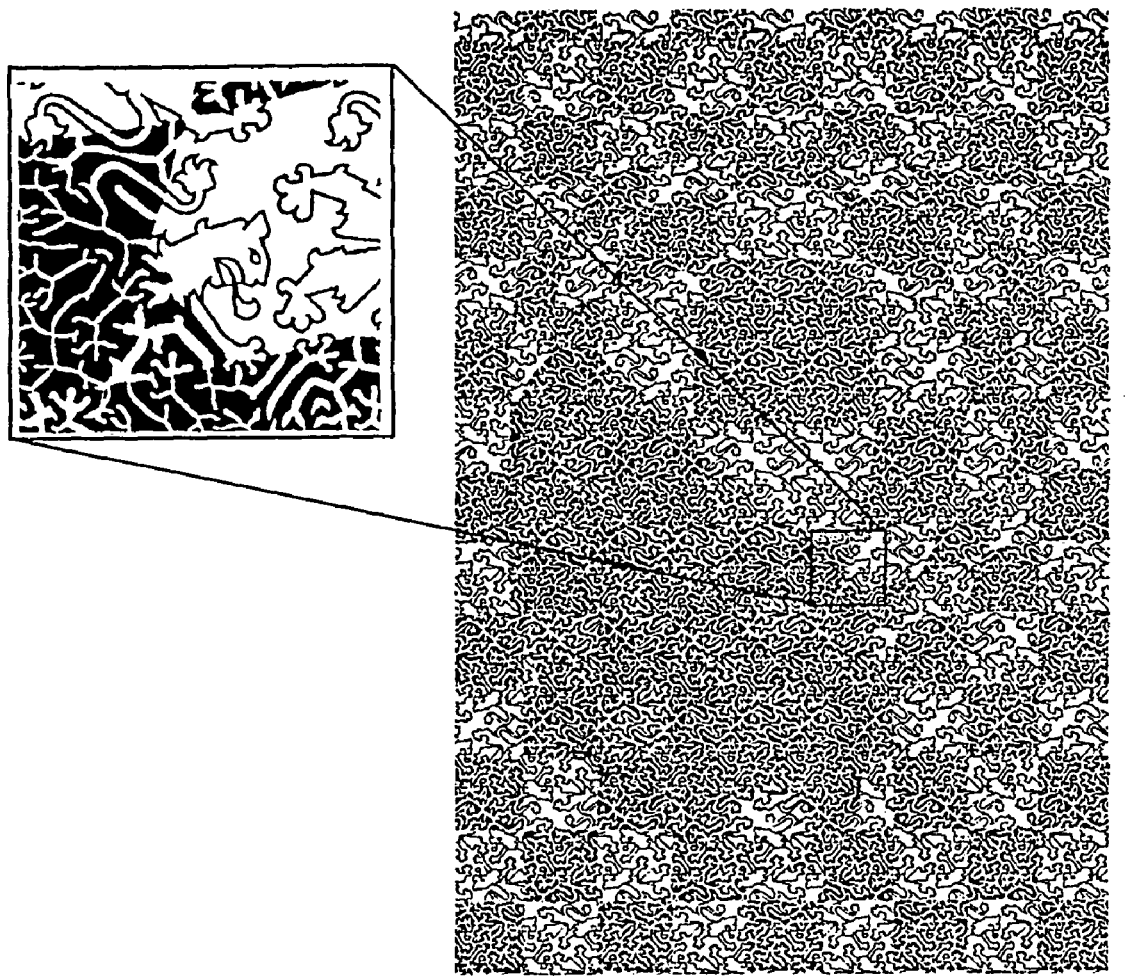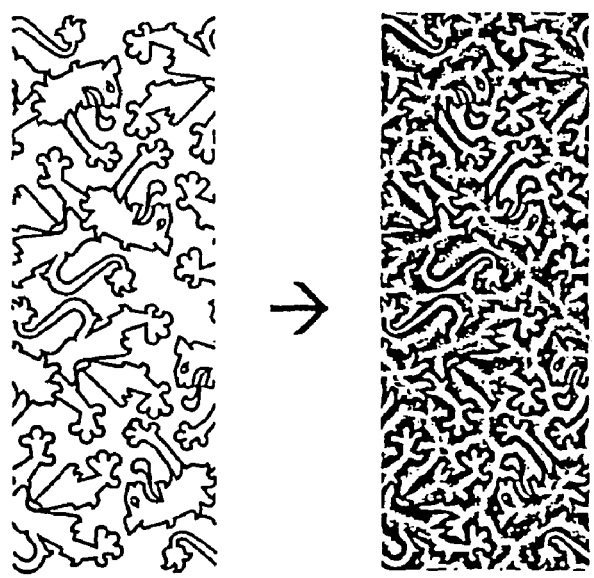
FIG. 31

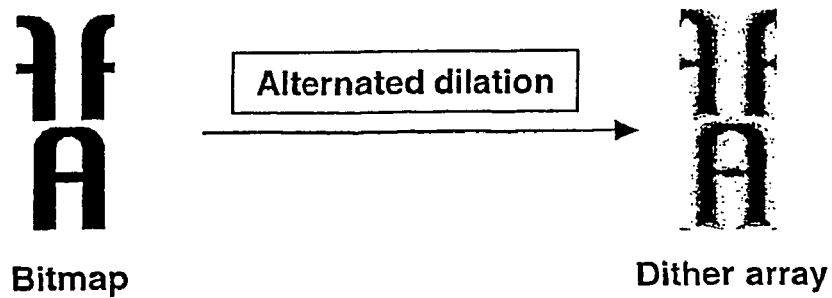
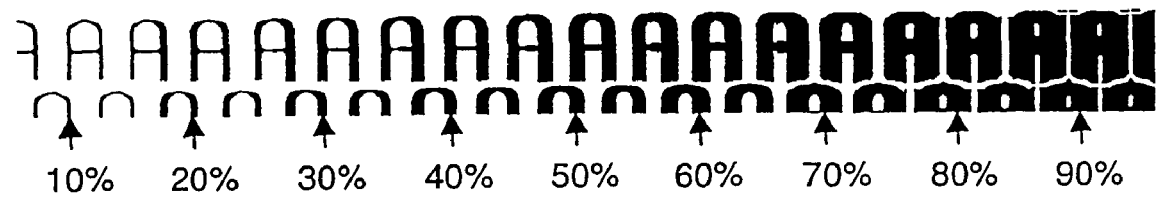
FIG. 33A
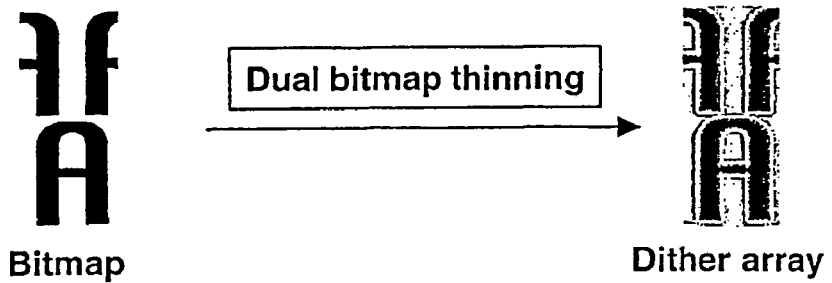
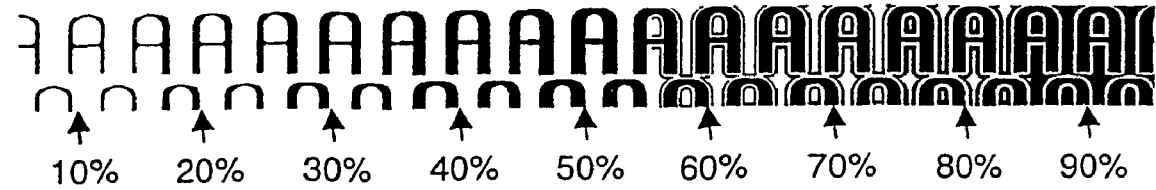
FIG. 33B

IMAGES INCORPORATING MICROSTRUCTURES

BACKGROUND OF THE INVENTION

The present invention relates generally to images incorporating information both at the global level and at the microstructure level and to a method of generating such images. The information at the microstructure level offers, in particular, protection against counterfeiting and may be used as a security feature in documents. The invention also relates to documents comprising security features, and to a method of generating such documents, which may include for example, value bearing commercial instruments, certificates, coupons and personal identification instruments.

The term 'images' used herein shall be understood in the broad sense to mean any visual representation of matter that may be printed or displayed on a display, for example text, pictures, photographs, drawings and so on.

A microstructure may comprise microstructure elements such as a text, a logo, an ornament, a symbol or any other microstructure shape. When seen from a certain distance, mainly the global image is visible. When seen from nearby, mainly the microstructure is visible. At intermediate distances, both the microstructure and the global image are visible.

Several attempts have already been made in the prior art to generate images incorporating information at the microstructure level, where from far away mainly the global image is visible and from nearby mainly the microstructure is visible. A prior art method hereinafter called "Artistic Screening" was disclosed in U.S. Pat. No. 6,198,545 and in the article by V. Ostromoukhov, R. D. Hersch, "Artistic Screening", Siggraph95, Computer Graphics Proceedings, Annual Conference Series, 1995, pp. 219–228. This method requires however significant efforts by graphic designers in order to create the microstructure and is limited to bi-level images, i.e. images in black-white or a single color and white.

A prior art method for incorporating a microstructure into an image by computing color differences is disclosed in European Patent application 99 114 740.6. This method does not modify the thickness of the microstructure according to the local intensity of the image.

Another method hereinafter called "Multicolor Dithering" is disclosed in the article by V. Ostromoukhov, R. D. Hersch, "Multi-Color and Artistic Dithering", Siggraph'99, Computer Graphics Proceedings, Annual Conference Series, 1999, pp. 425–432. The method allows to synthesize color images incorporating as screen dots a fine microstructure capable of representing various shapes such as characters, logos, and symbols and provides therefore strong anti-counterfeiting features. The publication also presents an iterative technique for equilibrating a dither array, which is however slow and cumbersome and does not always converge to yield a satisfying result. A disadvantage of the aforementioned and other known methods is the significant effort required to synthesize dither matrices incorporating the desired microstructure shapes. These efforts require the skills of a computer scientist for building 3D functions, discretizing them, renumbering the resulting dither values and applying to them an equilibration process.

An additional method for creating microstructures within an image relies on a large dither matrix whose successive threshold levels represent the microstructure and uses standard dithering to render the final image (see Oleg Veryovka and John Buchanan, Halftoning with Image-Based Dither Screens, Graphics Interface Proceedings, years 1988–1999, Ed. Scott MacKenzie and James Stewart, Morgan Kaufmann Publ. In this paper, the authors show how to build a dither matrix from an arbitrary grayscale texture or grayscale image. They mainly apply histogram equilibration to ensure a uniform distribution of dither threshold levels. Texture control is obtained by error-diffusion. However, while their method allows to incorporate text within the microstructure, the typographic character shapes do not vary according to intensity, i.e. the character shapes do not become thin or fat depending on the local intensity. Their method is restricted to black-white or single color target images. The authors do not provide a method to construct a dither matrix starting from a bi-level bitmap incorporating the microstructure shapes.

A further method of embedding a microstructure within an image is described in provisional U.S. patent application No. 60/312,170 (filed Aug. 14, 2001, inventor Huver Hu, which teaches how to transform a grayscale seed image or a bi-level seed image into an array of dot ranking values (similar to a dither matrix) to be used by a PostScript Interpreter for synthesizing the final image incorporating the microstructure. This method is however limited to black-white or to single color output images (bi-level images). In addition, the seed image is preferably a grayscale image (FIG. 10 of patent application No. 60/312,170). With bi-level seed images, the generated microstructure is limited to rather simple shapes (FIG. 13 of patent application No. 60/312,170), since shapes grow at increasing darkness levels from a user specified growth center to the shape given by the bi-level seed image. The shape does not grow beyond 60% darkness: darker levels are produced by the growth of a separate superimposed geometric mask (e.g. a triangle, visible on all dark parts of the wedges in FIGS. 2, 12 and 13 of patent application No. 60/312,170). Furthermore, a manual interactive intervention is required to transform a seed image into an array of dot ranking values.

Another approach for embedding information within a color image relies on the modification of brightness levels at locations specified by a mask representing the information to embed, while preserving the chromaticity of the image (see U.S. Pat. No. 5,530,759). However, since the embedded information is not really used to construct the global image, it cannot be considered a microstructure. If the embedded information incorporates large uniform surfaces, the global image may be subject to significant changes and the embedded information may become visible from a large distance. In addition, the mask is fixed, i.e. its shape does not vary as a function of the local intensity or color.

One further related invention disclosed in U.S. Pat. No. 5,995,638 teaches a method for authenticating documents comprising a basic screen made of microstructures and a revealing screen for creating moire intensity profiles of verifiable shapes. U.S. patent 6,819,775 describes a similar method, where however the basic screen and the revealing screen may undergo geometric transformations, yielding screens of varying frequencies.

The incorporation of microstructures in images has applications not only in the field of generation of artistic images, but also in the field of generation of documents that require protection against counterfeiting. It is known to incorporate microstructures as a security feature in certain printed commercial instruments, such as bank notes, using professional printers and printing techniques on special substrates.

A primary consideration in the generation of printed commercial instruments, such as bank notes, vouchers, transportation tickets, entertainment event tickets and other tickets, coupons or receipts bearing or representing a commercial value, is to provide sufficient safeguards against forgery. The required degree of difficulty in producing a forgery will depend above all on the value, the duration of validity and the generality of the commercial instrument. For example, bank notes which are not related to any specific event and remain valid for many years, require security features that are extremely difficult to reproduce. On the other hand, tickets of relatively limited duration, for example transportation tickets, such as train tickets valid on a certain day for a certain destination, or theatre tickets for a specific show, require lower level security features, as long as they ensure that the instrument is difficult to reproduce in the remaining time to the event or requires excessive technical means or human effort in comparison to the value of the commercial instrument.

Verification of the authenticity of many commercial instruments is often based on a visual control. Although it is easy to provide commercial instruments with unique security features, such as encrypted bar codes or other codes, their verification entails the use of electronic processing means that are unpractical or inefficient in many situations.

In commercial instruments relying primarily on a visual control of authenticity, a common security feature is the provision of special substrates that are difficult or too costly to reproduce for a potential forger in relation to the underlying value of the commercial instrument. A disadvantage of the use of special substrates or special printing techniques is that they do not allow the generation of commercial instruments at sites that are not under the issuer's control, whether directly or indirectly.

In view of the wide-spread use of communications networks, such as the internet or local area networks, there is a demand for enabling the generation of visually verifiable printed commercial instruments, such as transportation tickets and entertainment event tickets, at the buyer's site, for example at home with a PC and standard printer.

In international patent application WO 00/67192, a method of generating a commercial instrument with certain visually verifiable security features for printing on a standard printer is described. In the aforementioned application, data relevant to the commercial instrument are manipulated in accordance with predetermined rules to generate a pattern which is visually recognizable to an informed person. The security against forgery of an instrument generated according to the latter method relies on the potential forger's ignorance of the predetermined rules.

Reliance on predetermined rules has a number of disadvantages. Firstly, the rules must be communicated to persons responsible for controlling authenticity, which becomes impractical where many controllers are involved. Secondly, the rules must result in features that are visually recognizable, with the consequence that a potential forger could, on the basis of a number of commercial instruments, be able to deduce the rules with a sufficient degree of approximation to generate forgeries using different data. In this regard, it should be noted that the relatively sophisticated image creation and editing software widely available and for use on PC provide the forger with fairly powerful tools to reproduce images and text manipulated in order to emulate visually recognizable patterns provided on authentic commercial instruments on the basis of predetermined rules as described in international application WO 00/67192.

SUMMARY OF THE INVENTION

An object of this invention is to provide images incorporating a microstructure that may be generated efficiently.

Another object of this invention for certain applications is to provide images that are difficult to counterfeit, in particular for use in documents as a security feature.

It is advantageous in certain applications to provide images incorporating a microstructure that may be rapidly generated.

It is advantageous in certain applications to provide images incorporating a microstructure that have a high resolution or a high visual quality.

It is advantageous in certain applications to provide images incorporating a microstructure, that can be animated.

It is also an object of this invention to provide a method of generating such images, and a method of generating documents comprising such images. It is also an object of this invention to provide a computer system to generate such images.

Another object of this invention is to provide a security document, such as a commercial instrument or certificate, and a method of generation thereof, that is difficult to forge yet enables visual verification of the authenticity thereof, and that can be printed with non-professional printing systems, such as standard PC printers, or displayed on an electronic display.

It is advantageous to provide a security document with security features that are easy to verify visually by a verifying person, without the need for providing such person with restricted information on hidden or coded security features or other information unavailable to uninformed persons.

It is advantageous to provide a method for generating security documents that is able to generate personal and/or event specific instruments rapidly, for example comprising information relating to a specific person, destination or event.

It is further advantageous to provide a method that enables the printing, or downloading for display on a portable device screen, of secure commercial instruments by a customer with access to data processing and database means through a communications network such as the internet.

Objects of this invention have been achieved by providing a method of generating an image incorporating a microstructure according to claim 1.

Disclosed herein is a method of generating an image incorporating a microstructure, including obtaining an original image;

generating a microstructure; and rendering a region or the whole said original image with said microstructure;

wherein the operation of generating the microstructure includes an automatic synthesis of microstructure elements from original microstructure shapes. The microstructure shapes are in an embodiment described originally in the form of a bi-level bitmap. The automatic synthesis from bitmaps enables very efficient creation of images on the fly, which may incorporate different microstructure shapes, for example based on information specific to the content of a document in which the image is used. In addition, thanks to a parametrized transformation carried out at microstructure image rendering time, different instances of the same microstructure image can be rendered on the fly. An important advantage of the presented automatic dither array synthesis method is its ability to ensure that the microstructure incorporated into an image or a security document remains visible at nearly all intensity levels (from 10% to 90% darkness in most cases). A high quality and secure image incorporating a microstructure can thus be generated.

Objects of this invention have been achieved by providing a method of generating an image incorporating a microstructure according to claim 3.

Also disclosed herein is a method of generating an image incorporating a microstructure, including obtaining an original image;

generating a microstructure; and rendering said original image with said microstructure;

wherein the microstructure includes a low frequency microstructure generated from low frequency microstructure elements, and a high frequency microstructure generated from high frequency microstructure elements, whereby the low frequency microstructure elements are larger than the high frequency microstructure elements. The two levels of microstructure advantageously provides an image that is very difficult to forge. It is also possible to have further levels of microstructure incorporated in the image.

The microstructure may be composed of text, graphic elements and symbols. The microstructure whose shapes vary according to intensity and color protects the security document's elements such as text, photographs, graphics, images, and possibly a background motif. Since the security document is built on top of the microstructure, document elements and microstructure elements cannot be erased or modified without introducing discontinuities in the security document. Furthermore, thanks to transformations having the effect of warping the microstructure into different orientations and sizes across the security document, individual microstructure elements cannot be simply copied and inserted elsewhere.

The present disclosure also teaches how to equilibrate an image incorporating a microstructure (hereinafter also called: "microstructure image") or a security document with the help of a high-frequency dither array. This high-frequency dither array may incorporate a second level microstructure providing an additional level of protection.

Further disclosed herein are microstructure images and security documents with a microstructure rendered in black/white, color, or possibly rendered partly with non-standard inks, or special inks such as fluorescent inks, phosphorescent inks, metallic inks, iridescent inks or ultra-violet inks. A mask whose shape expresses a visual message (e.g. a bold text string or a symbol) may specify the part of the target document to be rendered with a special ink. Under given observation conditions (e.g. type of light, viewing angle), the special ink is hidden. Under other observation conditions, the special ink has the effect of making the mask shape (e.g. the text or symbol) clearly visible. For example at a certain viewing angle, the part covered by the special ink is hidden and when seen from another angle, it becomes apparent.

Further disclosed herein is an animated microstructure image formed by a microstructure evolving over time, where from far away mainly the image is visible and from nearby mainly the evolving microstructure is visible. Such an animated microstructure image is displayed as a succession of image instances, each image instance differing from previous image instances by the microstructure-evolution. This microstructure evolution is determined by a parametrized transformation, whose parameters change smoothly as a function of time.

Further disclosed herein is a method allowing to combine an original image, respectively a conventionally halftoned original image with a microstructure image, thereby providing within the target image more or less weight to the microstructure. This allows to create target images, where thanks to a multi-valued mask, the relative weight of the microstructure may at certain places, slowly reduce and disappear. In the case of an animated microstructure image, the mask specifies the part of the image to be rendered with an animated microstructure and the part which is being left without microstructure. With a multi-valued mask, the appearance of the microstructure can be tuned to be strong or on the contrary at the limit of what can be perceived by a human eye at a normal observation distance. In addition, mask values evolving over time yield apparent changes in the embedded microstructure appearance properties such as the visibility, location or spatial extension of the embedded microstructure within the image.

In a preferred embodiment, original microstructure shapes are embedded within a bilevel bitmap, and the microstructure is embodied by a dither array. Starting from the bitmap incorporating the microstructure shapes, the dither array can be automatically generated. A black-white or color target image (or security document) is synthesized by dithering an original image with the dither array and by possibly equilibrating the resulting dithered original image.

Also disclosed herein is a computing system for synthesizing security documents comprising a an interface operable for receiving a request for synthesizing a security document, a software preparation module operable for preparing data files from document information and a document production module operable for producing the security document. The preparation of data files may comprise the generation of an original document image, of microstructure shapes and possibly of transformation parameters. Producing the security document system comprises the synthesis of a microstructure and the synthesis of the security document with that microstructure.

Further disclosed herein is a computing system for synthesizing images comprising an interface operable for receiving a request for synthesizing a microstructure image and comprising a software production module operable for producing the microstructure image. The request comprises an original image and microstructure shapes. The microstructure image is produced by the production module by first synthesizing a microstructure and then by synthesizing the microstructure image incorporating that microstructure.

Further disclosed herein is a computing system capable of displaying a target image with an embedded microstructure evolving over time, where from far away mainly the image is visible and from nearby mainly the evolving microstructure is visible. The computing system comprises a server computing system and a client computing and display system. The client computing and display system receives from the server computing system as input data an original color image, microstructure data and microstructure evolution parameters. The client computing and display system synthesizes and displays the target image with the embedded microstructure on the fly.

Other objects of this invention have been achieved by providing a method of generating a security document according to claim 34 or 35.

Disclosed herein is a method of generating a security document for printing or display, including the steps of:

selecting, retrieving or composing an original image;

selecting or retrieving information specific to a person, an event or transaction to which said security document relates;

generating a microstructure comprising readable microstructure elements providing information on said person, event or transaction;

rendering said original image with said microstructure image.

The microstructure may advantageously be generated as a dither matrix, automatically synthesized from microstructure shapes such as bitmap elements.

The microstructure may be rendered with the image by rendering methods described above or by a halftoning process, whereby the pixels of the dither matrix are compared with the pixels of the background image and, for example, if the pixel of the background image has a grey level greater than the inverse grey level of the dither matrix, then the pixel is printed as white, otherwise it is printed as black. The rendering of the microstructure and image may further comprise a step of balancing the halftoned image.

Advantageously, in view of the rendering process, the event or transaction specific information is extremely difficult to separate out of the background or original image and is therefore difficult to replace with other information in view of producing forgeries. The microstructure dither matrix may advantageously comprise letters and/or numbers, such that the event or transaction specific information may be provided in the form of words or numbers. This enables information, such as the date, the price, the destination, the seat number, personal identification, credit card number, ticket transaction number or any other information specific to the event or transaction to form part of the microstructure image. The microstructure dither matrix may also comprise other characters, graphical elements, logos and other special designs.

The original image may advantageously comprise a photographic representation or portrait of the customer, in addition to a background image that may be changed from time to time, the images being merged or superposed. The original image may further comprise written ticket transaction information.

Further objects and advantageous aspects of this invention will be apparent from the following detailed description of embodiments of this invention with reference to the accompanying figures, in which:

BRIEF DESCRIPTION OF THE DRAWINGS

FIG. 2 shows uniform intensity patches dithered with the dither matrix of FIG. 1;

FIGS. 18A and 18B show the thinning steps allowing to obtain the skeleton of character A;

FIGS. 19A and 19B show the dual bitmap of discrete character A;

FIGS. 20A and 20B show the thinning steps allowing to obtain the skeleton of the dual bitmap;

FIG. 31 shows the same image dithered only with the low-frequency dither matrix;

FIG. 33A illustrates dither matrix synthesis by alternated dilation and a corresponding dithered gray wedge;

FIG. 33B illustrates dither matrix synthesis by dual erosion and a corresponding dithered gray wedge;

FIG. 52b is a detailed view of part of the image of FIG. 52a; and

DETAILED DESCRIPTION OF THE INVENTION

Figures 1A, 1B:
FIG. 1A shows a dither matrix, where the microstructure is given by the sequence of dither threshold levels, represented in the figure as gray levels.
FIG. 1B shows an enlargement of a part of the dither matrix of FIG. 1A demonstrating how the dither threshold levels define the microstructure.

The present invention discloses security documents and methods for generating them, where the document information (text, photograph, graphics, images, background, hereinafter called "document elements") is formed by microstructures having shapes varying with the intensity of the document elements. In addition, the microstructure itself may comprise valuable information, such as the name of the document holder, the type of the document, its validity or any other information relevant to check the authenticity of the document (for example a code expressing open or hidden document information). The same microstructure may continuously cover several document elements of the same security document. Its continuity makes therefore the replacement of individual document elements by faked elements very difficult to achieve.

The methods described in the present invention can also be used to generate artistic images, graphic designs or posters incorporating at least two layers of information, one at the global level and one at the local level.

Furthermore, since these methods can generate multiple instances of the same global image by simply varying the microstructure according to a parameter dependent transformation, images with different microstructures or images with a microstructure evolving over time can be synthesized, as disclosed in the parent U.S. patent application Ser. No. 09/902,227 (filed Jul. 11, 2001, by R. D. Hersch and B. wittwer, due assignee: EPFL).

In the following description of the invention, documents or document elements to be rendered with microstructures are called "document images" or simply "images". We use the words "document", "document image" and "image" interchangeably. A document, a document image or simply an image are represented, at least partly, as an array of pixels, each pixel having one intensity value (gray) or several intensity values (color, e.g. CMY intensities). A target document incorporating a microstructure, is called "security document", "target image", "microstructure image" or when the context allows it, simply "image". Within a security document, or within a target image, at least part of the security document, respectively of the target image, is formed by a microstructure.

The term "local intensity" is generic and means either one local intensity or several local intensities as is the case with images having multiple channels such as color images. Often we use the term "darkness" instead of intensity when examples printed in black and white are shown. In these cases, the darkness indicates the relative percentage of the printed part, i.e. the black ink. It is equivalent to the term "basic color intensity" which also gives the relative percentage of a corresponding basic color appearing on the support (e.g. a printed basic color).

The term "image" however characterizes not only documents, but also images used for various purposes, such as illustrations, graphics and ornamental patterns reproduced on various media such as paper, displays, or optical media such as holograms, kinegrams, etc . . . . Both input and target images may have a single intensity channel (e.g. black-white or single color) or multiple intensity channels (e.g color images). In addition, target images may incorporate non-standard colors (i.e colors different from cyan, magenta, yellow and black), for example fluorescent inks, ultra-violet inks as well as any other special inks such as metallic or iridescent inks.

In principle, the Artistic Screening method described in the section "Background of the invention" can be applied for generating images incorporating information at the microstructure level. It generates microstructures whose shapes vary according to the local intensity. However, since Artistic Screening is restricted to bi-level images and requires a significant design effort in order to create contours of artistic screen elements at different intensities, the preferred method for synthesizing images with embedded microstructures is based either on standard dithering or on the Multicolor Dithering method cited above.

Figure 5:
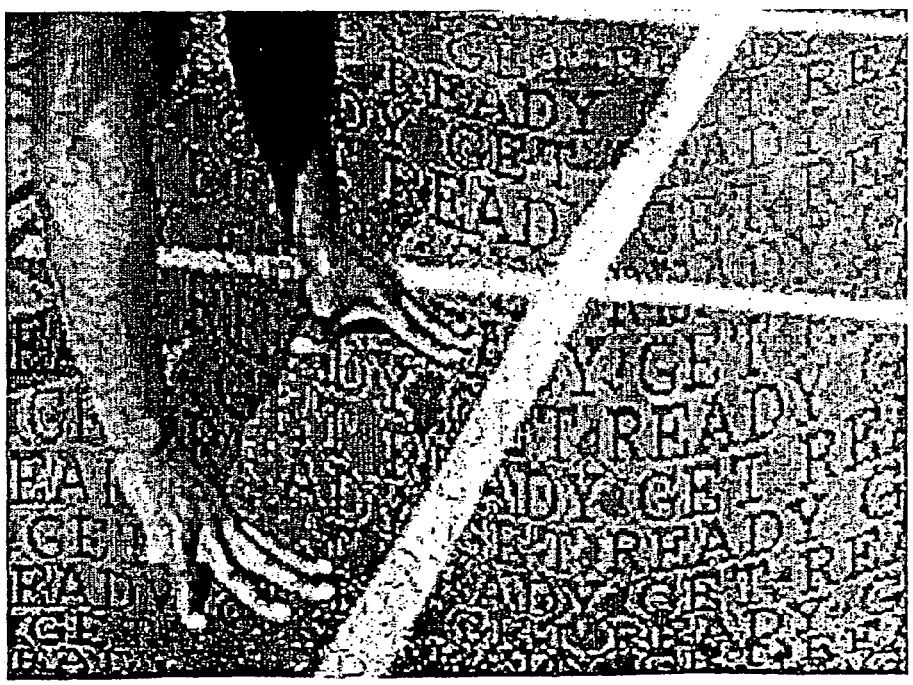
FIG. 5 shows one instance of a microstructure image obtained by multicolor dithering of the original image shown in FIG. 3.

Hereinafter, the term dithering without the adjective "standard" or "multicolor" refers to both standard dithering and Multicolor Dithering. Standard as well as Multicolor Dithering make use of a dither matrix, whose distribution of dither threshold values represents the microstructure that will be part of the resulting target image (FIG. 1A and FIG. 1B). Both standard dithering and Multicolor Dithering reproduce an input image (also called original or global image) in such a way that when seen from nearby, mainly the microstructure embedded into the global image is visible, whereas when seen from far away, mainly the global image is visible (FIG. 5).

Hereinafter the terms "dither matrix" and "dither array" are used interchangeably. A dither array is composed of "cells" incorporating "dither threshold values" or simply "dither values". As known in the art, small and middle size dither matrices tile the target image plane. However, the dither matrices used in the present invention may be very large, possibly as large or larger than the target image.

The term "automatic dithering" refers to the full process of (i) creating automatically a dither matrix from an image or bitmap incorporating the microstructure shapes, (ii) rendering a target dithered image by either standard dithering or multicolor dithering, and (iii) possibly applying a postprocessing step for target image equilibration Some techniques used in the present invention, such as a parameter dependent transformation $T_t$ specifying instances of the microstructure and a warping transformation $T_w$ are also used in the parent co-pending patent application U.S. Pat. No. 09/902,227, filed Jul. 11, 2001, by R. D. Hersch and B. Wittwer. However, this parent co-pending application is centered on the generation of animated microstructure images, i.e. image sequences and animations, whereas the present invention deals mainly with still images and security documents incorporating a microstructure. However, the method for automatic synthesis of dither matrices disclosed in the present invention also greatly facilitate the creating of images with an animated microstructure.

Standard Dithering

Figure 2:
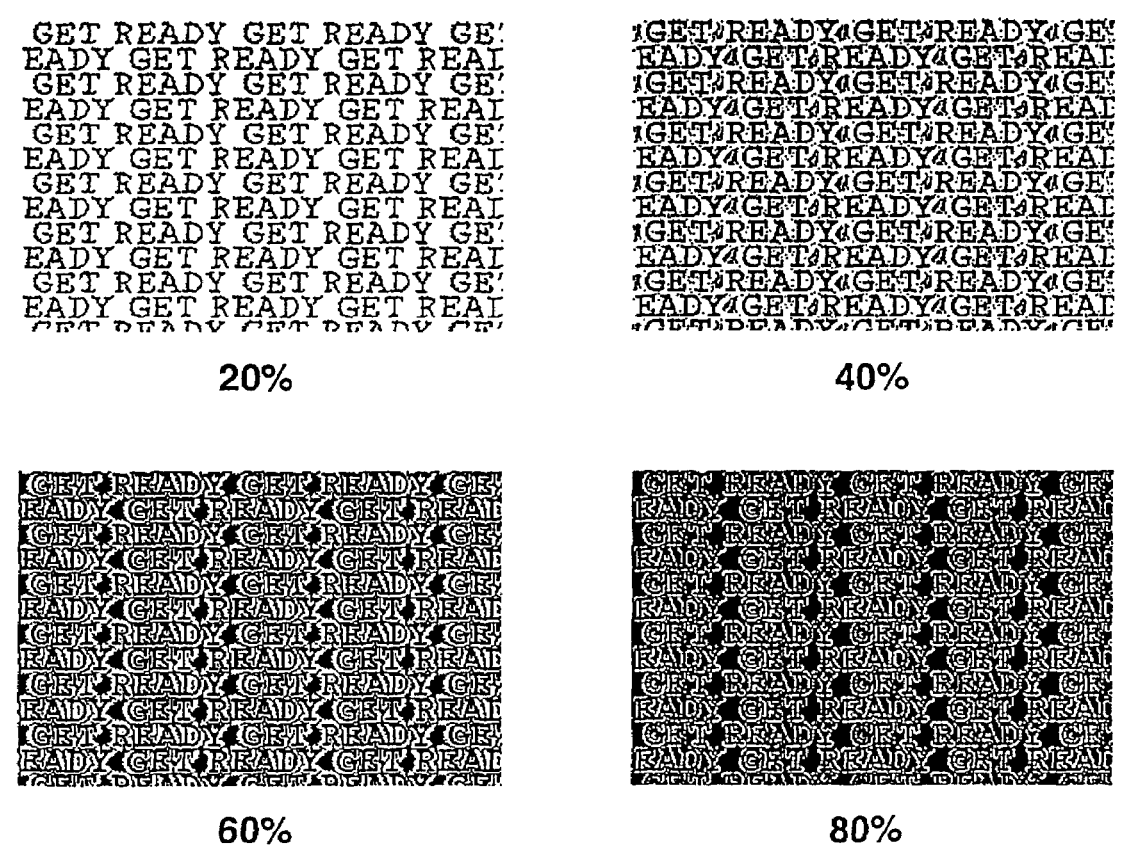
Figure 7A:
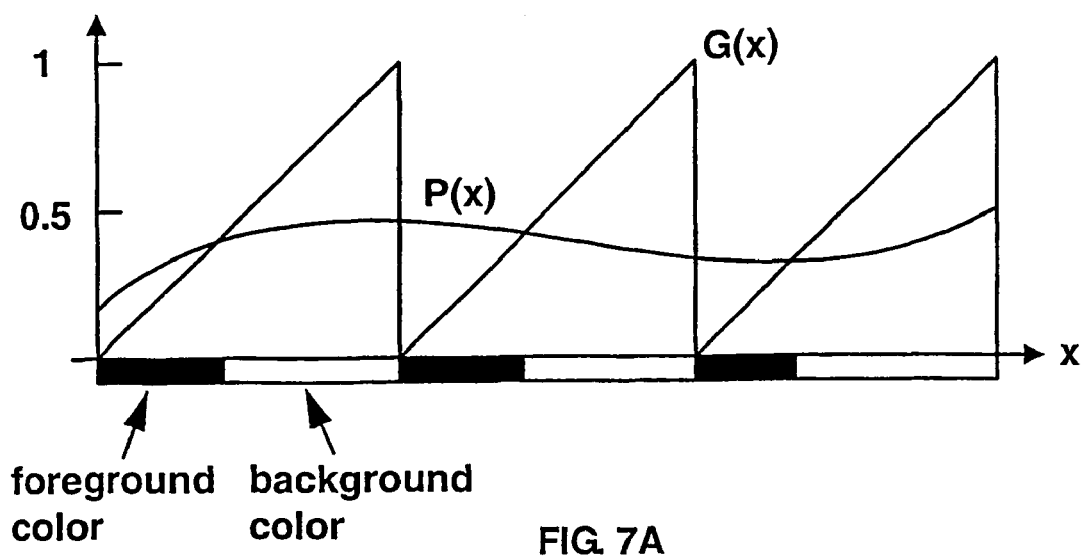
FIG. 7A shows schematically a comparison between an input intensity signal (or image) P(x) and a dither threshold value G(x) and according to that comparison, the setting of a foreground or background color.

Standard dithering converts an intensity into a surface percentage. An intensity $P(x)$ of foreground color C is compared with a dither threshold value $G(x)$ and according to the comparison (see FIG. 7A), if $P(x)>G(x)$, the corresponding location x is set to the foreground color and if $P(x)<=G(x)$, it is left as background color. FIG. 1A gives an example of a large dither matrix incorporating the microstructure "GET READY"; FIG. 1B shows an enlarged part of it and FIG. 2 represents the reproduction of uniform single color images at 20%, 40%, 60% and 80% foreground color intensity (the foreground color is represented as black). For more explanations on standard dithering, see H. R. Kang, Digital Color Halftoning, SPIE Press and IEEE Press, chapter 13, 213–231.

Multicolor Dithering

Figure 7B:
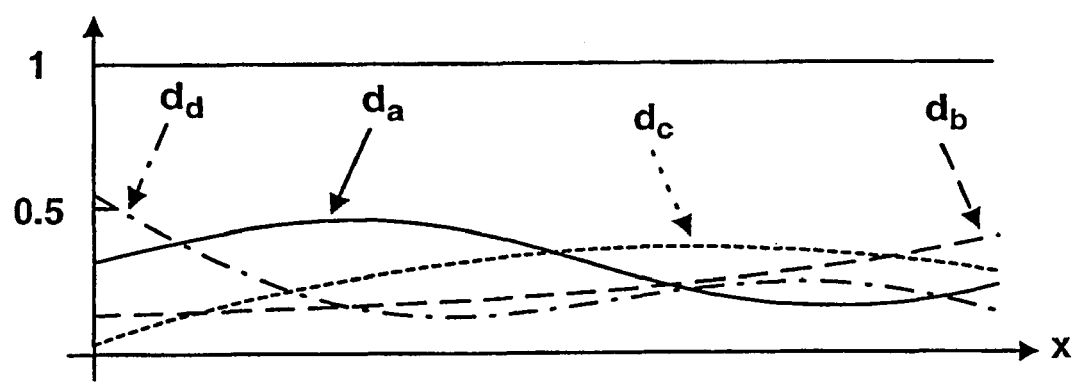
FIG. 7B shows relative intensities $d_a$, $d_b$, $d_c$, and $d_d$ of colors $C_a$, $C_b$, $C_c$, and $C_d$.
Figure 7C:
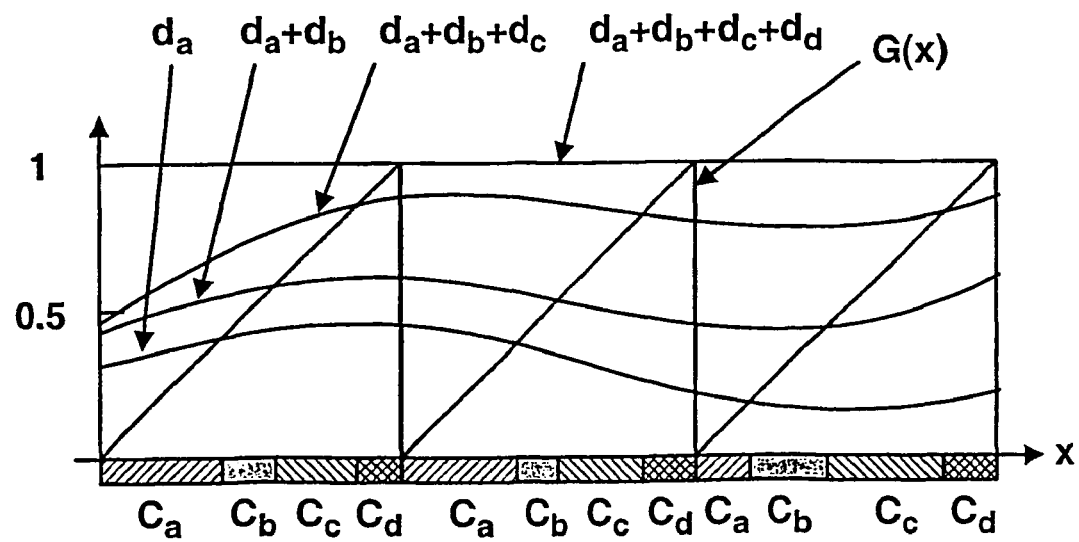
FIG. 7C shows the conversion of relative intensities $d_a$, $d_b$, $d_c$, and $d_d$ of colors $C_a$, $C_b$, $C_c$, and $C_d$ into corresponding surface coverages.

Multicolor Dithering is an extension of standard dithering. In Multicolor Dithering, a color C is rendered by a barycentric combination of several basic colors, for example the combination of 4 colors $C_a$, $C_b$, $C_c$, and $C_d$. Their respective relative weights are $d_a$, $d_b$, $d_c$ and $d_d$ (FIG. 7B). Multicolor Dithering converts these relative weights into relative surface coverages. Multi-color dithering consists of determining the position of threshold value G in respect to intervals $0 \ldots d_a$, $d_a \ldots (d_a+d_b)$, $(d_a+d_b) \ldots (d_a+d_b+d_c)$, $(d_a+d_b+d_c) \ldots 1$, (see FIG. 7C). According to the interval within which G is located, the dithered target image color $C(x,y)$ will take value $C_a$, $C_b$, $C_c$, or $C_d$ (see FIG. 7C, color values along the x-axis). More precisely, if $0<=G<d_a$, $C(x,y)=C_a$; if $d_a<=G<(d_a+d_b)$, $C(x,y)=C_b$; if $(d_a+d_b)<=G<(d_a+d_b+d_c)$, $C(x,y)=C_c$; and if $(d_a+d_b+d_c)<=G<=1$, $C(x,y)=C_d$. Best results are obtained by ordering the 4 basic colors $C_a$, $C_b$, $C_c$, and $C_d$ located at the vertices of a tetrahedron according to their increasing CIE-LAB lightness values L*.

Figure 8:
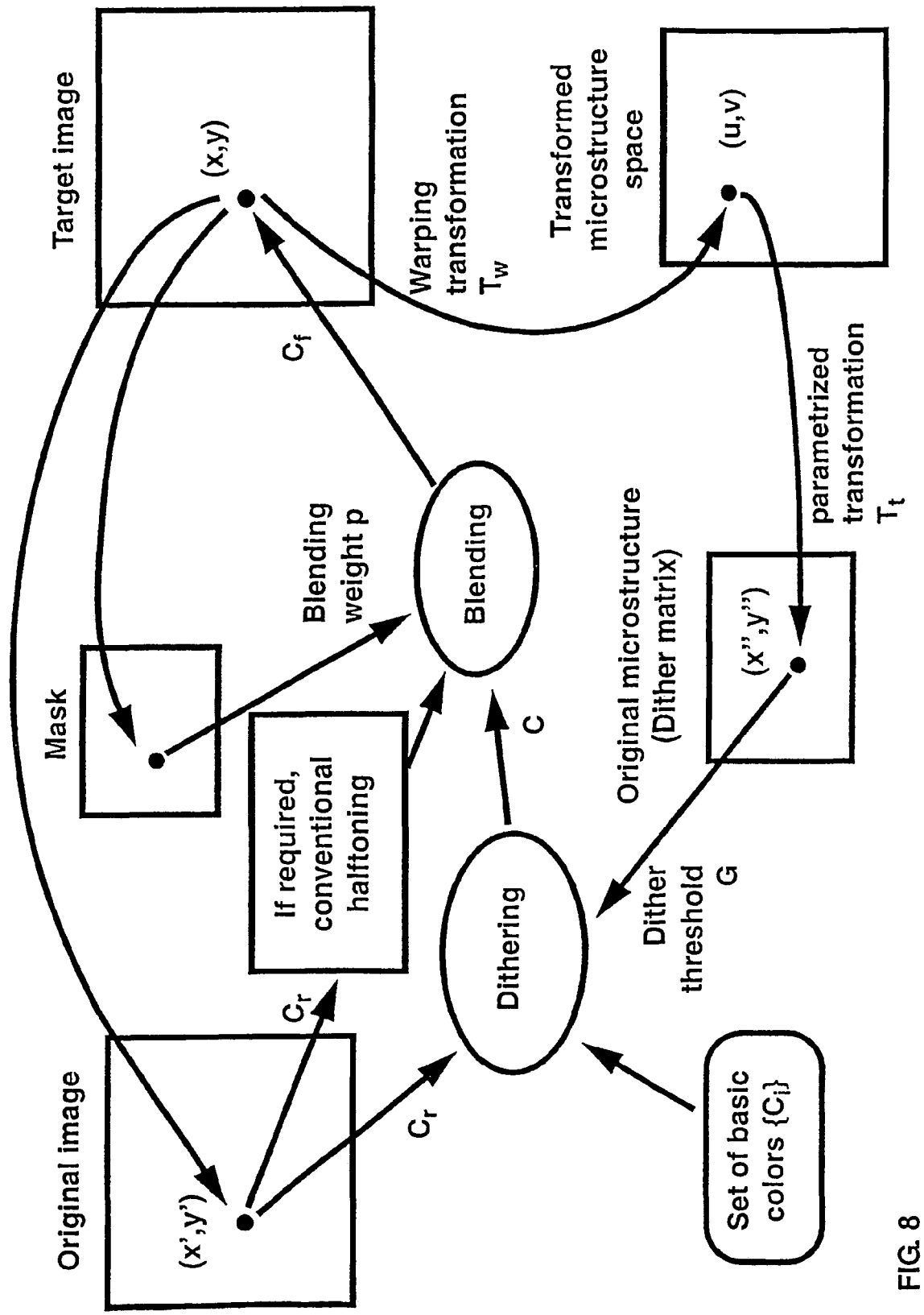
FIG. 8 shows a diagram of elements useful for creating images with transformed microstructures.

The method for generating images formed by microstructures requires the definition of the following elements (see FIG. 8):

an original image (also called global image);
an original microstructure, preferably embodied as a dither matrix;
color information necessary for rendering the target microstructure image (optional);
an instance dependent transformation $T_t$ specifying instances of the microstructure evolving as a function of a parameter t;
a warping transformation $T_w$ specifying a warping between the instantiated or initial microstructure and the warped microstructure (optional);

and optionally a mask specifying the global image portions which are to be rendered with microstructures as well as a possible blending between original image and pure microstructure Image, the blending allowing to specify microstructure appearance properties such as visibility, position and spatial extension of the microstructure.

The original image is located in an original image space (x',y'), the original microstructure is located in an original microstructure space (also called original dither matrix space) (x",y"), the transformed microstructure is located in a transformed microstructure space (also called transformed dither matrix space) (u',v'), and the target microstructure image is located in the target microstructure image space, also simply called target image space (x,y).

Hereinafter, original image (x',y') may stand for original image space (x',y'), original microstructure (x",y") may stand for original microstructure space (x",y"), transformed microstructure may stand for transformed microstructure space (u,v) and target image (x,y) may stand for target image space (x,y).

The microstructure may represent a text, a logo, a symbol, an ornament or any other kind of visual motif. Furthermore, the microstructure may combine several items, e.g. several symbols either identical or different, or a freely chosen combination of text, logos, symbols and ornaments. In the preferred cases of standard dithering and Multicolor Dithering, the microstructure is defined by a dither matrix whose succession of dither threshold levels represent the desired visual motifs (FIG. 1B).

The parameter dependent geometrical transformation $T_t$ may either be a parameter-dependent geometric transformation (e.g. translation, rotation, scaling, linear transformation, non-linear geometric transformation) or any other parametrized transformation creating from at least one microstructure a transformed microstructure whose shape varies as a function of one or several parameters. By modifying the parameters of the transformation $T_t$, one may create different instances of the same image and with the same microstructure information. This allows to creating variations of a security document according to relevant document information, such as its issued date, its validity or its document category. In a preferred embodiment, the transformation $T_t$ provides the mapping between the transformed dither matrix space (u,v) and the original dither matrix space (see FIG. 12).

Figure 12:
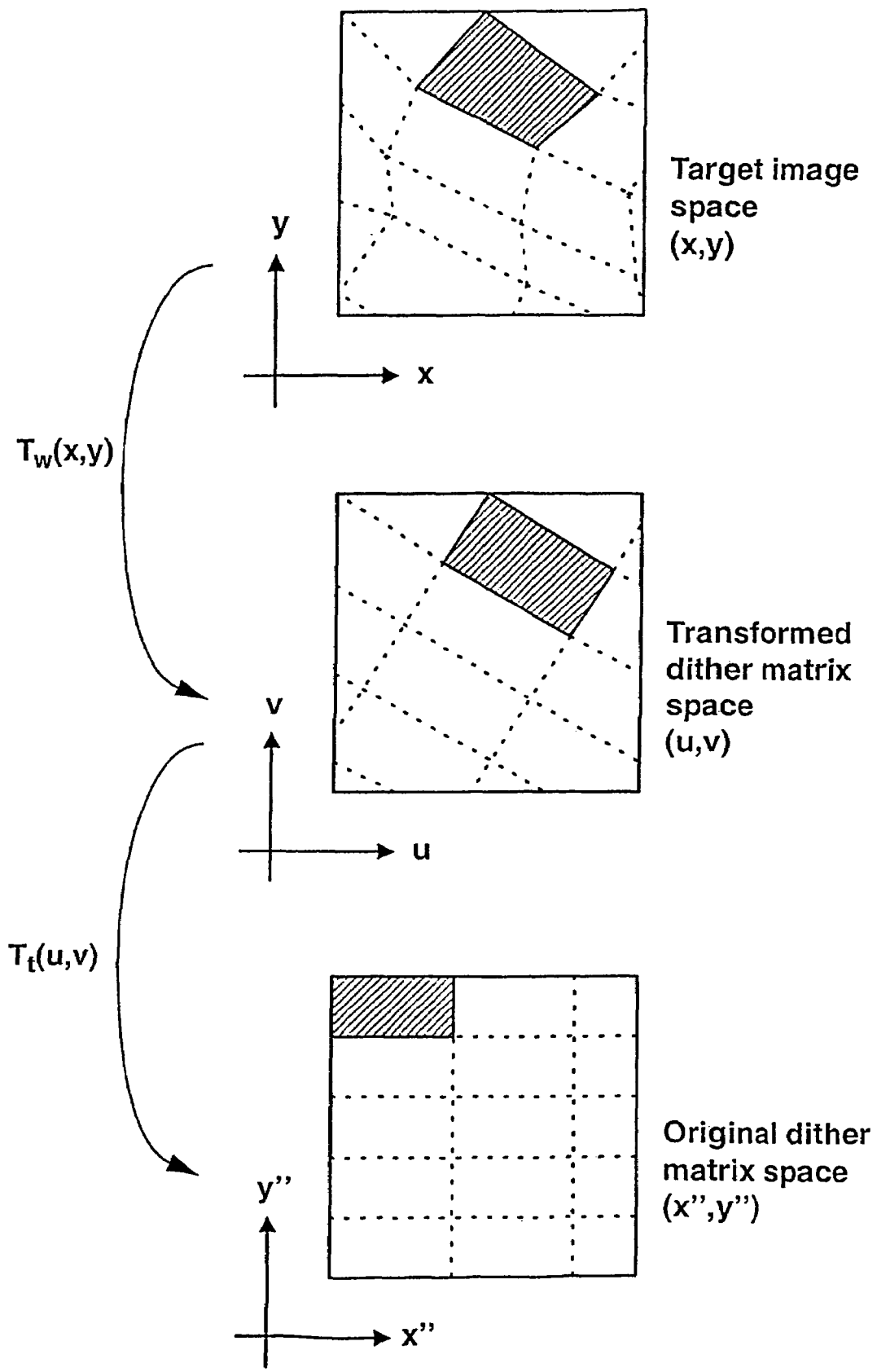
FIG. 12 shows the warping transform $T_w(x,y)$ mapping from target image space to the transformed dither matrix space and the transformation $T_t(u,v)$ mapping from the transformed dither matrix space into the original dither matrix space.
Figure 13A:
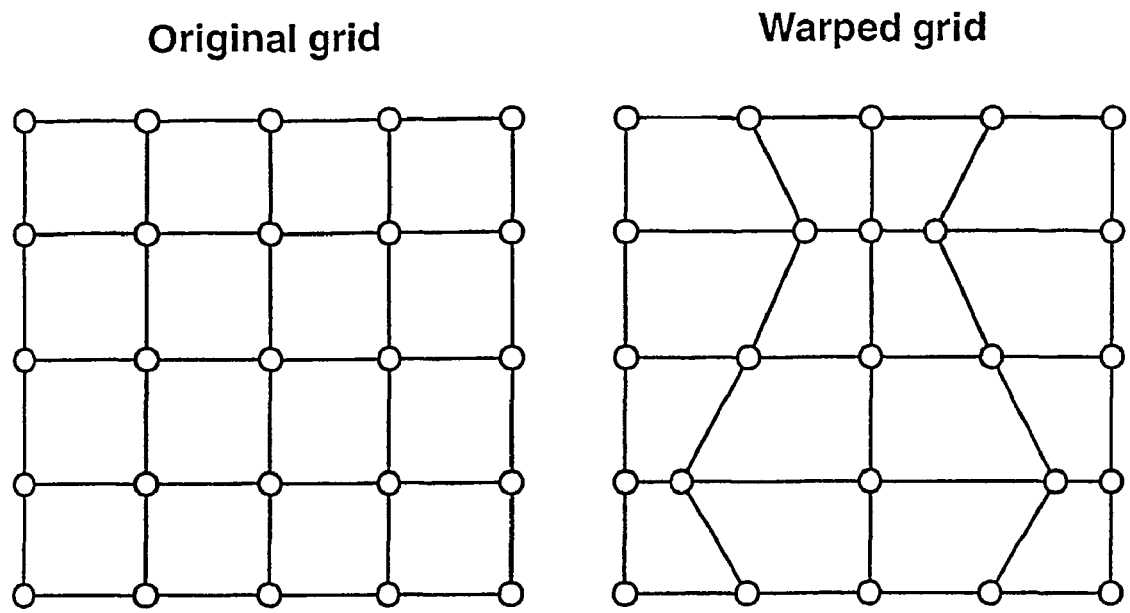
FIG. 13A shows a rectangular grid and the warped rectangular grid specifying the warping transform between target image space and transformed microstructure space.

The warping transformation $T_w(x,y)$ which provides a warping between the target image space (x,y) and the transformed dither matrix space (u,v) may either be given by a formula allowing to obtain from a location (x,y) in the target image space the corresponding location (u,v) in the transformed dither matrix space or by a program function returning for a given (x,y) coordinate in the final target image space the corresponding location (u,v) in the transformed dither matrix space (see FIG. 12, transformation $T_w(x,y)$). Alternately, the warping transformation may be specified piece wise, by allowing the designer to specify a rectangular grid of control points and by allowing him to warp this grid as shown in FIG. 13A.

The color information necessary for rendering the target transformed microstructure image may comprise either an indication of which original image color layers $\{C_i\}$ are to be used for rendering the target transformed microstructure image or the specification of a set of basic colors $\{C_i\}$ comprising possibly colors different from red, green and blue, cyan, magenta, yellow, white and black, with which the target image is to be synthesized. Colors which are members of the set of colors $\{C_i\}$ used for microstructure image rendering are called hereinafter "basic colors". A basic color is a color reproducible on the selected support (paper, plastic, metal, partly or fully transparent support, optical device). For example on paper, basic colors may be standard cyan, magenta, yellow and black, non-standard colors, (e.g. a Pantone color such as color Pantone 265C) and special inks such as metallic inks and iridescent inks (optically variable inks). Furthermore, basic colors also comprise opaque inks, which may offer a certain protection against counterfeiting attempts when printed for example on transparent support.

In the case of a mask with more than two levels of intensity, the mask's values specify a blending between the image rendered with microstructures, for example a dithered image (standard or multi-color) and the color obtained by simple resampling of the original image according to the target's image size and resolution. Such a blending allows to produce less pronounced microstructures.

The method for generating a microstructure target image is formulated below in general terms so as to encompass all methods capable of generating information at the microstructure level. However, in a preferred embodiment, either standard dithering or multicolor dithering is used.

The method for generating a target image with an embedded microstructure comprises the following steps (see FIG. 8):

(a) definition of elements required for generating the target image, i.e. an original image, an original microstructure (in a preferred embodiment, an original dither matrix), possibly color information specifying a set of basic colors $\{C_i\}$ used for rendering the target microstructure image, a parameter-dependent transformation, possibly a warping transformation and a mask;

(b) traversing the target image (x,y) pixel by pixel and row by row, determining corresponding positions in the original image (x',y'), in the transformed microstructure (preferred embodiment: transformed dither matrix) (u,v), in the original microstructure (preferred embodiment: original dither matrix) (x",y") and in the mask;

(c) obtaining from the original image position (x',y') the color $C_r$ to be reproduced, from the original microstructure (preferred embodiment: original dither matrix) space position (x",y") the rendering information (preferred embodiment: the dither threshold value G) and from the current mask position the corresponding mask value p;

(d) carrying out the target image rendering algorithm (preferred embodiment: standard dithering or multicolor dithering) and determining output color C, possibly from the set of basic colors $\{C_i\}$;

(e) according to the mask value p, performing a blending between rendered (preferred embodiment: dithered) output color C and original image color $C_r$. In the case of simple printers capable of printing only a limited number of distinct color intensities, color $C_r$ is rendered by its equivalent halftone colors $C_{pqrs}$ obtained by a conventional halftoning technique (e.g. using blue noise masks, as described in K. E. Spaulding, R. L. Miller, J. Schildkraut, Method for generating blue-noise dither matrices for digital halftoning, Journal of Electronic Imaging, Vol. 6, No. 2, April 1997, pp 208–230, section 4 "Blue Noise Matrices for Color Images").

If the mask value p indicates that the present image location does not need to be rendered with transformed microstructures, then step (c) is modified to directly put color $C_r$, respectively its equivalent halftone colors $C_{pqrs}$, to be reproduced in the target image and steps (d) and (e) are skipped. If the mask is inexistent, then the whole image is reproduced with transformed microstructures.

The original image may be a simple RGB color image stored in any known format. The microstructure (in a preferred embodiment: the dither matrix) is either precomputed and ready to use or has been created as described in the sections below, starting from section "Automatic synthesis of a dither matrix".

Generation of Microstructure Images by Standard Dithering

Figure 14A:
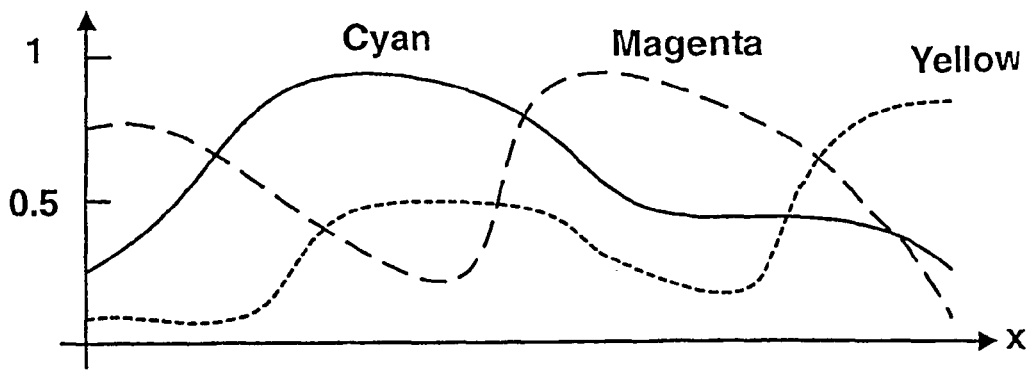
FIG. 14A shows a one-dimensional color CMY image with cyan, magenta and yellow color intensities varying as function of their position on the x-axis.
Figure 14B:
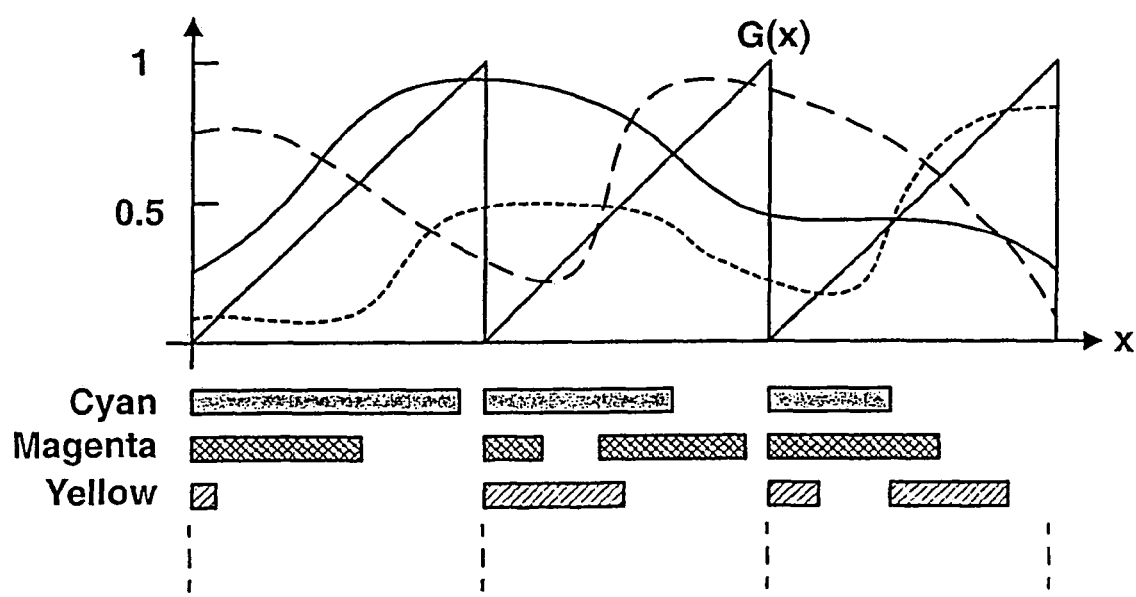
FIG. 14B shows schematically comparisons between the CMY input intensities of the image of FIG. 14A and a dither threshold value G(x) and according to these comparisons, the setting of the resulting basic colors (cyan, magenta and yellow)
Figure 14C:
FIG. 14C shows the colors resulting from the superposition of the basic colors set according to the comparison of FIG. 14A.

It is however possible to generate images with microstructures by applying the standard dithering method with a large dither matrix incorporating the microstructure shapes independently to one or several basic colors. A basic color may be selected from the set of cyan, magenta and yellow or any other set of colors by which the image is described. One may apply standard dithering to one, several or all basic colors. As an example, one may apply standard dithering separately to the cyan, magenta and yellow layers of an image (FIG. 14A and FIG. 14B) and display the resulting target image by superposing the dithered cyan, magenta and yellow layers. The resulting target image will thus be rendered with cyan, magenta, yellow, red (overlap of yellow and magenta), green (overlap of cyan and yellow), blue (overlap of cyan and magenta) and black (overlap of cyan, magenta and yellow), see FIG. 14C.

Instead of applying standard dithering to cyan, magenta and yellow as in the previous example, one may also apply standard dithering to one of the color layers, for example the predominant color layer or the color layer dominant in the image part where one would like to insert the microstructure. For example, in order to insert a microstructure in the sky, one may choose to apply standard dithering to the cyan layer (FIG. 15B) and reproduce the other color layers by conventional methods such as cluster-dot screening or error-diffusion. In that case, target image pixels are composed of a cyan color layer obtained by standard dithering with a large dither matrix incorporating the microstructure shapes and magenta and yellow layers are reproduced with a conventional halftoning method.

Generation of Microstructure Images by Multicolor Dithering

In the preferred embodiment of generating microstructure images by Multicolor Dithering, the method comprises initialization steps, rendering steps and an image printing step.

The initialization steps comprise (a) the initialization for the color separation of the original image (e.g. RGB) according to the selected set of basic colors, (b) the creation of a data structure facilitating the color separation, (c) carrying out the color separation and associating in a color separation map to each target color image pixel the basic colors with which it is to be color dithered and their associated basic colors weights, (d) associating in a warping transform map to each location (x,y) within the target image space a pointer to the corresponding location in the transformed dither matrix space according to the user defined warping transformation. Steps (b), (c) and (d) are useful for speeding up image rendition, especially when applying the same warping transformation on successively generated target images. As a variant, one may choose to carry out the color separation and possibly the warping transform during image rendering.

Several methods for carrying out the color separation exist: one may solve the Neugebauer equations for the set of output colors (see for example H. R. Kang, Color Technology for Electronic Imaging Devices, SPIE Optical Engineering Press, 1997, Chapter 2, Section 1, pp. 34–40) or place the output colors in an output color space, e.g. CIE-XYZ and tetrahedrize that space (see S. M. Chosson, R. D. Hersch, Visually-based color space tetrahedrizations for printing with custom inks, Proc. SPIE, 2001, Vol. 4300, 81–92). In that case, the preferred data structure facilitating the color separation is a 3D grid data structure pointing to the tetrahedra intersecting individual grid elements.

In the case that the selected basic colors are located in a rectilinear grid, the tetrahedrization is straightforward : each cube or rectilinear volume element comprising 8 vertices can be decomposed into 6 tetrahedra (see H. R. Kang, Color Technology for Electronic Imaging Devices, SPIE Optical Engineering Press, 1997, Section 4.4 Tetrahedral interpolation, pp 70–72). If the designer is allowed to choose any set of basic colors or when non-standard or special inks are used, the tetrahedrization is slightly more complex, but can be carried out without difficulty with prior art methods (see for example the book Scientific Visualization : Overviews, Methodologies, and Techniques, by Gregory M. Nielson, Hans Hagen, Heinrich Muller, Mueller (eds), IEEE Press, Chapter 20, Tools for Triangulations and Tetrahedrizations and Constructing Functions Defined over Them, pp. 429–509).

Figure 15A:
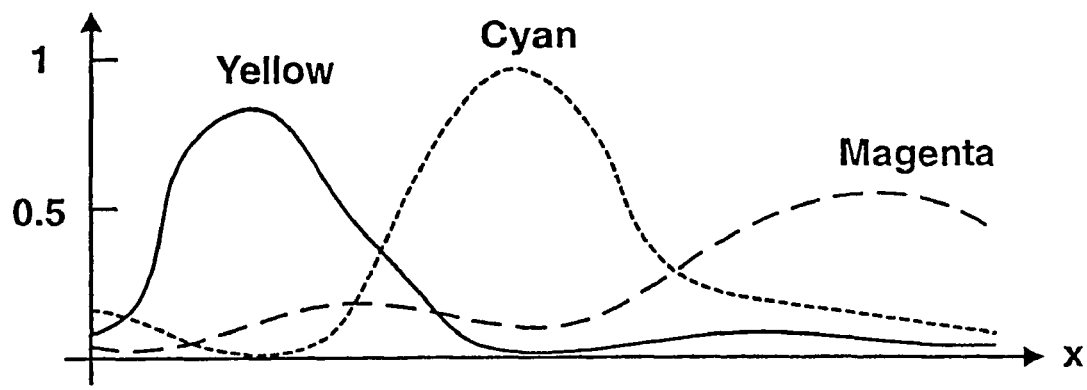
FIG. 15A shows a one-dimensional color CMY image with cyan, magenta and yellow color intensities varying as function of their position on the x-axis.
Figure 15B:
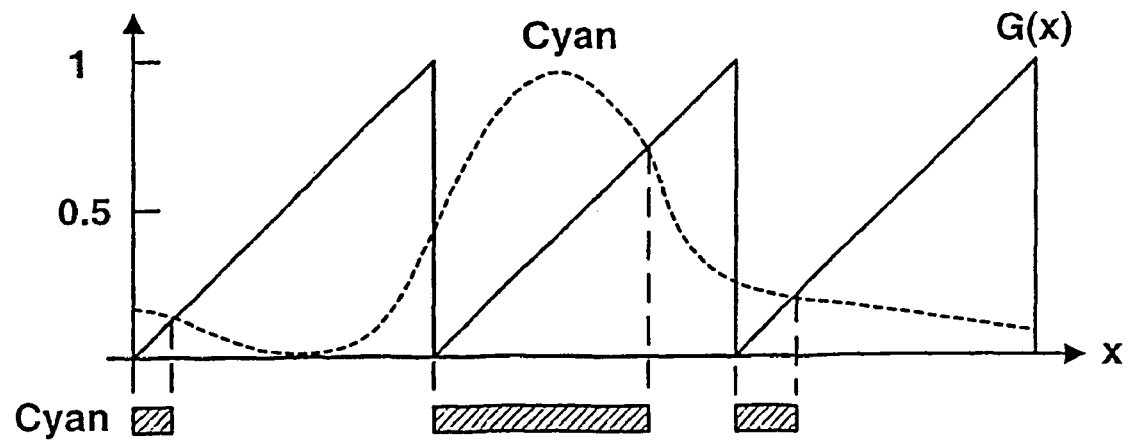
FIG. 15B shows schematically the comparison between the cyan input intensity of the image of FIG. 15A and a dither threshold value G(x) and according to this comparison, the setting of the resulting basic cyan color.

In the case that the color separation is carried out by tetrahedrization, each target image pixel color is rendered by 4 basic colors, members of the selected set of the basic colors. For computing the 4 basic colors associated with each target image pixel (x,y), the color $C_r$ at the corresponding original image location (x',y') is determined by resampling, i.e. by interpolating between colors of neighbouring original image pixels (e.g. prior art nearest neighbour or bi-linear interpolation). Resampled color $C_r$ is used to find the tetrahedron which encloses it. The 4 basic colors $C_a$, $C_b$, $C_c$, $C_d$ located at the tetrahedron's vertices and their barycentric weights $d_a$, $d_b$, $d_c$, $d_d$ allowing to render resampled original image color Cr according to $C_r = d_a\ C_a + d_b\ C_b + d_c\ C_c + d_d C_d$ may be stored, possibly together with original image resampled color $C_r$, in a target image color separation map. The basic colors member of the set $\{C_a, C_b, C_c, C_d\}$ with the largest relative amounts are called the dominant colors. Security document elements such as text, graphics or images may be conceived within a limited color gamut so as to ensure that only one or two colors are predominant across the largest part of that element's surface. This will yield a microstructure, where the dominant colors are thick in dark regions and thin in highlight regions of the security document The image rendering steps are as follows. For rendering successive target image instances of the target microstructure image, for each target image instance, we traverse the target image space pixel by pixel by traversing one pixel row after the other. For each target pixel (x,y), if the target image mask value M(x,y) indicates that multi-color dithering is to be applied, (e.g. M(x,y)<>0), we read from the target image color separation map the basic colors and their respective weights. We determine the dither threshold value G associated with a target pixel (x,y) by obtaining the the corresponding location (u,v) in the transformed dither matrix space, for example by accessing the warping transform map created in the initialization phase and from there, by applying the current transformation $T_t(u,v)$, we obtain the current location (x",y") within the original dither matrix space. The threshold value G(x",y"), the basic colors $C_a, C_b, C_c, C_d$ and their respective weights $d_a, d_b, d_c, d_d$ are used for multicolor dithering. Multi-color dithering consists of determining the position of threshold value G with respect to intervals 0 . . . $d_a$, $d_a$ . . . ($d_a+d_b$), ($d_a+d_b$) . . . ($d_a+d_b+d_c$), ($d_a+d_b+d_c$) . . . 1. According to the interval within which G is located, the dithered target image color C(x,y) will take value $C_a, C_b, C_c,$ or $C_d$ (see FIG. 7C and section "Multicolor dithering" above). In the case that standard dithering is used instead of multi-color dithering, we determine as above the dither threshold value G and use it to compare it with the intensity of the basic color (or colors) to be dithered and according to the comparison (see section "Standard dithering" above), use that basic color (or colors) to render the current target image pixel (x,y). FIG. 15B shows how dithering can be applied to one of the image's color's, namely cyan.

For rendering different target image instances with the same original image and the same original microstructure shapes, the parametrized transformation $T_t(x,y)$ describing the mapping between the transformed dither matrix space and the original dither matrix space may be modified.

Figures 16A, 16B:
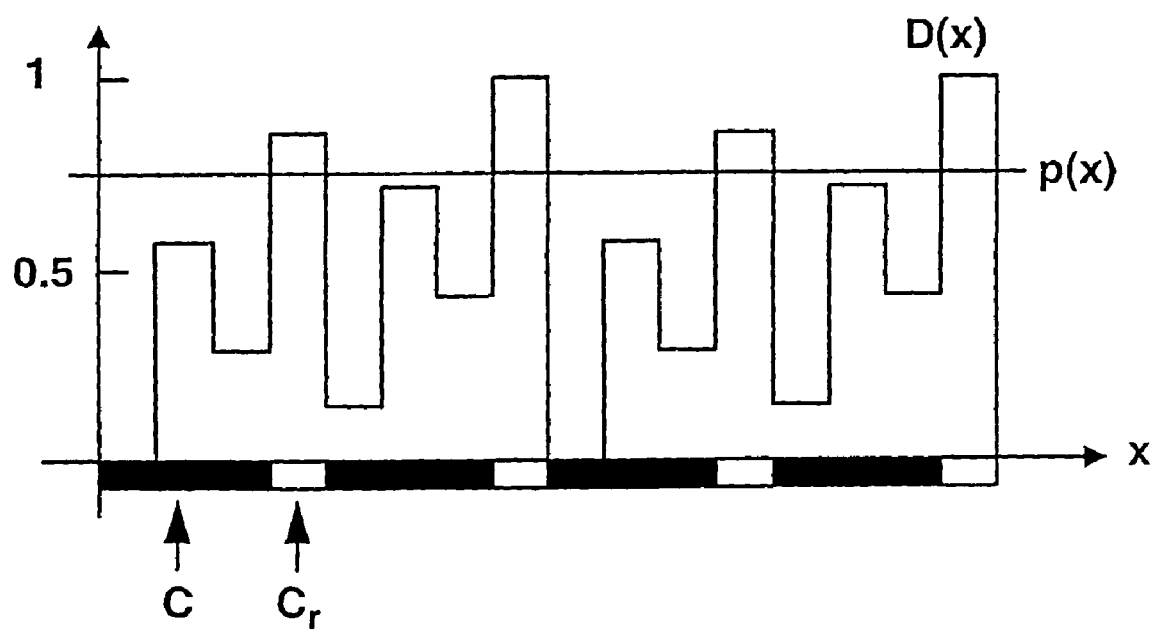
FIG. 16A shows a dispersed-dot two-dimensional dither matrix.
FIG. 16B shows the one-dimensional dithering of constant mask values p(x) with 1D dither matrix values D(x) and the resulting spatial distribution of microstructure image color values C and original image resampled color values $C_r$.

In the case of a mask M(x,y) specifying discrete values representing a proportion p between 0 and 1, the final color $C_f(x,y)$ is a combination of the dithered color C(x,y) and of the original color $C_r$ (possibly reproduced by a conventional halftoning method), for example $C_f(x,y)=p\ C(x,y)+(1-p)\ Cr$. Instead of a pixel-wise blending between the dithered image color C(x,y) and the color $C_r$ (which would be only feasible on a multi-intensity reproduction device such as a dye sublimation printer), it is possible to apply a spatial blending, i.e. to ensure that only proportion p of neighbouring pixels take the dithered color C(x,y) and proportion (1-p) takes the original conventionally halftoned color values $C_r$. For this purpose, one can use for example a spatial dispersed dither matrix D(x,y), e.g. Bayer's 4×4 dither matrix (FIG. 16A) and use thresholds t=0,1,2 ... 15 to decide if a pixel should take the original conventionally halftoned color value Cr, when p=<t/16 or take the dithered color C when p>t/16. As an illustration of spatial blending, FIG. 16B shows in one-dimensional space the comparison between the proportion p(x) and the dither values D(x): where p(x)>D(x), the corresponding segment (black in FIG. 16B) takes the dithered image color values C(x) and where p(x)<=D(x), the corresponding segment (white in FIG. 16B) takes the original conventionally halftoned color values $C_r(x)$.

The printing step comprises the printing of the generated microstructure image. It should be noted that the terms "print" and "printing" in the present disclosure refer to any process for transferring an image onto a support, including by means of a lithographic, photographic, electrophotographic, ink-jet, dye-sublimation, engraving, etching, perforing, embossing or any other process.

Figure 9A:
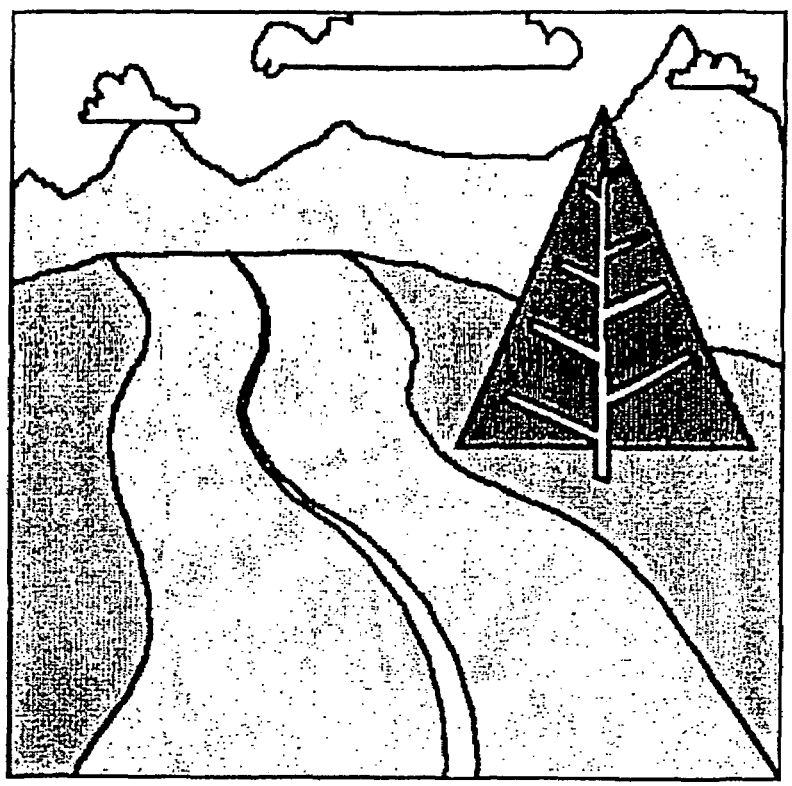
FIG. 9A shows schematically an original image.
Figure 9B:
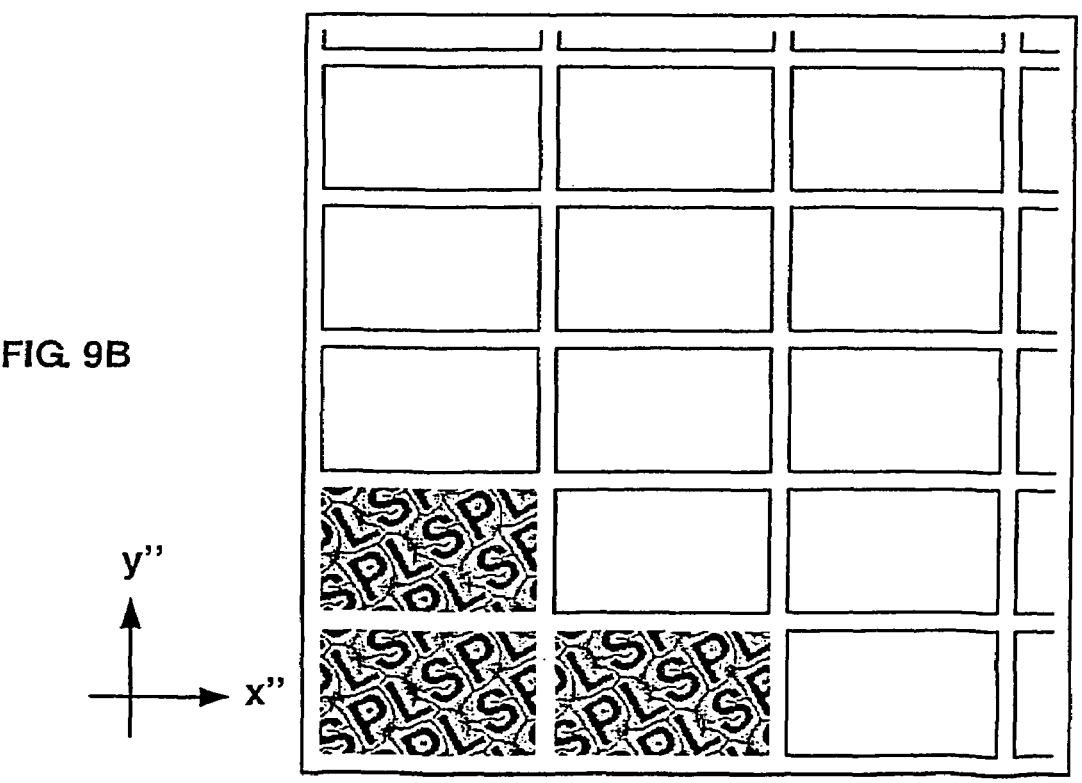
FIG. 9B shows schematically a dither matrix paving an original dither matrix space.
Figure 10A:
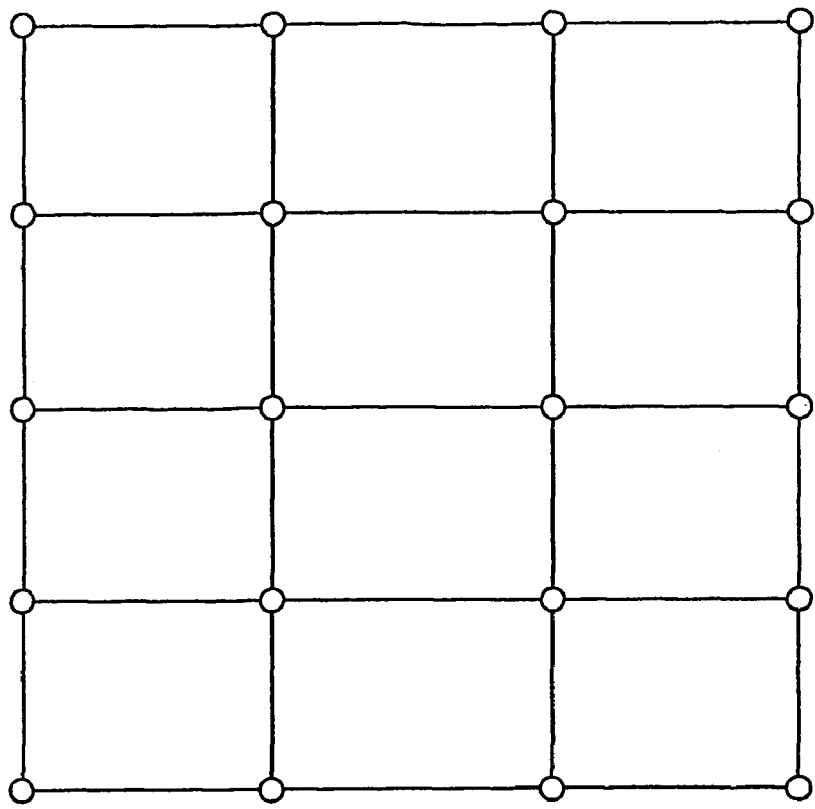
FIG. 10A shows a warping grid laid out in a transformed dither matrix space.
Figure 10B:
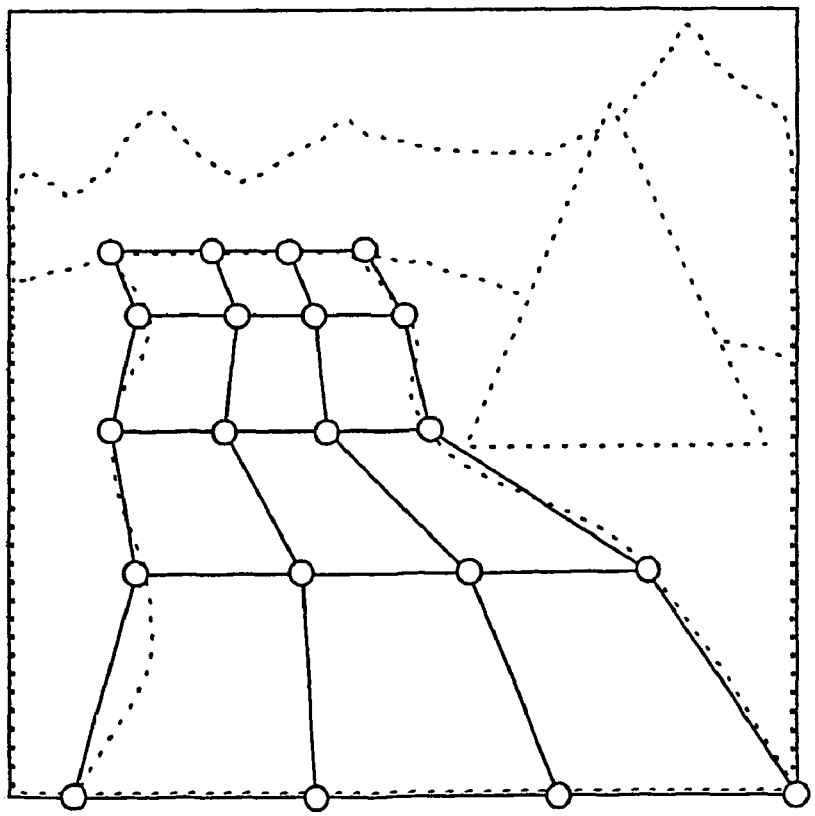
FIG. 10B shows the grid of FIG. 10A, warped and laid out on top of the target image.
Figure 11A:
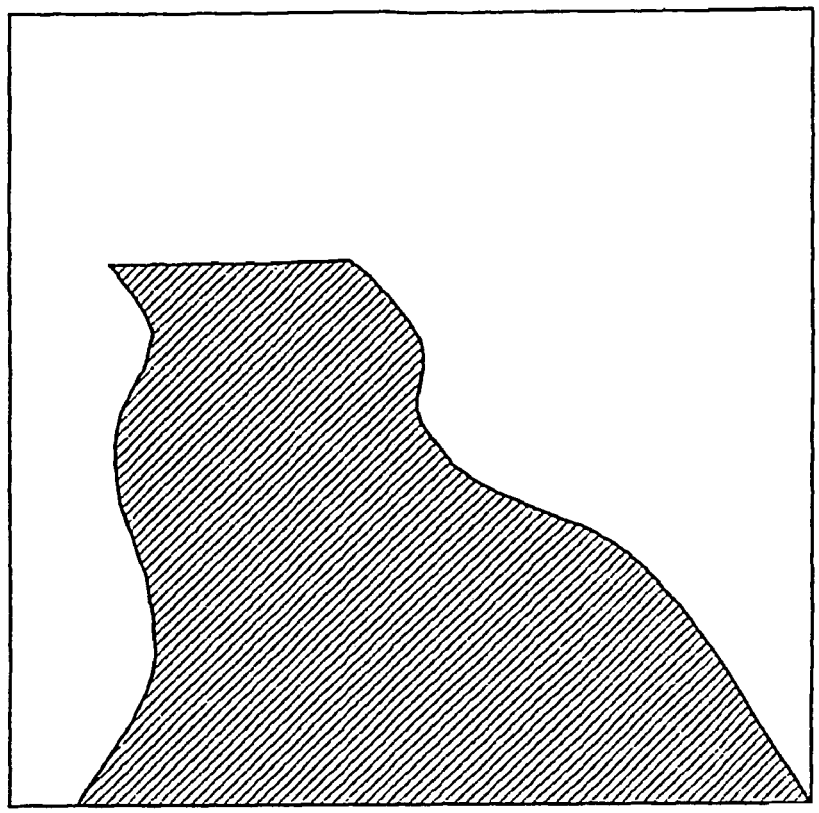
FIG. 11A shows a mask specifying the part of the target image to be rendered.
Figure 11B:
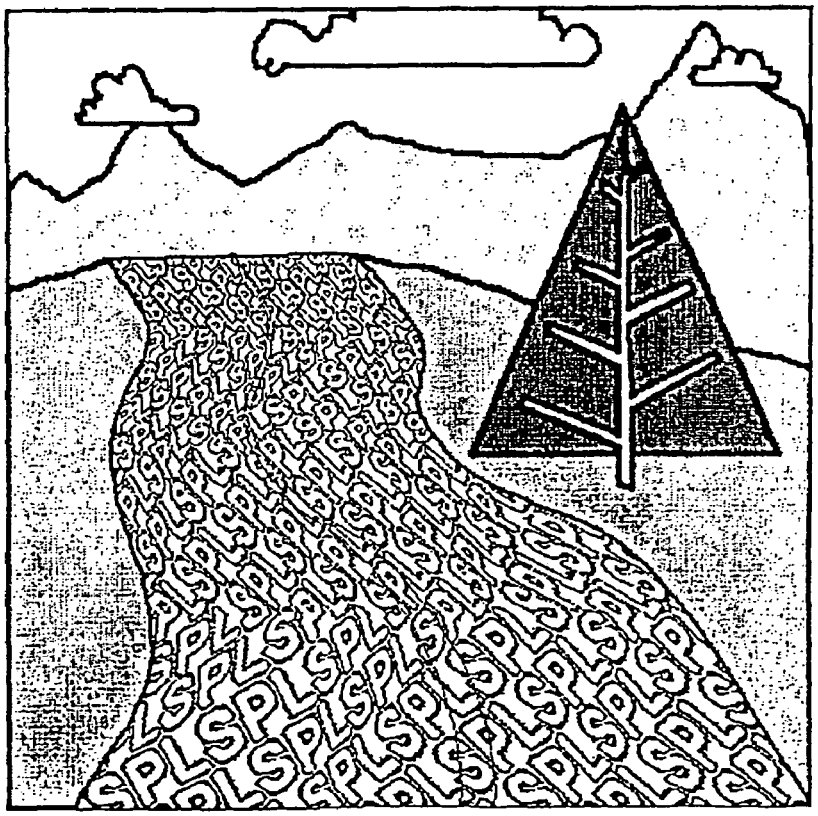
FIG. 11B shows one instance of the target image rendered with a transformed microstructure.
Figures 13B, 13C:
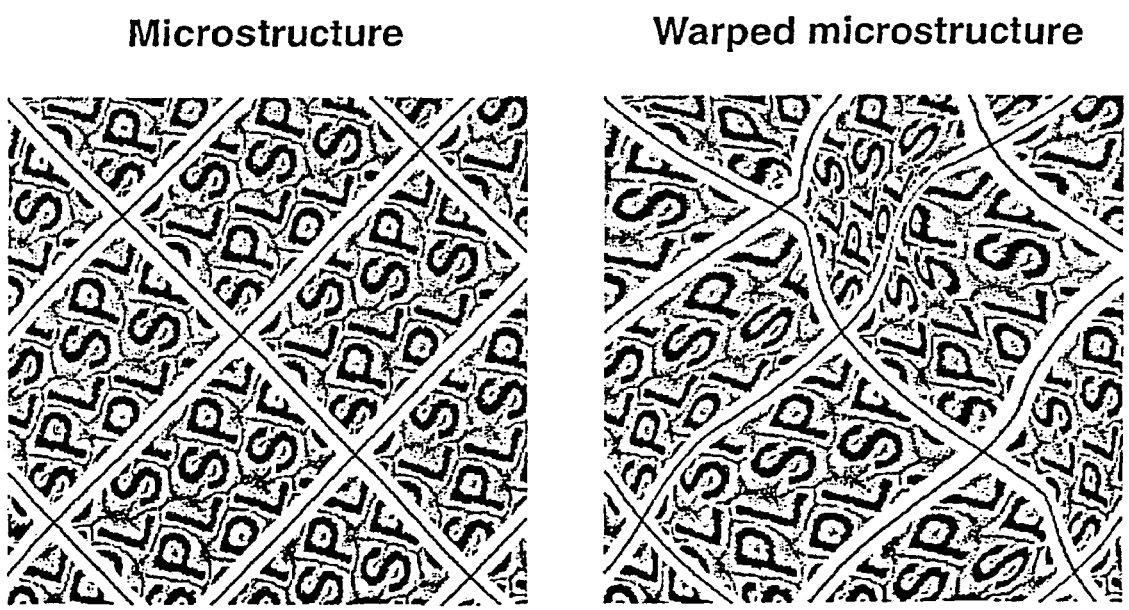
FIG. 13B shows a microstructure in the transformed microstructure space.
FIG. 13C shows the same microstructure in the target image space, warped by the warping transformation defined according to FIG. 13A.

As an example let us assume FIG. 9A represents the original color image. FIG. 9B represents the dither matrix paving the original dither matrix space. The parametrized transformation $T_t$ maps the transformed dither matrix within an transformed dither matrix space into the original dither matrix space. FIG. 10A represents a warping grid laid out over the transformed dither matrix space. In FIG. 10B, the warped grid is shown in the target image space. The warping transformation $T_w$ allows to map locations from the target image space into corresponding locations in the transformed dither matrix space. FIG. 11A shows a mask specifying which part of the original image needs to be rendered by microstructures. FIG. 11B shows schematically the rendered target color image space, where the part covered by the mask is rendered with microstructures. The "LSP" microstructure is obtained thanks to the warping transformation (FIG. 13A) which transforms for example the repetitive microstructure shown in FIG. 13B into the warped microstructure shown in FIG. 13C.

Figure 3:
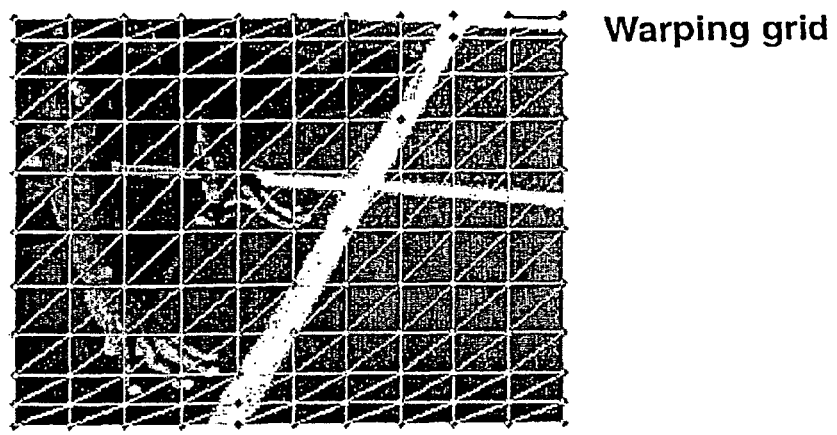
FIG. 3 shows an image overlaid with a warping grid.
Figure 4:
FIG. 4 shows a mask specifying the parts of the image to be rendered with microstructures (in black)
Figure 6:
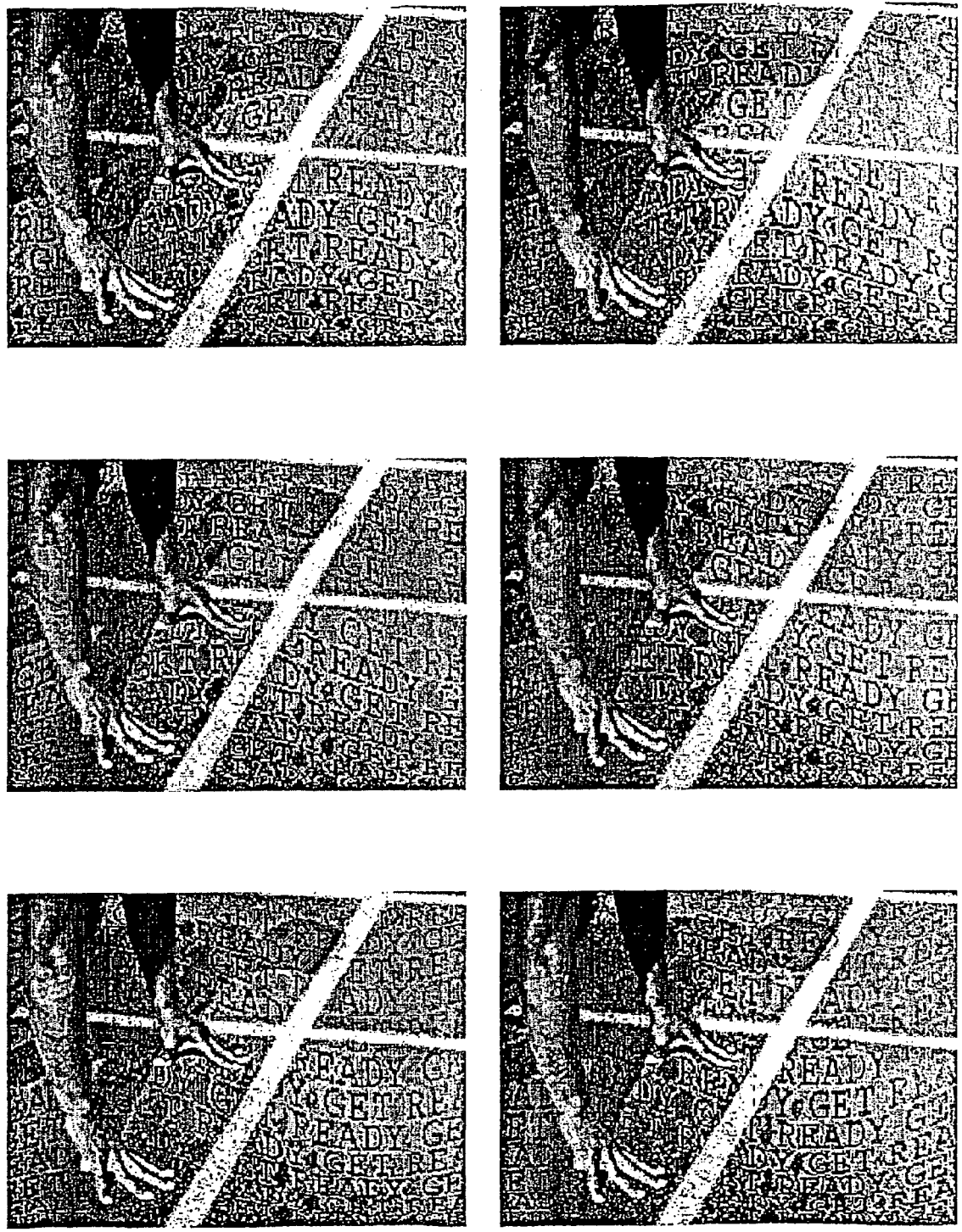
FIG. 6 shows other instances of a microstructure image.

As real example, FIG. 1. shows a dither matrix comprising the "GET READY" microstructure shapes. FIG. 2. shows the microstructure obtained by dithering with constant foreground color intensity levels of 20%, 40%, 60% and 80% (the foreground color is shown in black, the background is represented by the paper white). FIG. 3. shows the original image, with a superimposed warping grid (the grid is made of rectangular elements, with one additional diagonal per rectangle defining two triangles; the triangles are used for the warping transformation). In the present case, the warping grid has the effect of shrinking the microstructure at the bottom and top of the image. FIG. 4 shows the bi-level mask specifying the regions to be rendered with a microstructure and FIG. 5 shows one instance of the resulting image comprising a microstructure in the regions specified by the mask. One can easily perceive the microstructure made of the warped "GET READY" shapes. FIG. 6 shows several instances of the rendered microstructure image, i.e. the rendered microstructure image at different time points. The display of a microstructure image where in successive frames, transformations parameters evolve smoothly over time yields an image with a smoothly evolving microstructure hereinafter called "animated microstructure image" or "image with embedded microstructure evolving over time" or simply "image with animated microstructure". The transformation, also called "animation transformation" moves the microstructure up and down and at the same time displaces it slowly to the left. The animation transformation $T_t$ of this example has the form $$x''=s_x(u+k_u \cdot i)$$

$$y''=s_y(v+A \cdot \cos((s \cdot i+u)360/\lambda))$$

where i is the number of the current target image instance, s is the wave oscillating speed, $k_u$ is the horizontal translation speed, l is the horizontal period of the microstructure wave, A is its amplitude and $s_x$, $s_y$ represent respectively horizontal and vertical scaling factors. The cosinusoidal vertical displacement of the microstructure depends on its current location u, i.e. there is a phase difference in the vertical displacement of the microstructure at different horizontal locations. Variables u and v represent respectively the current horizontal and vertical coordinates within the transformed dither matrix space (u, v). An animated microstructure image may be incorporated into a support formed by an optical device. Such optical devices may comprise holograms, kinegrams or diffractive elements.

Use of Color and Microstructures for Strengthening the Document Protection

Color images can strengthen the security of documents against anti-counterfeiting attempts by making it more difficult for potential counterfeiters to replace individual document elements or individual microstructure elements by other faked elements. One may for example create images with strongly varying colors for the subsequent synthesis of a target color microstructure image by taking as input image a grayscale image, overlaying on top of it a grid and assigning to each grid point a chromatic value in a suitable color space, for example a value for hue (H) and saturation (S) in the HLS color model (see Foley, Van Dam, Feiner, Hughes, Computer Graphics: Principles and Practice, Addison-Wesley, 1999, section 13.3.5: The HLS Color Model, pp 592–595). That grid may be warped as shown in FIG. 13A. The original or possibly the warped grid define by interpolation (triangular interpolation within triangles obtained by subdivision of the grid quadrilaterals into pairs of triangles) one hue and saturation value for each pixel of the grayscale image. The intensity of each pixel of the grayscale image may be proportionally mapped onto the lightness (L) of the HLS space. By transforming back the HLS values of each pixel into RGB and then possibly into CMY (C=1-R, M=1-G, Y=1-B) one obtains an original color image with strong color variations, which after subsequent dithering with a dither matrix incorporating a microstructure will create a target microstructure image with a strongly varying local microstructure color. Such variations, together with the necessity of recreating manually microstructure elements made of different relative amounts of basic colors (as is the case with Multicolor Dithering) make the task of replacing individual document image elements by faked elements a very hard task for potential counterfeiters.

Figures 35A, 35B:
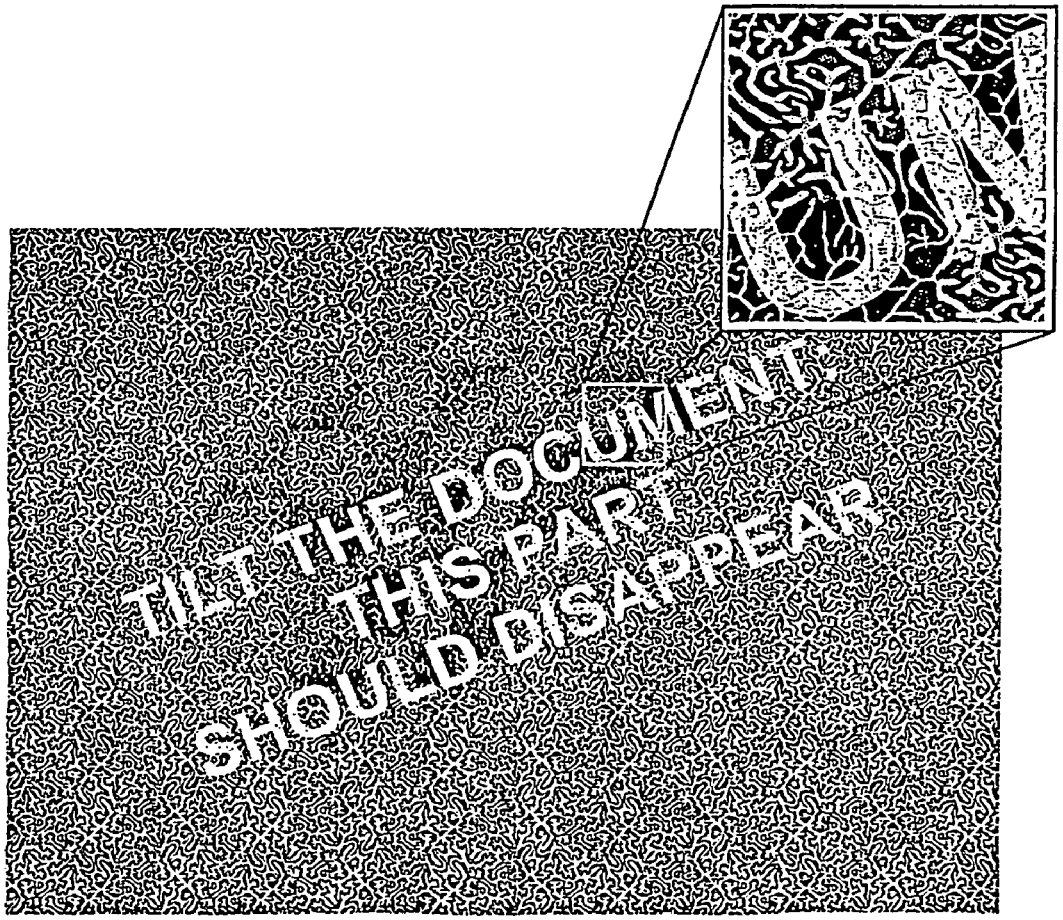
FIG. 35A shows a mask incorporating a visual message.
FIG. 35B shows a microstructure image at observation conditions where the mask shape within the microstructure image is clearly revealed.

Use of Special Inks such as Metallic and Iridescent Inks for Strengthening the Document Protection Special inks such as metallic or iridescent inks offer an even stronger protection against document counterfeiting attempts, since printing devices with at least one print cartridge with a special ink are not easily accessible to the general public. When observed from a given viewing angle, a special ink may have one given color, whereas, when seen from another angle, it may have a different color. This allows to embed a special ink in the parts of the target image specified by a mask, which when seen by an observer from a certain angle yields no difference with the surrounding parts and when seen from another angle conveys a distinct visual message, the message represented by the mask's shape. One way to embed a special ink into its surrounding parts is to measure its spectrum with a spectrophotometer according to a given measuring geometry, e.g. a collimated light source at 45 degrees and the light sensor at zero degree (which is for example the geometry of the Gretag SPM 500 spectrophotometer). From the measured spectrum, one may obtain the corresponding CIE-XYZ values (the formula for converting a spectrum to a tri-stimulus CIE-XYZ value is given in the book: G. Wyszecki and W. S. Stiles, Color Science, 2nd edition, J. Wiley, 1982, pp. 155–158) characterizing the basic color of the special ink under these viewing conditions. The basic color of the special ink is then used for the color separation of the original image (see above the section "Generation of microstructure images by Multicolor Dithering", paragraph on color separation by tetrahedrization). Parts of an original input color image to be rendered with a special ink may be rendered by a combination of that special ink and of other basic colors, e.g. three other basic colors. This technique allows to render an original image color either with or without the special ink. When it is rendered with a special ink, the special ink is, at certain observation conditions (e.g. a certain viewing angle), hidden within the target image. At a different observation condition (e.g. at a different viewing angle), the parts covered by the special ink are revealed. As an example, FIG. 35B shows a document seen from an angle where the parts covered by the special ink (e.g a metallic ink) reveal the message "TILT THE DOCUMENT, THIS PART SHOULD DISAPPEAR". The enlarged part of FIG. 35B clearly shows that this message incorporates the underlying microstructure, i.e. the underlying microstructure is printed at least partly with the special ink.

In a similar manner, one may embed in a document an ultra-violet ink§ which is hidden in the dithered image under normal viewing conditions (its tri-stimulus CIE-XYZ values, measured and computed as shown above, allow to embed the ultra-violet ink in dithered images). But, under ultra-violet light, due to the fluorescence of ink under ultra-violet light, the parts covered by the ultra-violet ink will be revealed, for example: "THIS IS A VALID DOCUMENT".

A similar behavior may also be expected from phosphorescent inks: under normal viewing conditions, the phosphorescent ink is hidden in the dithered image (its tri-stimulus CIE-XYZ values, measured and computed as shown above, allow to embed the phosphorescent ink in dithered images). But, when put in the dark after exposure under light, the parts covered by the the phosphorescent ink will be revealed, for example, "THIS IS A VALID DOCUMENT".

Use of Fluorescent Inks for Strengthening the Document Protection

Fluorescent inks can be used to offer a further level of protection since they are not available on standard desktop printers. Since these inks tend to fade away, these inks may be used in security documents having a relatively short life time, for example travel documents, visas, airplane tickets or entrance tickets. The spectrum of a fluorescent ink can be measured by a photospectrometer, converted into a CIE-XYZ value which is then used for color separation as explained in the previous section "Use of special inks". If the fluorescent ink is the dominant ink, its fading effect may completely distroy the microstructure and therefore considerably modify the global image. This allow to produce security documents with a limited life time.

Automatic Synthesis of a Dither Matrix

In many applications it is important to be able to generate the dither matrix on the fly, preferably starting from a simple bitmap image (e.g. a black-white image, 1 bit/pixel) incorporating the microstructure's original shapes. Such applications include the generation of images with security features for use in security documents, which may need to be customized and possibly personalized according to their content, i.e. their microstructure must vary depending on the content of the document which is to be generated.

In addition several methods are proposed for equilibrating a dithered image, avoiding large spots with predominantly single color surfaces such as white or black surfaces.

Symbols, logos, text and other pictorial elements can be represented as bilevel bitmaps. Bi-level bitmaps can also be obtained by scanning black-white pictorial elements printed on paper.

Automatic generation of dither matrices from bitmap images relies on the application of morphological operators (see An introduction to morphological image processing, by E. Dougherty, chap. 1, 3, pp. 3–18, 66–75, SPIE Press, 1992). It also relies on re-ordering operations which are applied to sets of successive pixels obtained during skeletonization by morphological operators. The input bitmap can be of arbitrary size. Since the resulting dither array tiles the output image plane, the operators are applied in a wrap-around manner. Coordinates of pixels are computed modulo the width and height of the bitmap. Various operators and combinations of operators as well as various re-ordering operations are applied to the bitmap in order to generate the target dither array.

Shape Thinning for Obtaining the Foreground Dither Threshold Values.

The first part of the dither array generation method consists in determining the cells which will contain the foreground dither threshold values (cells with low values are set first when dithering the picture, they are usually part of the foreground of the shape). The preferred way to achieve this is to apply a thinning algorithm (FIG. 17) on the original bitmap and generate a list of pixel coordinates. In the present embodiment, one cell in the dither array corresponds to one pixel in the input bitmap. We use the thinning algorithm presented in Fundamentals of Digital Image Processing, by Anil K. Jain, chap. 9, pp. 381–389, Prentice Hall, 1989, which yields connected arcs while being insensitive to contour noise.

Figure 17:
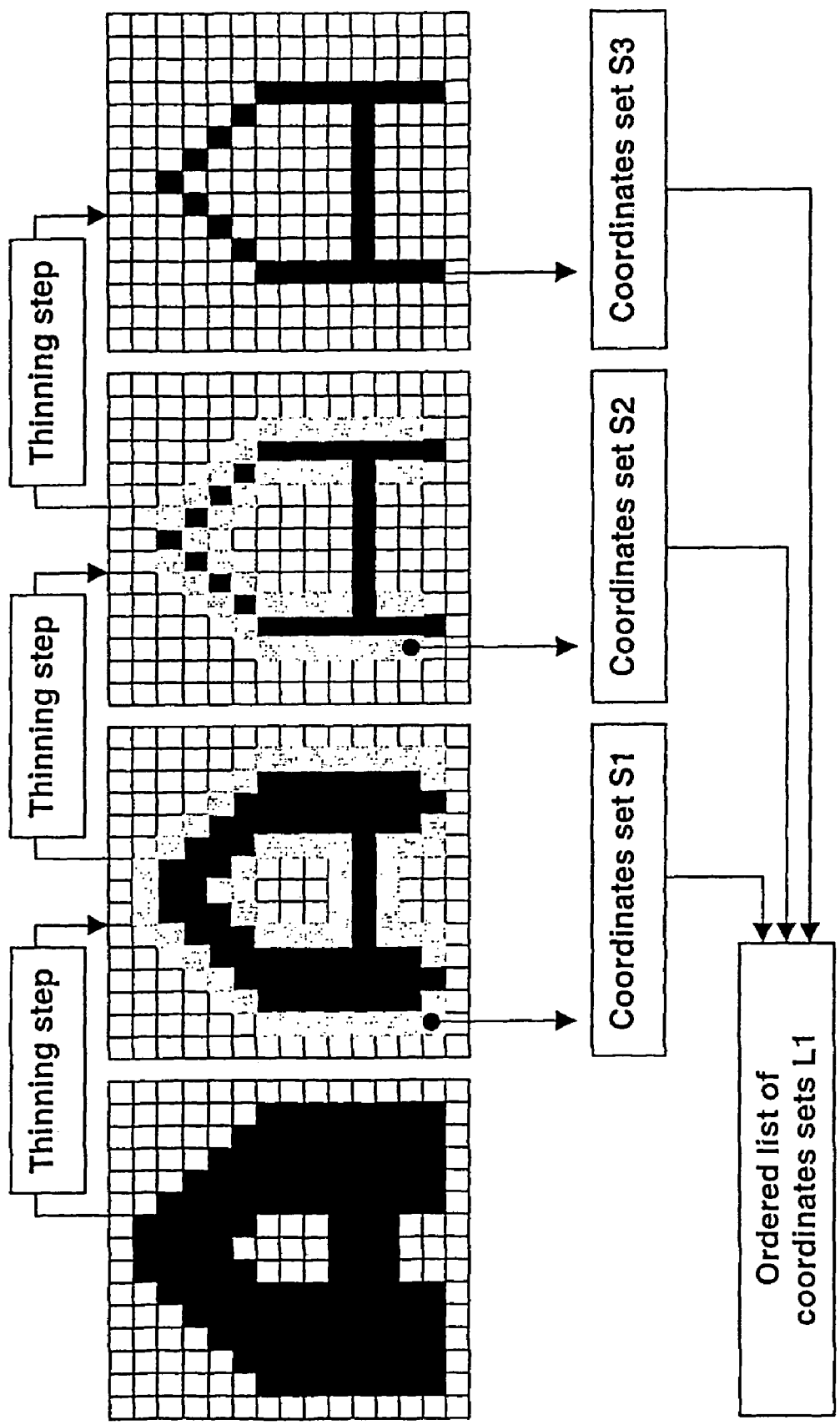
FIG. 17 show the application of a thinning operator to a bitmap with typographic character A and the resulting ordered list L1 of coordinate sets S1, S2, S3 representing successively erased discrete contours and the remaining skeleton.

While applying the thinning algorithm to the bitmap, each thinning step i provides a set Si of pixel coordinates. These pixels form the contour of the current shape, obtained by the previous thinning step; their set of coordinates is hereinafter called "contour pixel coordinates". The algorithm stops when the bitmap skeleton is obtained. The skeleton is the shape obtained when one further thinning step would have no effect (FIGS. 18A, 18B). The set of coordinates provided by one thinning step Si is appended to an ordered list of sets L1 (FIG. 17).

The second part of the array generation consists in determining the cells which will contain the higher dither threshold values of the dither array (cells with high values compose the background of a dithered picture). The corresponding pixels are usually part of the background of the initial bitmap image (e.g. the background of letter A in FIG. 17). Many morphological operators, as well as combinations of them can be used to do so. We present two methods, both based on the dilation and thinning operators, the second method being applied to the inverse bitmap (video inverse), where black pixels become white and vice-versa. Hereinafter, we call the inverse bitmap "dual bitmap" (FIGS. 19A, 19B).

To determine the higher dither values of the array, we could repetitively apply a dilation operator to the original bitmap. Morphological dilation allows to create new, bolder contours by growing a shape until it fills the entire bitmap space. However, little holes within the original bitmap are quickly filled while larger areas remain empty, blurring the contours of the microstructure shape after a few dilation steps. With methods such as method I and II presented in the next paragraphs, we constrain the dilation so that small gaps are preserved, while larger empty spaces are used to grow the shape.

I. Alternated Dilation for Background Dither Array Values (FIG. 33A).

To compute the remaining array cells, we use the dual skeleton. The dual skeleton is obtained as the result of the thinning (iterative erosion) process applied to the dual bitmap (FIGS. 20A and 20B). We start the growing process with two patterns which are the initial bitmap (pattern 1, FIG. 18A) and the dual skeleton (pattern 2, FIG. 20B).

Figure 21:
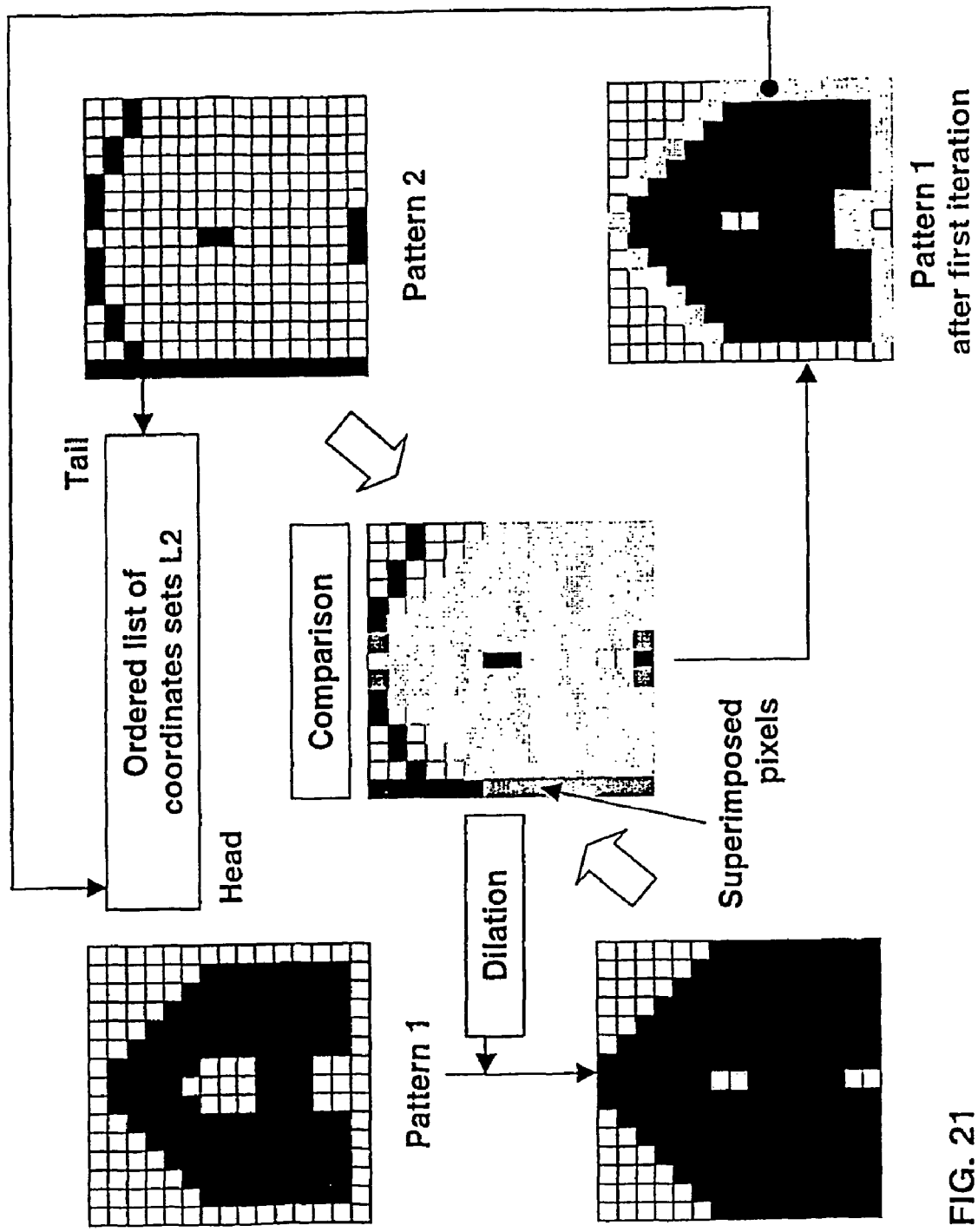
FIGS. 21 and 22 illustrate the two first steps of the alternated dilation algorithm.
Figure 22:
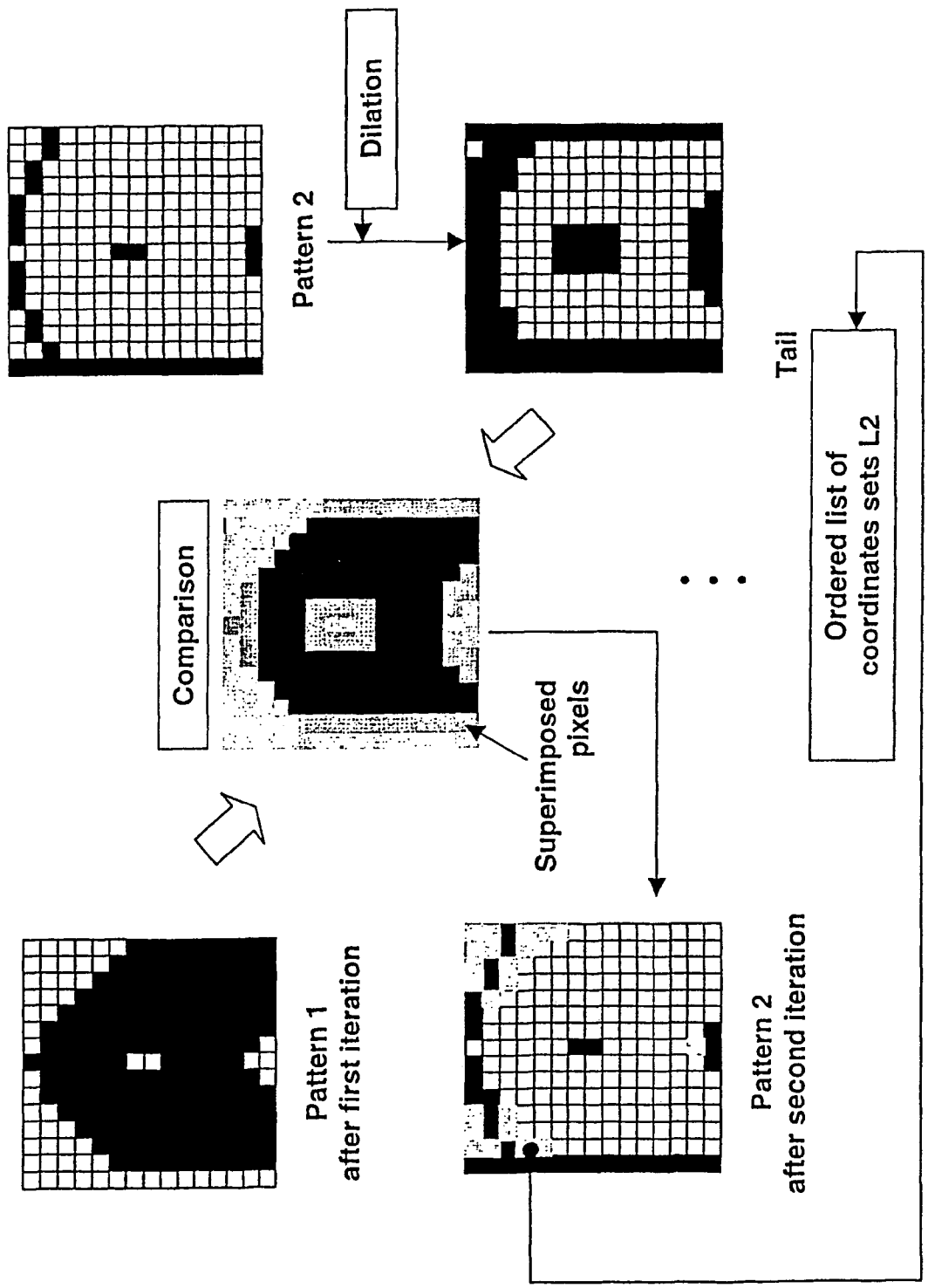

At each step of this alternated dilation method, a dilation operator is applied consecutively to pattern 1 (FIG. 21), then to pattern 2 (FIG. 22). The dilation operator takes into account the result of the previous step carried out on the opposite pattern: in each dilation step, new pixels are marked. If a particular dilation step tries to dilate a pixel marked by a previous step (superimposed pixels), the dilation is ignored. For example, when the pixel set by the dilation operator operating on pattern 1 is located on pattern 2, the pixel is not set. We maintain a set Sm of coordinates of the altered pixels in the patterns at each step m of the algorithm. Each of these sets is appended to an ordered list of sets L2 (FIG. 22). For the two first steps, pixels part of the skeleton and dual skeleton are considered as the sets S0 and S1, located in the first and second place in the list L2. By construction, the content of each set Si is not ordered.

II. Dual Bitmap Thinning (Thinning of Background)

Figure 23:
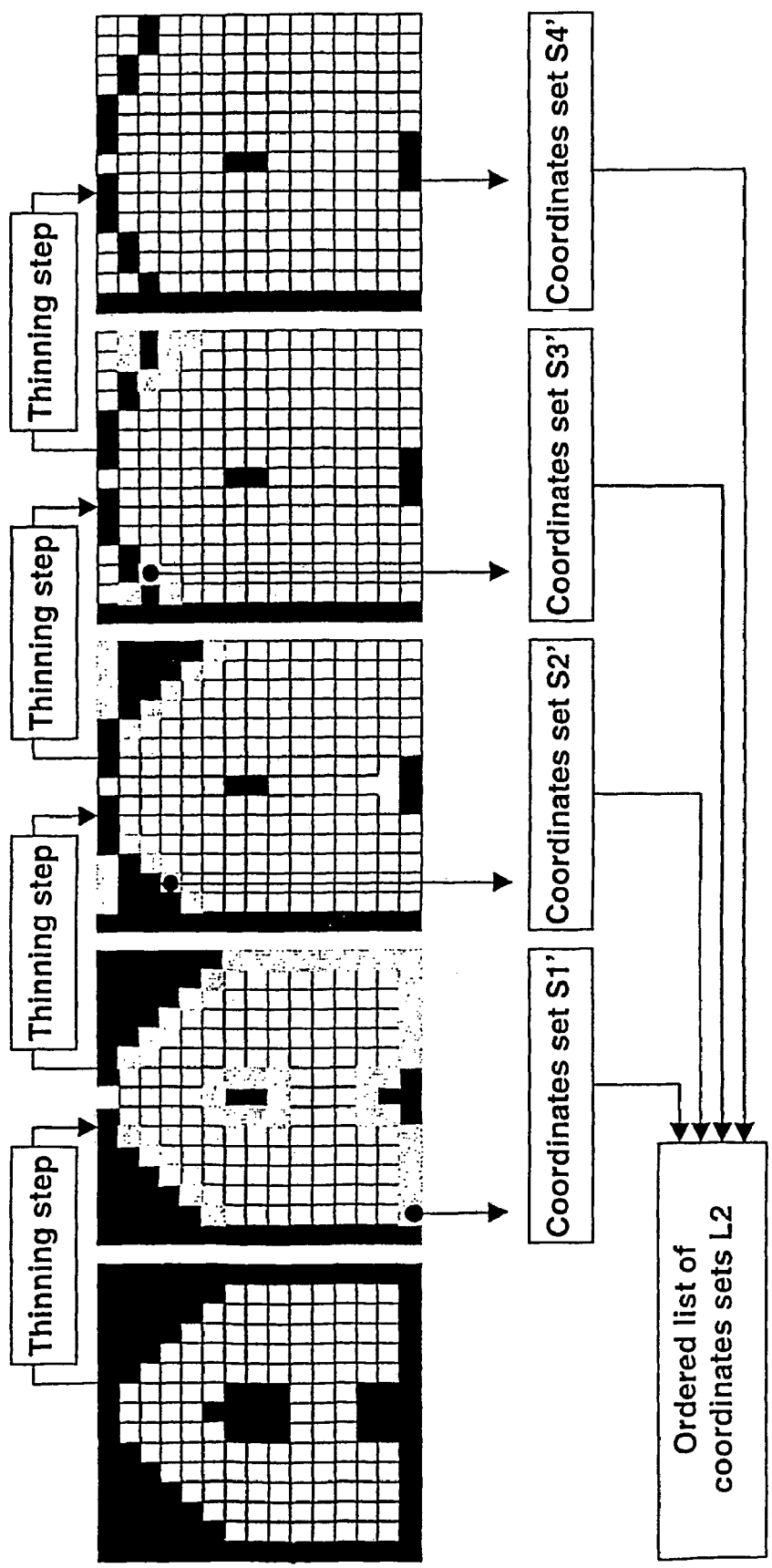
FIG. 23 shows the thinning steps applied to the dual bitmap (dual bitmap thinning)

Another way to determine the position of the background dither array values is to use only the succession of steps occurring during dual bitmap thinning as a criterion (dual erosion). This corresponds to the same process as was used to determine the foreground dither array values (lower values in array), except that the dual bitmap is given as input to the algorithm, instead of the original bitmap itself (FIG. 23). The result of this operation is the same as with alternated dilation: we obtain an ordered list of sets L2, but the dither array shape grows differently. FIG. 33B shows an example where the background becomes darker according to the succession of contour pixel coordinates obtained by dual thinning. The few first contour pixel coordinates obtained by dual bitmap thinning are put at the end of list L2 in order to ensure that the white outline around the initial bitmap microstructure shape (here an "A") is darkened only at the highest darkness levels. This allows to preserve the microstructure shape also in very dark parts of the dithered image (90% darkness).

Figure 34:
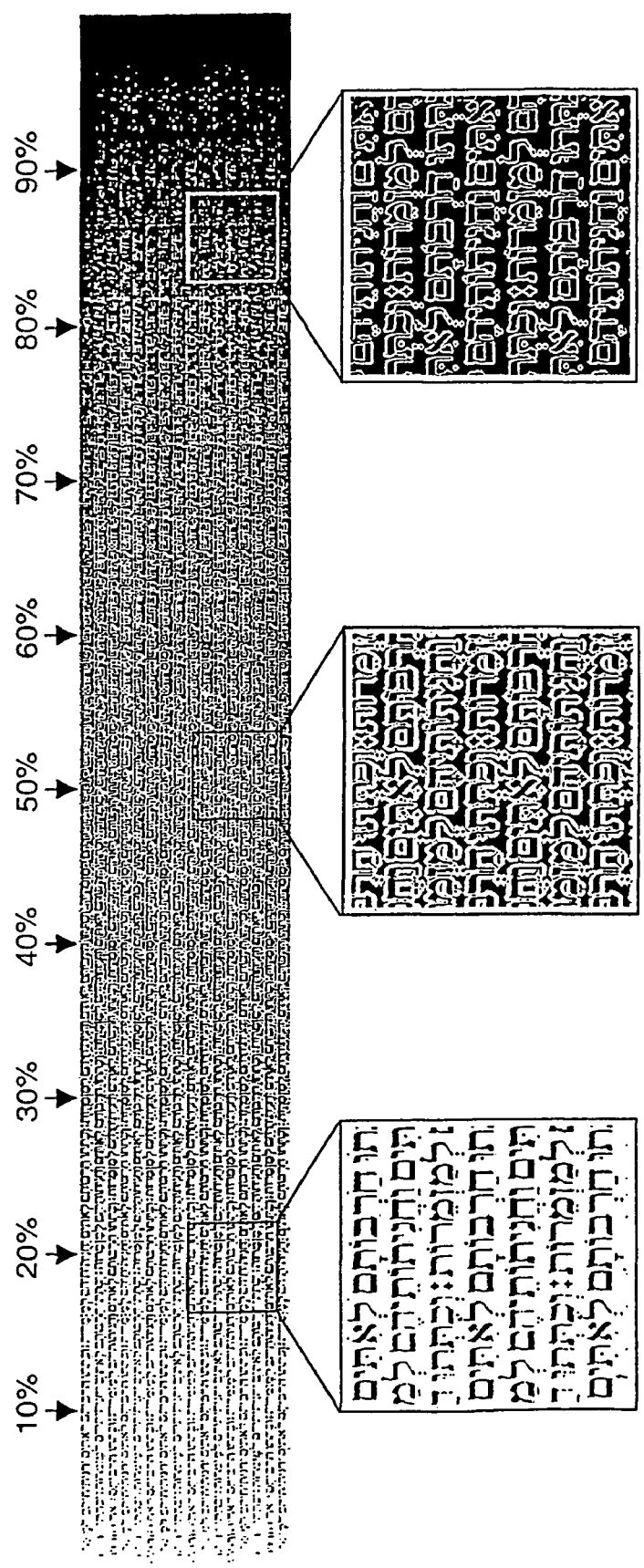
FIG. 34 shows an example of a wedge where from a darkness of 25%, the background grows and starts surrounding the foreground shape (Hebrew letters), leaving even at a high darkness a small white gap between shape foreground and shape background.

Merging Lists of Sets of Pixel Coordinates L1(Foreground) and L2 (Background) into One List L The two first parts of the array generation (the first part is shape thinning and the second part is either alternated dilation or dual bitmap thinning) provide two lists of sets L1 and L2, each set containing pixel coordinates. These lists can now be merged together by simply appending the second list to the first one, resulting in a single list L. This ordered list of bitmap pixel coordinates is used for creating the dither array, see section "Renumbering of dither cells". More sophisticated merging operations can be realised. For example one may equilibrate the distribution of black pixels in a tile by alternating the sets in the list L, one from L1, one from L2. In FIG. 34 shows another example of creating list L", where the discrete contour pixel coordinates lists Si' associated to the background are obtained by alternated dilation. However they are inserted in a different order into list L2 so as to obtain a shape growing from the background until it reaches the initial foreground bitmap shape (shape described by pixel contours in list L1). Lists L2 and L1 are merged to form list L. The particular shape growing behavior shown in FIG. 34 ensures that the microstructure shape remains apparent even at very dark levels (close to 90% darkness).

Renumbering of Dither Cells

The last part of the dither array generation is the creation of a dither array of the size of the original bitmap and the numbering of the dither array cells according to the position of corresponding bitmap pixels in list L. To avoid scan lines artefacts and ensure regular filling of the contours, pixels from the same set Si are picked up in a random order.

Figure 24:
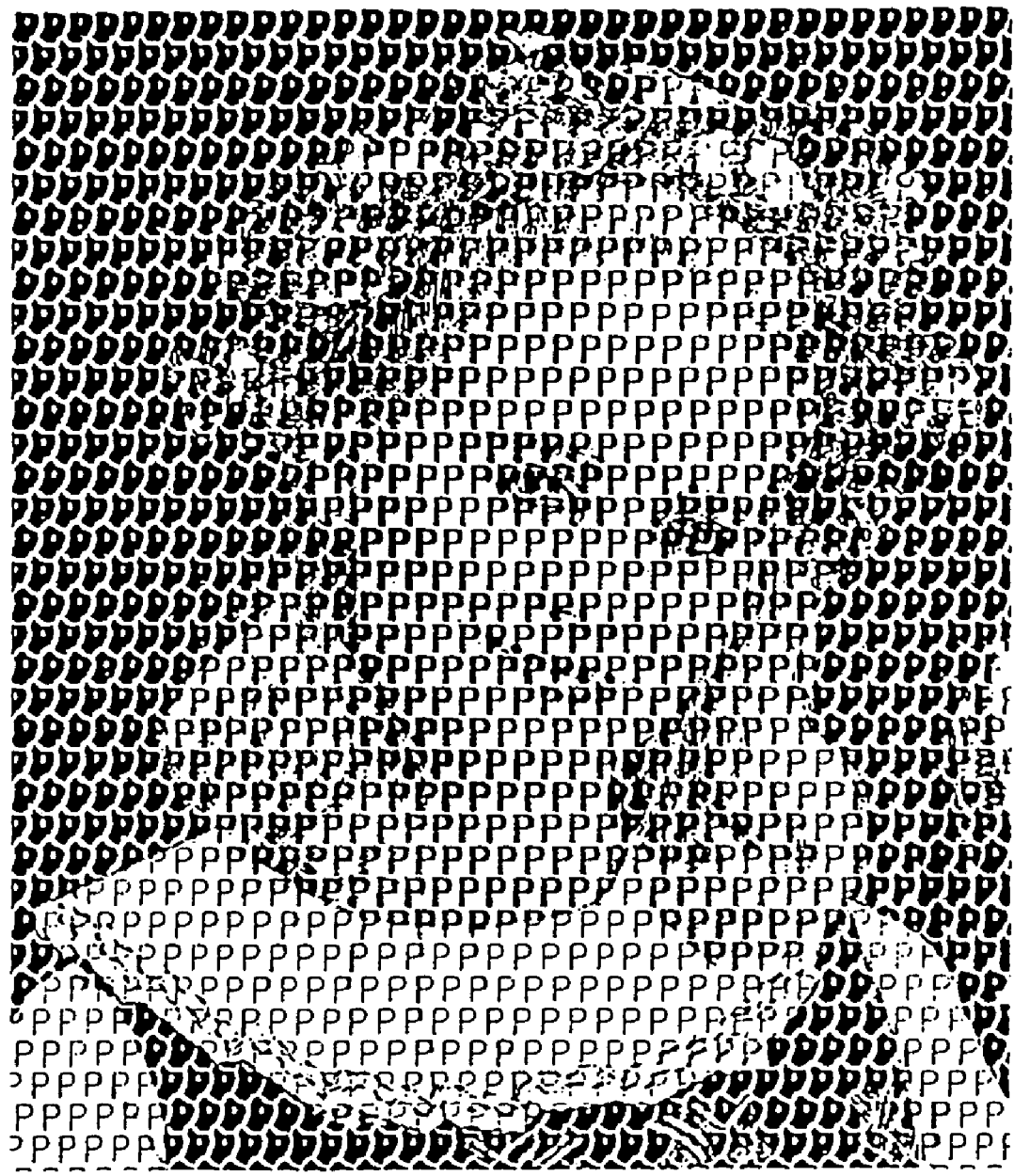
FIG. 24 shows an example of an image rendered without equilibration.
Figure 28:
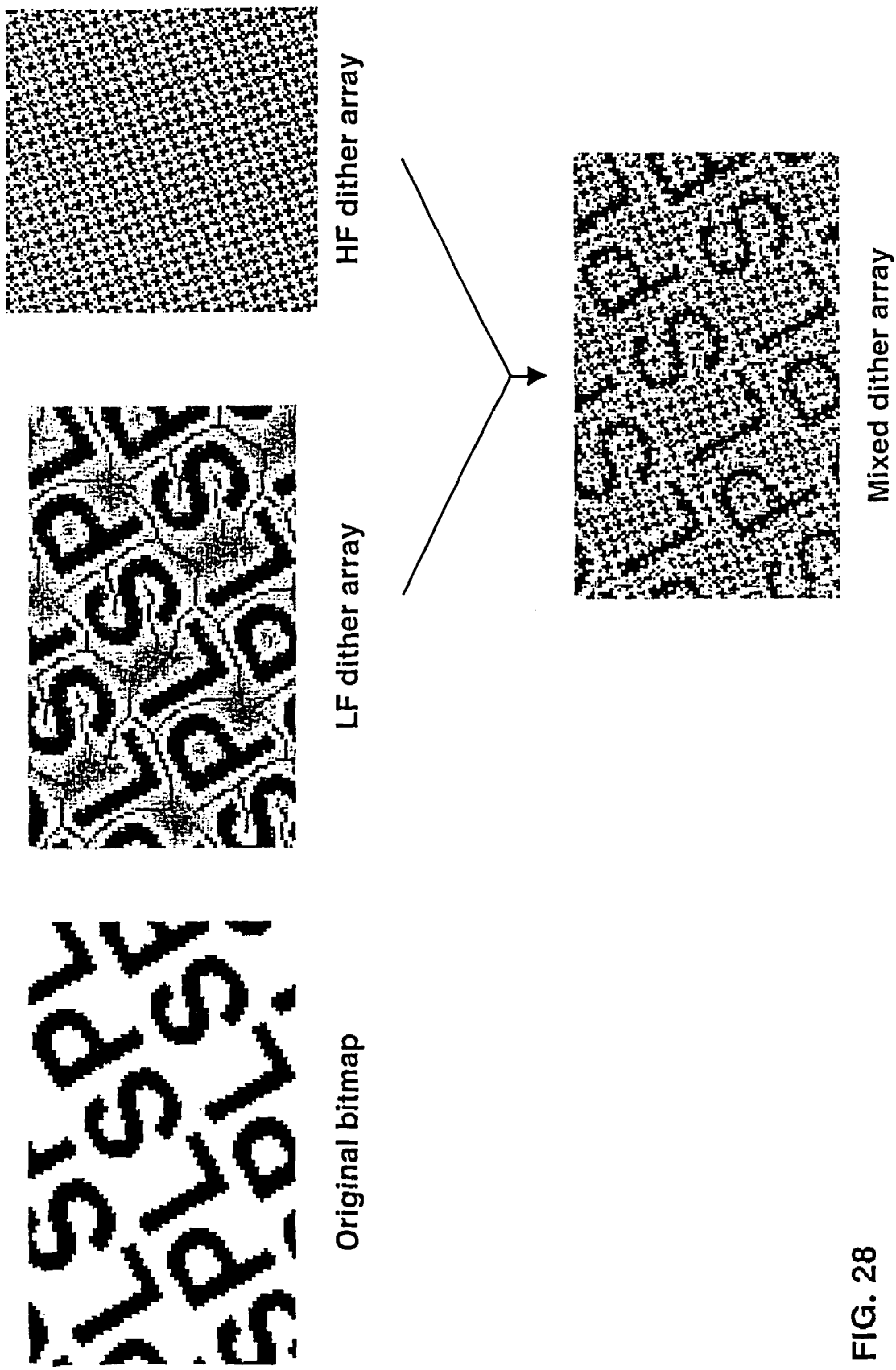
FIG. 28 illustrates the low-frequency (LF) dither array, the high frequency (HF) dither array and the mixed dither array.

Synthesizing an Equilibrated Dither Array by Combining a Low and a High frequency Dither Array Since motifs (microstructure shapes) incorporated in large dither arrays may not be well balanced, visually disturbing artefacts like alternating light and dark stripes may appear within the dithered image generated with a dither array obtained by the methods described above (FIG. 24). This phenomenon is accentuated by dot gain since middle and dark tones tend to become darker. In order to avoid such artefacts in the target image, it is important to equilibrate either the dither array or the final dithered image. Let us first describe one possible method for equilibrating the dither array based on the combination of the low frequency (LF) dither array synthesized from the initial bitmap and a high frequency (HF) dither array. The idea is to insert the high-frequency dither array in the background of the equilibrated dither array (FIG. 28). The term "high-frequency dither array" is used as generic term meaning that its embedded pattern is of significantly higher frequency than the microstructure embedded within the low frequency dither array.

In order to generate the equilibrated dither array, we first take the dither values of the L1 list corresponding to the foreground of the dither array. We then take the L2 list with the dither values of the background of the dither array. We remove from the L2 list one or several successive contours (e.g. pixel set Sp' and Sp+1') in order to create a clear separation between the foreground and the background of the microstructure shape. We associate to the sets of cells which have been removed from the L2 list (e.g. pixel set Sp' and Sp+1') the highest possible threshold values yielding the background color even at a high foreground color intensity. In the case where the foreground is black or respectively has a saturated basic color, this ensures that these cells remain white even at a high darkness or respectively at high saturation. We then replace the remaining background cells (e.g. L2 minus the removed pixel sets Sp' and Sp+1') with the content of a high frequency dither array. This high frequency dither array, for example the dither array disclosed in U.S. Pat. No. 5,438,431, and in the article (V. Ostromoukhov and R. D. Hersch, "Multi-Color and Artistic Dithering", Siggraph'99, Computer Graphics Proceedings, Annual Conference Series, 1999, pp. 425–432) comprises dither levels covering the full range of dither values. For improved protection the high frequency dither array may also incorporate tiny shapes incorporating a 3rd level of information such as symbols, characters or numbers (for example the greek frize in FIG. 27, zoomed out on the bottom left).

Figure 29A:
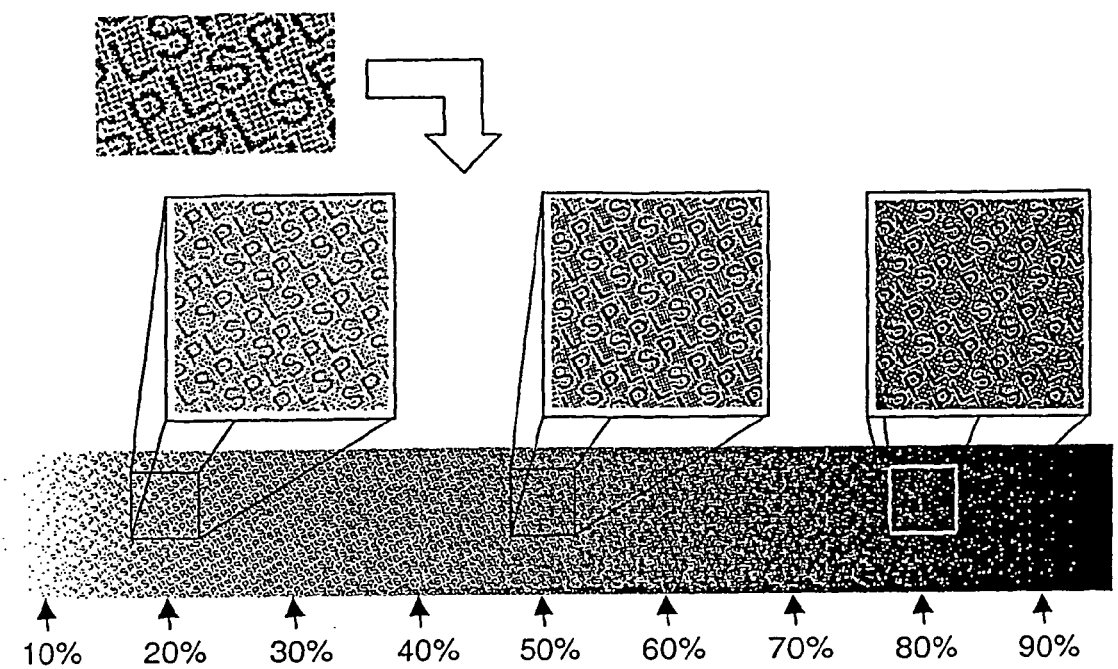
FIG. 29A shows the resulting mixed dither array and its application to dither a gray wedge.
Figure 29B:
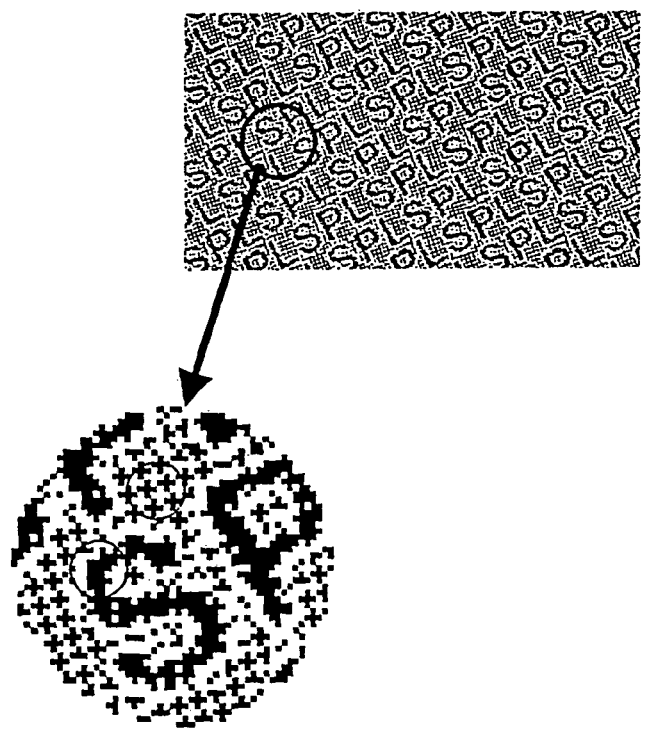
FIG. 29B shows an enlargement of a constant intensity patch dithered with the resulting mixed dither matrix, at a 50% midtone.

The dither values of cells belonging to the foreground of the dither array (set L1) are numbered and scaled in order to also cover the full intensity range or at least a significant part of it. In order to avoid scan lines artefacts and ensure regular filling of the contours, cells belonging to a same set Si are picked up randomly and given successive dither threshold values. FIG. 28 shows the resulting equilibrated dither array combining a low frequency dither array incorporating the microstructure and a high-frequency dither array. FIG. 29A shows a wedge and FIG. 29B a uniform intensity patch rendered with the equilibrated dither array.

When compared with the iterative equilibration technique described in V. Ostromoukhov, R. D. Hersch, "Multi-Color and Artistic Dithering", Siggraph'99, Computer Graphics Proceedings, Annual Conference Series, 1999, pp. 425–432, the presented method is much faster and more accurate, since it equilibrates the dither matrix specifically for the original image. There is no need to apply the equilibration to a large set of input intensity levels, neither to carry out several iterations.

Mixing a low-frequency dither array with a high-frequency dither array in this manner improves local equilibration, but also induces a global tonal modification. In order to establish the reproduction curve used for tonal correction, one may print patches at different intensities, measure their density and deduce their surface coverage values, as is known in the art.

An alternative means of improving the tone reproduction behavior consists in reassigning dither threshold values to the cells in the list L1 in such a way that for each intensity level to be reproduced, the number of added foreground pixels corresponds to the number of pixels that would have been added if the high-frequency dither array had been used in the area covered by the microstructure shape. This number can be easily computed by applying a mask corresponding to the foreground of the bitmap onto the high-frequency dither array and count the number of pixels reproducing the desired foreground intensity level. By applying this procedure for consecutive discrete intensity levels, we select successive cells within successive sets of cells from list L1 (again by picking each cell randomly within a single set Si) and assign to each of them a dither threshold level corresponding to the current discrete foreground intensity level.

Target Image Equilibration by Postprocessing

A second possible method for equilibration compensates the uneven local surface coverage of the ink in the dithered picture by taking a portion of the foreground pixels (black) and redistributing it to the background regions (white). It uses a high-frequency dither matrix to locate the pixels to be redistributed. High-frequency pixel redistribution takes into account the dot gain and an approximation of the human visual system transfer function.

For this purpose we need to detect the regions in the dithered picture that do not match accurately enough the intensity of the original image. As proposed by V. Ostromoukhov and R. D. Hersch, (in "Multi-Color and Artistic Dithering", Siggraph'99, Computer Graphics Proceedings, Annual Conference Series, 1999, pp. 425–432), we simulate the dot gain by adding to each pixel the darkness or color intensity value representing the dot grain of neighbouring pixels, e.g. horizontal and vertical neighbours contribute with a weight of 20% and diagonal neighbours contribute with a weight of 5%. We then apply a Gaussian low-pass filter approximating to some extent the low pass behaviour of the human visual system transfer function (HVS filter). The resulting filtered dithered image, hereinafter called "perceived dithered image" is compared with the original image and the difference image, called "deltamap" is then used for equilibrating the target image. The radius of the low-pass filter depends on the viewing distance and the resolution of the picture.

Based on the estimation of about 30 cycles per degree for the cutoff frequency of the human visual system (Handbook of perception and human performance, L. Olzak, J. P. Thomas, chap. 7, pages 7–1 to 7–55, J. Wiley, 1986), we approximate the human visual system transfer function (hereinafter called "HVS filter") by the Gaussian function $F(q)=\text{Exp}(-pq^2)$, where the unit on the frequency axis (q-axis) corresponds to the cutoff frequency of 30 cycles per degree. The corresponding impulse response, i.e. the inverse Fourier Transform of F(q), is also a Gaussian function, $f(r)=\text{Exp}(-pr^2)$, whose unit (r-axis) corresponds to $\frac{1}{30}$ degree of visual angle. To produce the discrete convolution kernel, the Gaussian impulse response function is sampled on a 5s×5s grid, where the standard deviation $s=1/\text{Sqrt}(2p)$. For different printing resolutions as well as for different observation distances (e.g. for posters to be observed from far away) the discrete convolution kernel needs to be recomputed accordingly.

For example, at 1200 pixels per inch and at an observation distance of 25 inches the visual angle formed by one inch is in degrees $a=(\frac{1}{25}*360/2p)$. A visual angle of $\frac{1}{30}$ of degrees, where screen element details should disappear, corresponds to $(1200/a)*(\frac{1}{30})=17.45$ pixels and $s=1/\text{Sqrt}(2p)$ corresponds on our pixel grid to $17.45/\text{Sqrt}(2p)=7$ pixels. A convolution kernel of size 5s×5s corresponds in this example to a kernel of size 35×35 pixels.

Figure 25:
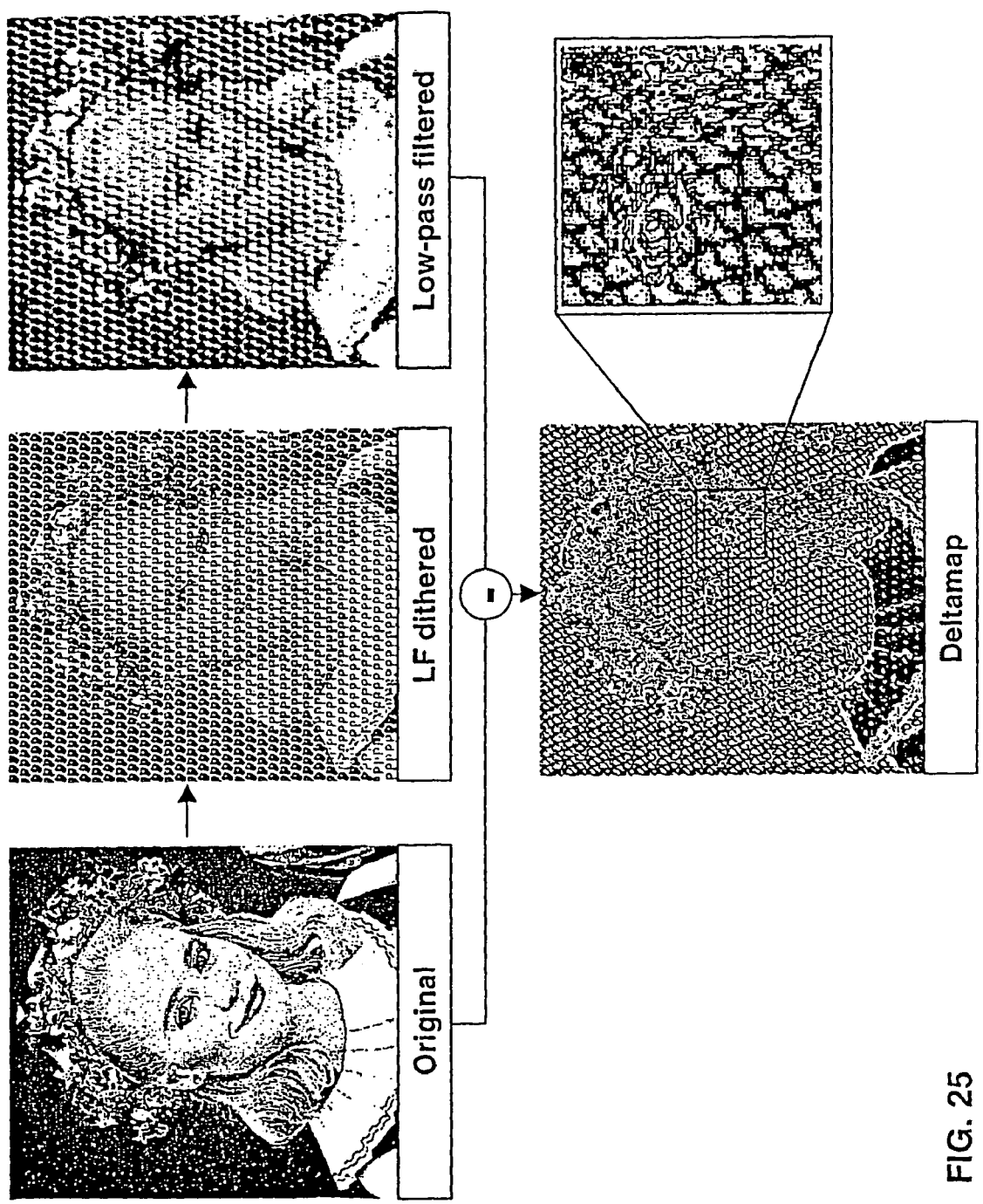
FIG. 25 illustrates the application of a low-pass filter on the dithered image and the comparison with the original picture yielding a deltamap.

After applying dot gain simulation, human visual system filtering and comparison between the original and the perceived dithered image, we obtain a delta map $Dm(x,y)$, composed of the pixel by pixel intensity differences between the initial input image $P(x,y)$ and the perceived dithered image $H'(x,y)$ (what is "seen"). Negative deltas indicate that the dithered picture is "seen" too bright locally, while positive deltas indicate that it is "seen" too dark. For convenience, the deltamap is computed as 2's complement 8 bit numbers. FIG. 25 shows a schematic view of the steps necessary to obtain the delta map. In the resulting printed deltamap, positive values are expressed by dark intensity levels (black=0 means no change, 1 means add 1, etc . . . ) and negative values are expressed by high intensity levels (white=255 means subtract 1, 254 means subtract 2, etc . . . on a 256 intensity level range).

We need to add a number of black pixels in the dithered image to compensate for a too high brightness, and remove a number of black pixels where the picture is seen too dark. In our delta map, positive values can be seen as the proportion of white to be added to black areas to reach the desired local gray level. Negative values represent the proportion of white to be removed from white areas.

The delta map $Dm(x,y)$ is dithered with a high frequency dither array resulting in a dithered deltamap $Dmd(x,y)$. This dithered deltamap $Dmd(x,y)$ is composed with the dithered image $H(x,y)$ as follows. In areas where the delta map is positive, i.e. in black areas where black pixels need to be removed, the dithered deltamap $Dmd(x,y)$ is ORed with the dithered image $H(x,y)$. New white pixels will appear in the black parts of the dithered image. In areas where the delta map $Dm(x,y)$ is negative, i.e. in white areas where black pixels need to be added, the dithered deltamap $Dmd(x,y)$ is ANDed with the dithered image. $H(x,y)$ yielding the final equilibrated dithered image $Q(x,y)$. New black pixels will appear in the white parts of the dithered image.

Figure 26:
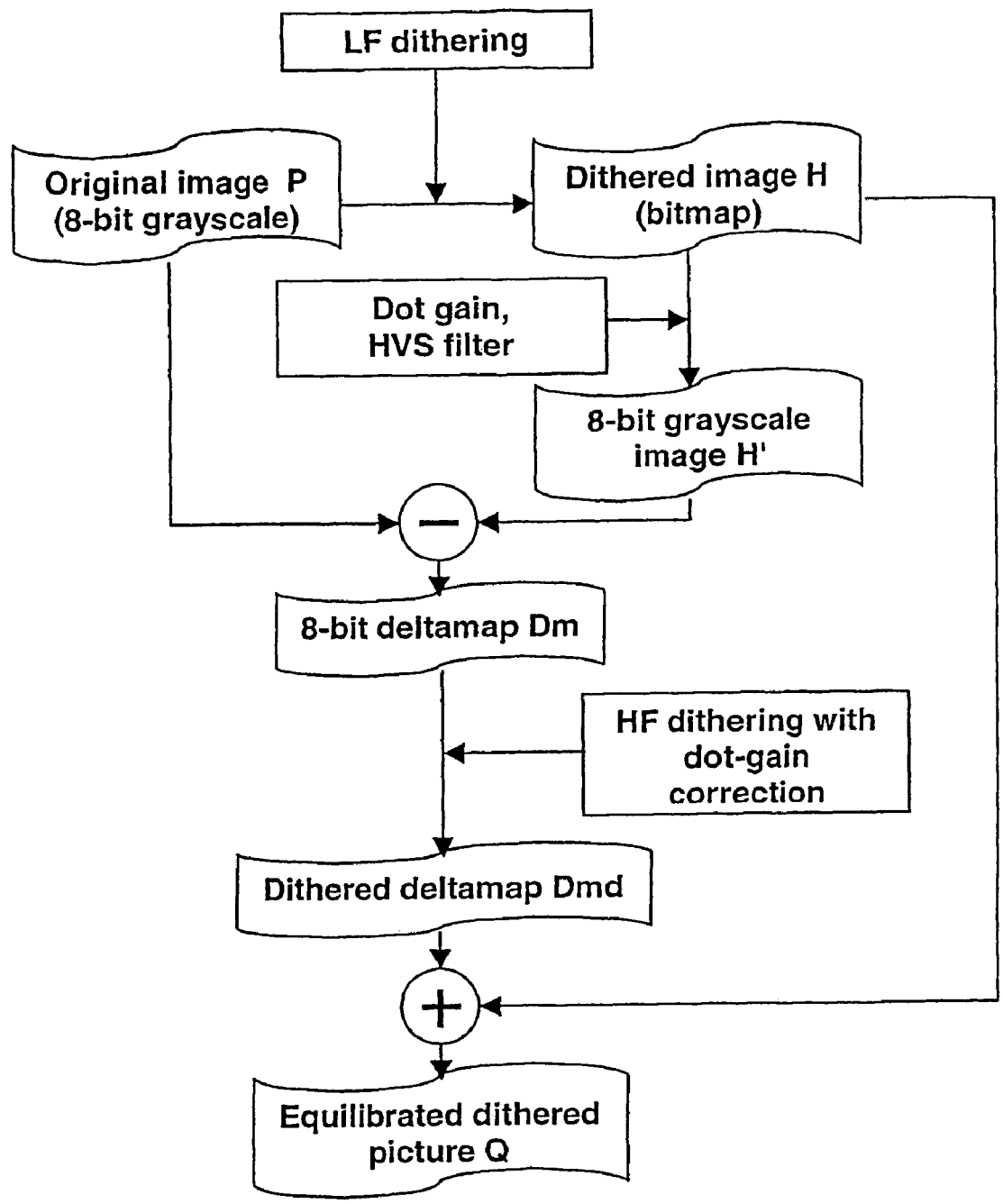
FIG. 26 is a flow diagram showing the equilibration of a dithered picture by post-processing.

In order words, as shown in FIG. 26, in a preferred embodiment the following logical operations are performed:

$Dm(x,y)=P(x,y)-H'(x,y)$, where the minus is the 2's complement minus on 8 bit values If $H(x,y)=0$ (black), $Q(x,y)=H(x,y)$ OR $Dmd(x,y)$;

If $H(x,y)=1$ (white), $Q(x,y)=H(x,y)$ AND $Dmd(x,y)$.

Figure 30:
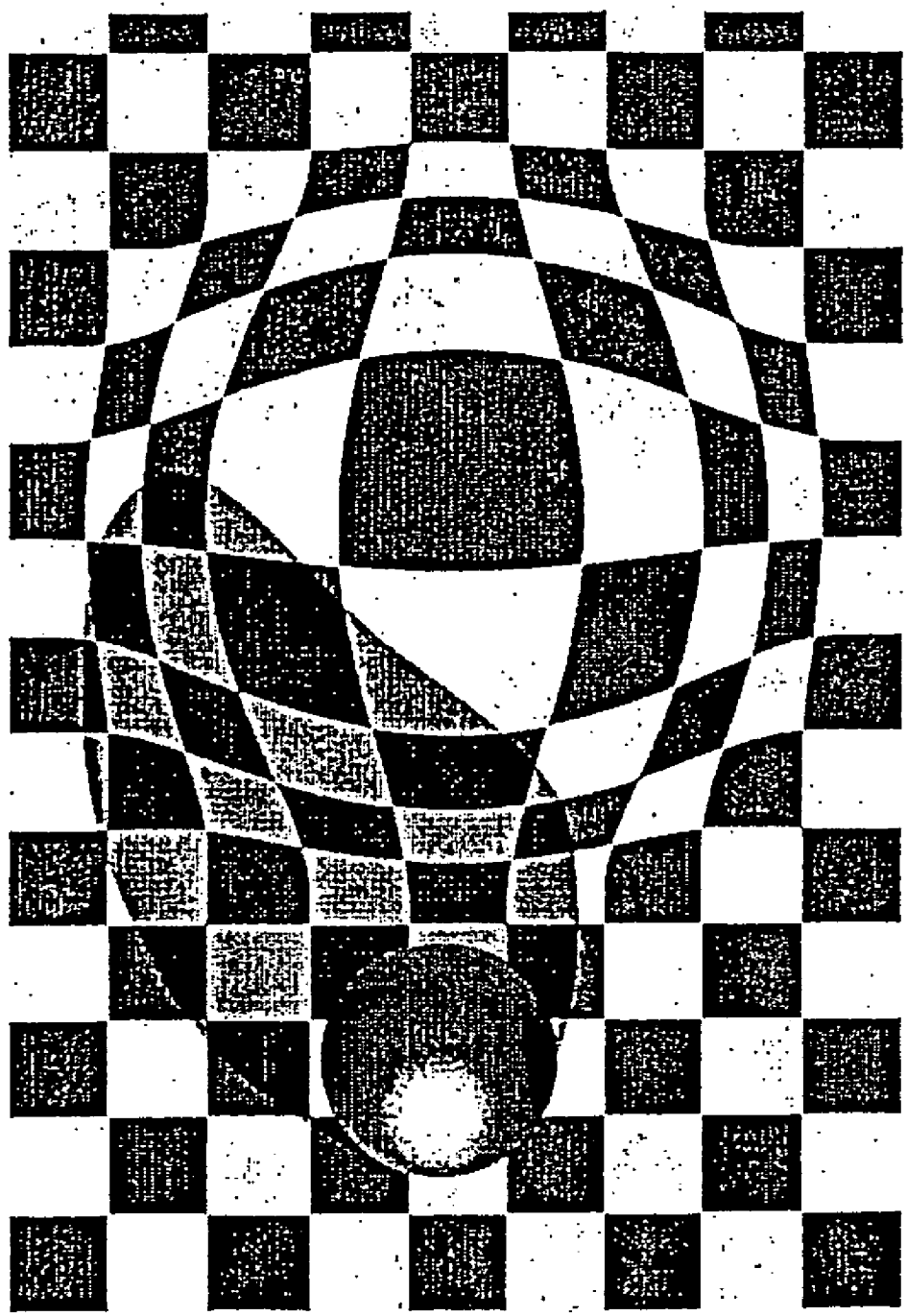
FIG. 30 shows an original image.
Figure 32:
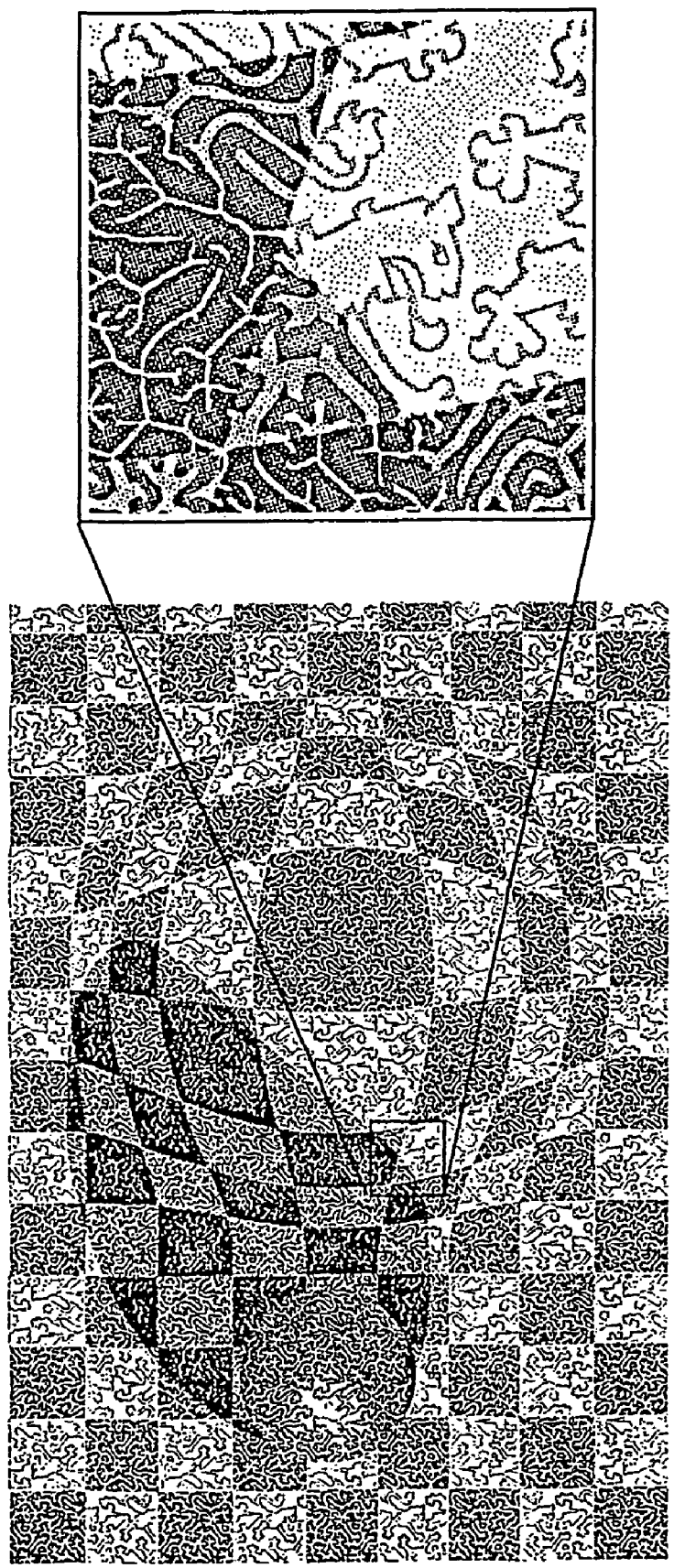
FIG. 32 shows the same image, dithered and equilibrated by post processing.

To provide adequate equilibration, the high frequency pattern present in the high-frequency dither array needs to be several times smaller than the low frequency pattern. Any dither array comprising very small clusters may be used. In the example shown in FIG. 32 (original in FIG. 30, dithered with only the low-frequency dither matrix in FIG. 31), we use as high frequency dither matrix the rotated dispersed dither matrix proposed by V. Ostromoukhov, R. D. Hersch and I. Amidror ("Rotated Dispersed Dither: a New Technique for Digital Halftoning", Siggraph'94, Computer Graphics Proceedings, Annual Conference Series, pp. 123–130, 1994) since it exhibits a semi-clustering behaviour at mid-tones. It is therefore less sensible to dot gain than dispersed-dot halftones. The high-frequency dither array may also incorporate a second level microstructure made of artistic patterns or tiny shapes such as symbols, characters or numbers (greek frize in FIG. 27).

It is important that the dot gain of the high-frequency dither array be correctly compensated. We can establish its tone reproduction behavior by printing a series of halftoned patches for different gray levels and measure their density. Using the Murray-Davis formula (H. R. Kang, Color Technology for Electronic Imaging Devices, SPIE Optical Engineering Press, 1997, section 2.2: Murray-Davis equation, pp 42–43), we determine the actual proportion of black on paper for each patch and compute the tone reproduction curve. During the equilibration process, the tone reproduction curve is used in order to compute for the deltamap values $Dm(x,y)$ tone-corrected deltamap values $Dm'(x,y)$ which are dithered to yield the dithered deltamap $Dmd(x,y)$. Equilibration by postprocessing is carried out in a single pass and is specific to the desired target image. It is therefore faster and more accurate than the iterative equilibration technique described in V. Ostromoukhov, R. D. Hersch, "Multi-Color and Artistic Dithering", Siggraph'99, Computer Graphics Proceedings, Annual Conference Series, 1999, pp. 425–432.

Automatic Production of Security Documents

It is possible to run a computer program operable for creating an original document image according to information related to said document, such as for example the type of the document, the name of the document holder, the issuing institution, the validity of the document, the background to be inserted into the document, etc . . . . Furthermore, a slightly different computer program may also automatically generate the bitmap incorporating the microstructure shapes by inserting text or graphics into a bi-level bitmap according to document related information. These computer programs may carry out operating system calls in order to embed text, graphics and images into a document image, respectively a bitmap and save that document image or respectively bitmap as a file on the computer running the program.

Such computer programs can be embedded into a preparation software module capable of generating both the original document image and the bitmap incorporating the microstructure shapes according to the information related to the target document to be created.

With such a preparation software module, a complete automatic security document production chain may be established: upon a specification of a security document by document related information the following steps allow to generate a security document:

(a) producing an original document image comprising said document related information;

(b) producing a bitmap incorporating microstructure shapes expressing said document related information;

(c) synthesizing a dither array with said bitmap;

(d) dithering the original document image with the synthesized dither array, thereby generating the security document, where both the global document level and the microstructure level incorporate document related information.

(e) equilibrating the dithered original image thereby producing the target security document Step (e) is optional and applied for improving the quality of the resulting target security document. The generated security documents are fully personalized, since both the original document image and the microstructure incorporate the document related information (e.g. the document shown in FIG. 36).

Generation of Security Documents via a Global Communications Network

Figure 42:
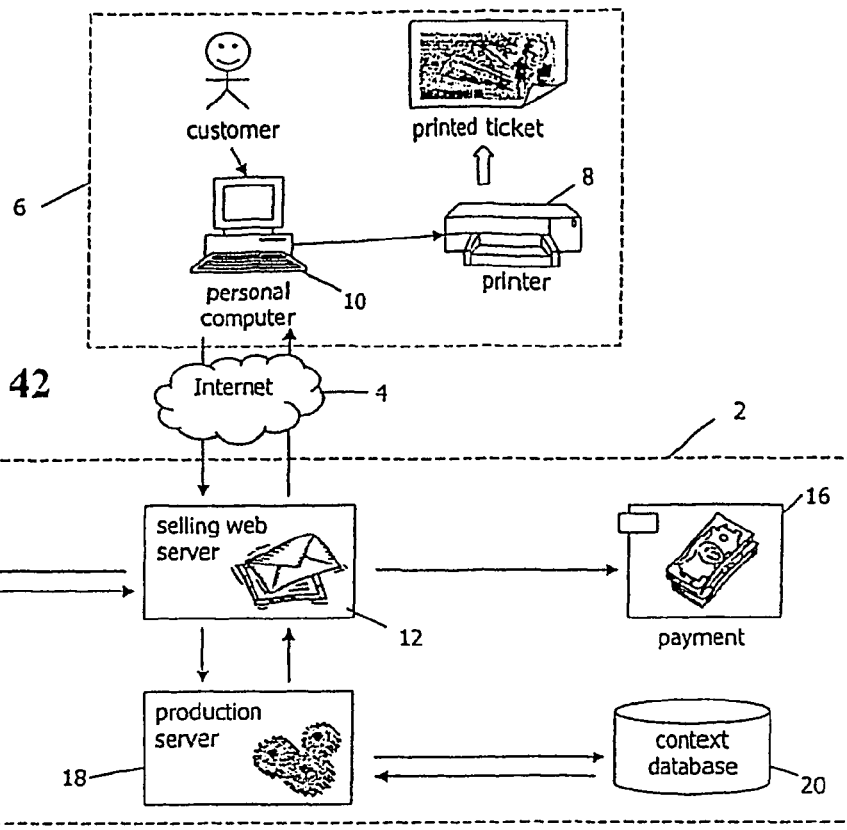
FIG. 42 is a schematic illustration of a distributed data processing system for implementing a method of generating a printed commercial instrument according to this invention.

Referring to FIG. 42, a web-based server system 2 for generating security documents such as commercial instrument printable files, is accessible via a global communications network such as the internet 4 by a user or a customer at a client site 6, having a printer 8 and a personal computer 10 or other computing means connected to the communications network 4. The server system may be a distributed system comprising servers or other data processing systems or databases at a single site, or at different sites interconnected with a communications network such as the internet, an intranet, or a local area network. The web-based server system 2 comprises a web server 12 including, or connected to, a customer database 14 in which information on customers is stored, a payment server or system 16, for example for effecting credit card payments, bank transfers and the like, and a production server 18 for performing calculations and other operations to create ticket images and package data files for transmission and printing. The production server may be interconnected to a context database 20 for storing background images and other information concerning the commercial instrument.

It will be understood by skilled persons in the art that the configuration of the above described server system may be modified without departing from the scope of this invention, the various servers and databases being depicted merely as examples in order to understand the function of a possible server system for generating printed commercial instruments according to this invention.

Figure 44:
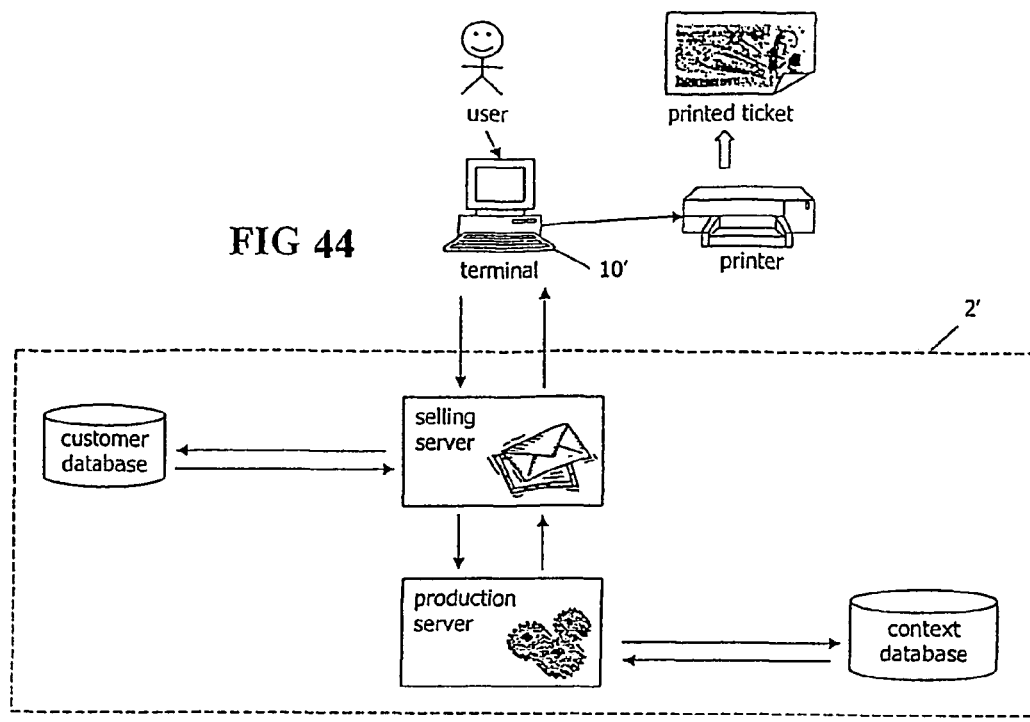
FIG. 44 is a schematic illustration similar to FIG. 42 of an enterprise server system for implementing a method of generating a printing commercial instrument according to this invention.

The server system for creating the commercial instrument may also be a proprietary system or an enterprise server system as illustrated in FIG. 44, whereby the user accesses the enterprise server system 2' through a local area network or direct connection from a terminal 10'. In this configuration, a user would typically be the issuer of the commercial instrument and the payment transaction would occur between the purchaser of the commercial instrument and the user.

Figure 45:
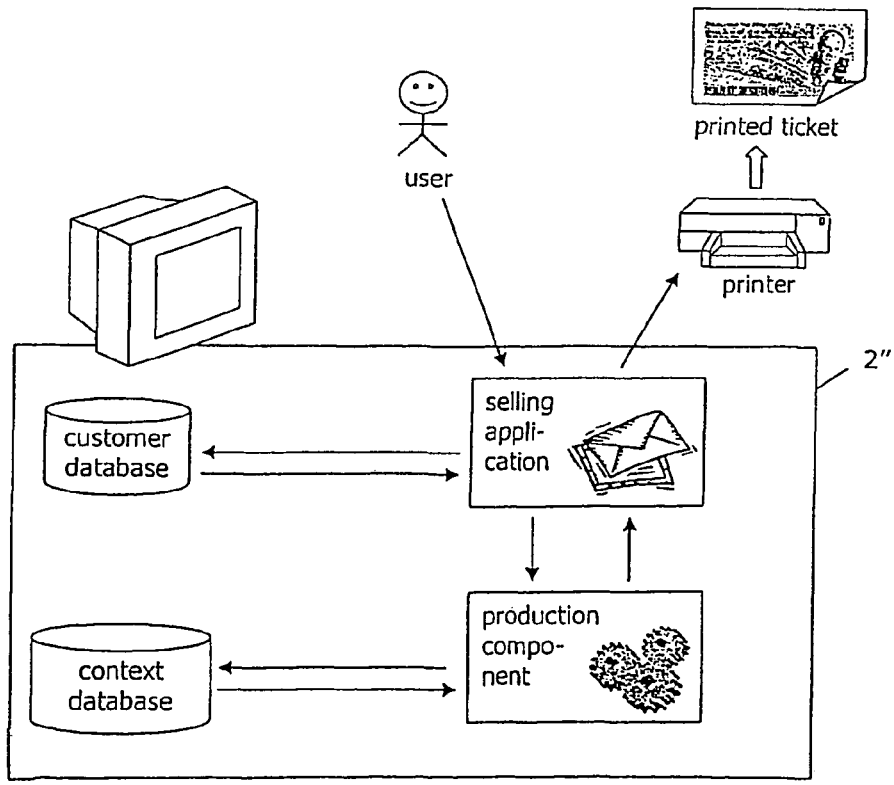
FIG. 45 is a schematic illustration similar to FIGS. 43, 44, and 45 of a local or stand-alone server system for implementing a method of generating a printing commercial instrument according to this invention.

Referring to FIG. 45, a local or stand-alone server system 2" is shown incorporating in a single data processing system the functions of the enterprise server system 2' of FIG. 44.

Figure 43:
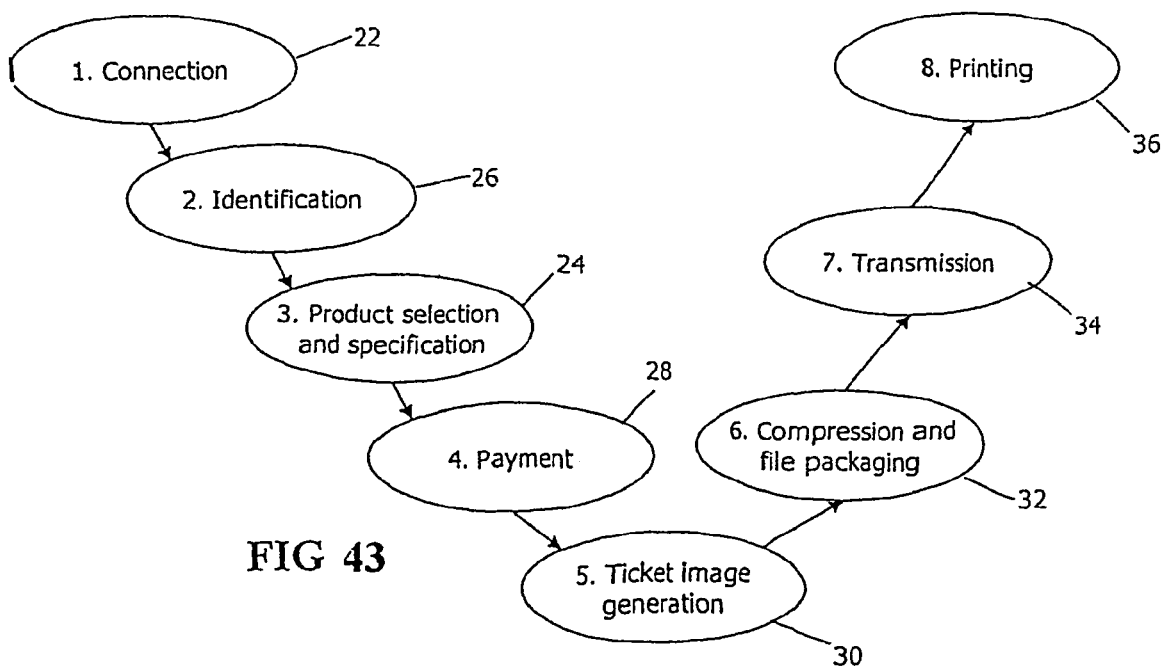
FIG. 43 is a flow-chart describing in a simplified manner various steps of a method according to an embodiment of this invention.

Referring to FIG. 43, a flow-chart generally illustrating the generation of a commercial instrument, such as a printed ticket, with a data processing system such as the server system described above, is shown. Initial operations include connection of the customer or user to the server system 2, 2', 2", and subsequently selection and specification of the product. For example, if the commercial instrument is a transportation ticket, the customer may specify the journey departure place and destination, the travel date and/or time, the class, the seat, etc. The initial steps may also comprise an identification procedure, particularly if customer information from a customer database is to be retrieved for inclusion in the printed commercial instrument, in which case the identification procedure may be after or before product selection and specification. An identification procedure may also be required where commercial instruments are issued only to known or identified persons. The term "product" shall be understood herein to generally mean the event, service, or item being purchased or transacted to which the commercial instrument relates.

Once the product has been selected and specified, a payment order is created, for example using credit card, bank transfer or cash card information supplied by the customer to the server system which then logs the payment order and/or sends a provisional payment order to a payment system 16. The transaction amount will not be debited according to the payment order until confirmation that the ticket has been sent to the customer site.

After product selection and specification in step 24, a ticket image printing file is generated in the production server 18 using information received from the web server portion 12 and, as the case may be, the customer database 14 and the context database 20, such that product information, personal information and contextual information may be included in the ticket image generation process.

It may be noted that ticket image generation may be performed in parallel, before or after generation of the provisional payment order (step 28). The ticket image file is then packaged and preferably compressed such that it can be efficiently transmitted over a communications network such as the internet, and printed on a standard PC printer. The ticket image may for example be received on the user's or customer's computer screen as a page displayed in a web browser, or by e-mail, for example in commonly used text and image formats such as PDF, GIF, PNG, and the like that enable printing on personal PC printers with the appropriate PC software. The sending of the commercial instrument image file to the user's or customer's computer or terminal also generates a confirmation to execute the payment order in waiting.

It will be apparent from the above that the security of the commercial instrument does not reside in the inability to print or copy numerous tickets, since the customer receives the printing file, or could simply copy a printed instrument. Security against the use of multiple copies is provided by personal or unique information. For example, for a transportation ticket, the date, destination and a photographic portrait of the bearer of the instrument will make the commercial instrument unusable by other persons and usable only during the period of validity by the bearer. For entertainment events, such as theatre, sports, cinema, or similar events, it would not always be necessary to include personal information if for example unique information such as a seat number, in conjunction with a date and time or venue, would be included in the ticket image.

Figure 46:
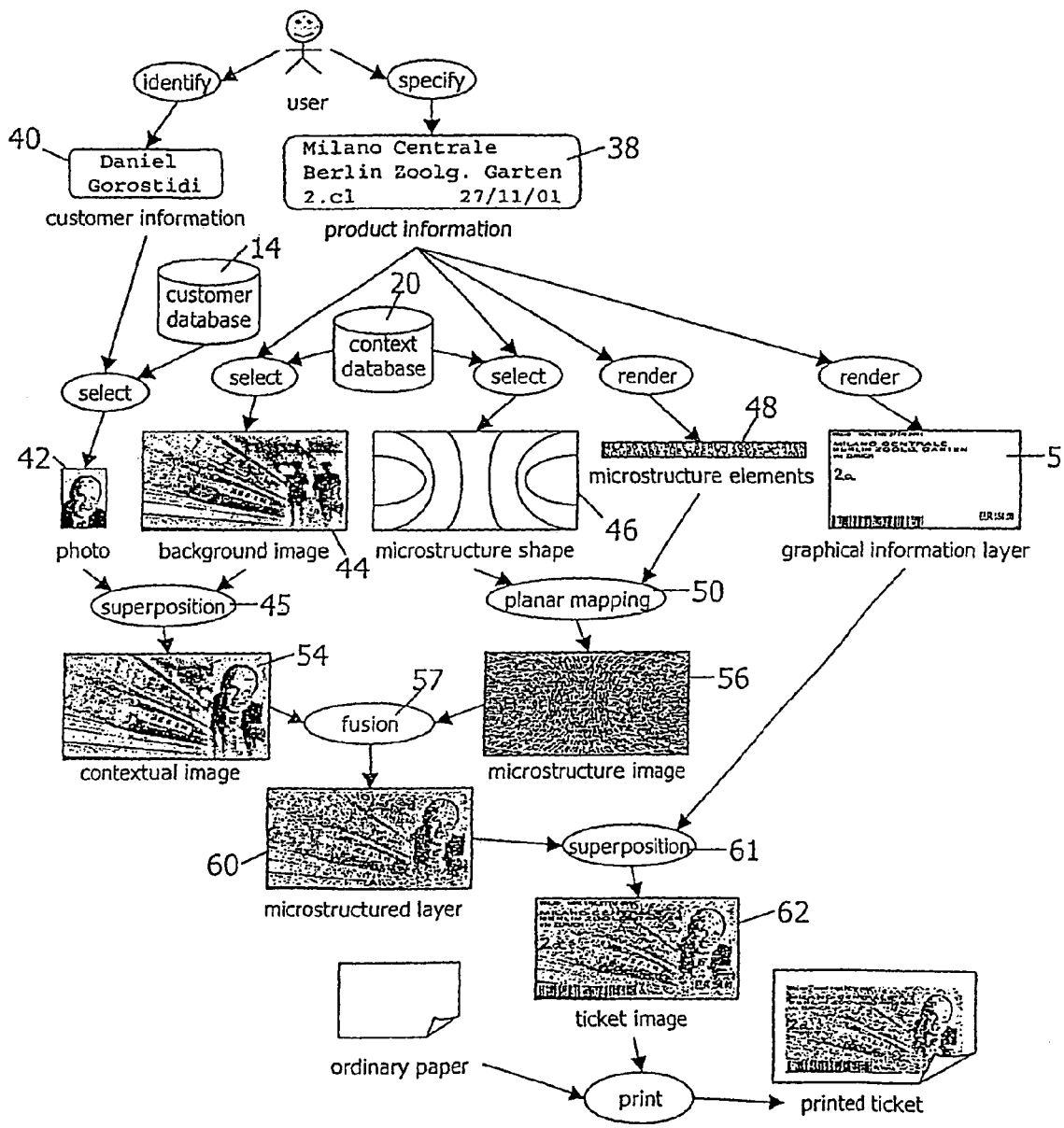
FIG. 46 is a flowchart illustrating a procedure for creating a commercial instrument image according to this invention.

In FIG. 46, a flow-chart illustrating various steps or operations in the generation of a ticket image according to this invention is shown.

In the specific example illustrated in FIG. 46, a train ticket for the journey from Milano Central Station to Berlin Zoological Garden, in second class, and valid on a specific day, is described. The product information 38 will have been specified by the user, who will also have provided customer information 40 that enables his/her identification and retrieval of further customer information from the customer database 14. The customer database may for example include a library of photographic portraits of customers. On the basis of the customer identity, the corresponding portrait of the customer is retrieved from the customer database for inclusion in the ticket image, as will be described further on.

The product information 38 is sent to the production server or production server portion of the server system and used to select a background image 44 from the context database 20 and a microstructure pattern or shape 46 that will be applied to microstructure elements 48 in a mapping procedure 50, for example a planar mapping procedure. The microstructure elements 48 are organized so as to provide information, in particular information comprising text and numbers relating to the product information, for example in the case of a train ticket that indicates the journey starting and destination places, the date, and possibly additional information such as the class, the price and any other product specific information. It is also possible to include in the microstructure elements customer information such as the customer's name, address, date of birth or other information specific to the customer. The microstructure elements may also comprise elements having various graphical shapes or logos.

The product information is also used by the production server or server portion to generate a product information layer that may include a simple presentation of the product specific information, in the present example of a transportation ticket, relating to the starting place and destination, the class, the price, the validity, date or period, possibly further including electronically verifiable security features such as an encrypted number code or a bar code. The coded or electronically verifiable security feature provides additional verification means for a person controlling the authenticity of the ticket in case there is any doubt after a visual verification, or for any other reason, such as arbitrary spot checks.

The background image may be a photographic image, a drawing, or any other image that is preferably non-uniform and representing places, objects, events, or other things that may be easily recognized and interpreted visually, in other words, images that have some meaning or have characteristic features that facilitate the memorizing and recognition thereof by a person verifying the authenticity of the instrument. The background image is preferably an image that is proprietary and not easily available to the general public. The background image may be changed on a regular basis in order to increase the difficulty of reproducing the ticket image. Where the commercial instrument comprises a portrait 42 of the customer, the background and portrait images may be merged by any standard merging technique or by superposition 45 of the photograph on the background image to form a personalized contextual image layer 54.

The microstructure pattern or shape 46 is for example a mathematical image deformation algorithm (warping transformation) as as described hereinabove or as used in planar mapping or other known image deformation techniques. The microstructure shape or pattern may vary between different types of commercial instruments on criteria established by the issuer, for example, different shapes for different ticket values, events, days of the week, months, etc. The shape or pattern may also be regularly changed, for example but not necessarily, when the background image is changed, in order to make reproduction of forgeries more difficult by reducing the time during which a background image and a pattern on the image remain valid.

The microstructure elements 48 include in a preferred embodiment alphanumerical characters that enable product specific information such as the date or period of validity, the event, seating number, information on the journey starting place and destination, and the like to be read. The text that identifies the specific purpose of the commercial instrument may in itself be unique (such as a combination of the title, date and seating number of a theatre event) or may be unique in conjunction with customer specific information (for example a train ticket indicating a combination of a date, a journey, and a portrait of the traveller). The microstructure elements are used to create a dither matrix representative of a microstructure image layer 56 that is rendered with the contextual image layer 54.

The microstructure elements used in the present application, which include alphanumerical characters, are generated at a size that enable their reading at a personal document reading distance which may typically be in the order of 20 to 50 cm from the eye. The microstructure elements are thus significantly larger than the screen dot sizes provided in even the lowest resolution printed images typically available.

The microstructure elements are advantageously generated by automatic synthesis from bi-level bitmap elements as already described hereinabove, however the production of commercial instruments or other documents with security features according to this invention may use microstructure elements generated in other manners, as described for example in relation to FIGS. 50*a* to 50*g* which show various graphical representations of a microstructure element.

An Alternate Way of Synthesizing Microstructure Elements

Figure 50A:
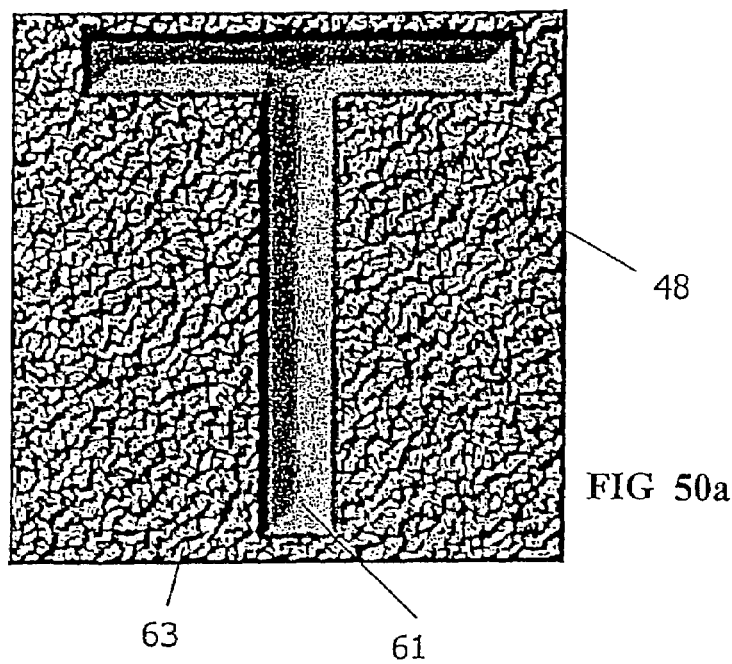
FIGS. 50a to 50g are various graphical representations of alphanumerical character of a microstructure dither matrix according to this invention.
Figure 50B:
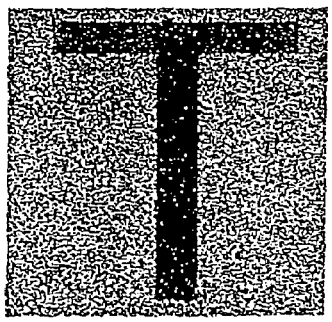
Figure 50C:
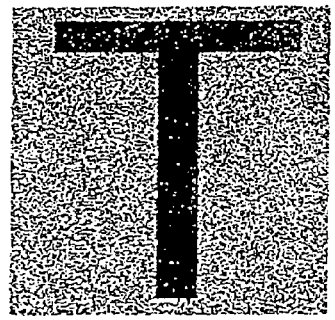
Figure 50D:
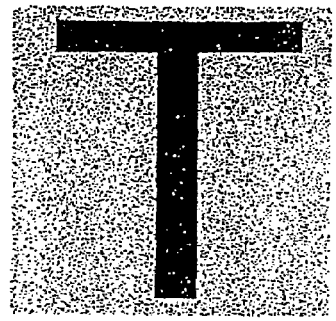
Figure 50E:
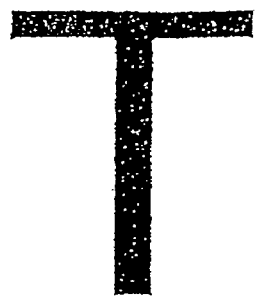
Figure 50F:
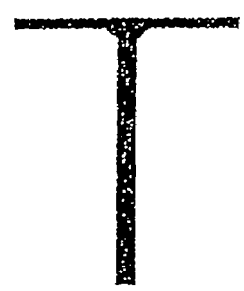
Figure 50G:
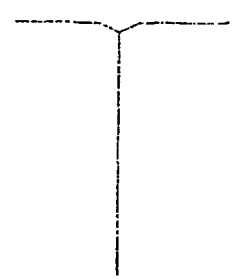

The microstructure element 48 may be represented as a three-dimensional element 61 against a background 63 as shown in FIG. 50*a*, whereby the depth of the element, in the direction coming out of the paper of FIG. 50*a*, may be separated into a plurality of planes parallel to the paper, each plane defining a grey level. The microstructure element may for example be defined in 256 planes that correspond to 256 grey levels, which equates with the number of grey levels commonly defined in standard printing techniques. The background 63 comprises "noise" that can be graphically represented as randomly distributed "peaks" that, when intersected by the high grey level planes, give the background a grainy aspect as shown in FIGS. 50*b* to 50*d*. When the grey level is very high, the character will be at its thickest with a dark background, as illustrated in FIG. 50*b*, the background getting lighter as the grey level decreases as represented successively by FIGS. 50*c* to 50*e*. For an intermediate grey level, the character is of medium thickness as shown in FIG. 50*f*, or if there is a very low grey level, the character is very thin as shown in FIG. 50*g*. In this example, grey levels are thus varied by adjusting the thickness of the characters, in addition to varying the density of the grainy background for the high grey levels, whereby it should be noted that the characters are preferably hormomorphic such that, as they reduce in thickness, their general shape remains. The latter property ensures the readability of the characters, whether depicting a low grey level or a high grey level.

Instead of adjusting the thickness, other techniques are available for defining the microstructure element grey level, for example the character may be defined by a dark border of a constant outer shape and dimensions while varying border thickness towards the center of the character depending on the grey level.

Figure 47:
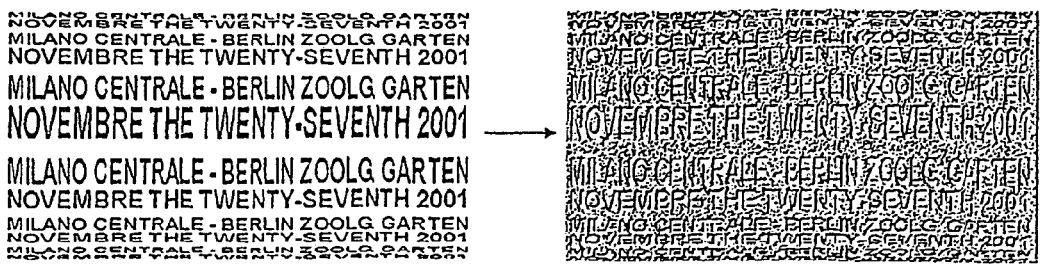
FIG. 47 is an illustration of the transformation of a microstructure image to a microstructure dither matrix (graphically represented)

The representation of lettering as microstructure elements is for example depicted in FIG. 47, whereby the lettering on the left side of the figure are simple characters and on the right side of the figure shown as three-dimensional microstructure elements that graphically represent the microstructure dither matrix. In FIG. 47, the elements have already been subjected to a planar mapping procedure 50 with a microstructure shape (which in the specific example emulates the positioning of text lines around a cylinder). It should be noted that the 3D representations of FIG. 50*a* and on the right side of FIG. 47 are merely means of assisting the reader in obtaining a visual interpretation of microstructure elements which are in fact defined in a dither matrix and could be represented in other ways.

In generating the dither matrix, account is taken of both the text of microstructure elements and the microstructure shape. Moreover, the microstructure image is scaled to the same size as the contextual image. The contextual image and microstructure images 54, 56 are then rendered by applying the microstructure dither matrix to the contextual image with any of the dithering methods described herein.

By way of example, one simple method of fusing is standard halftoning, as described above.

Figure 48:
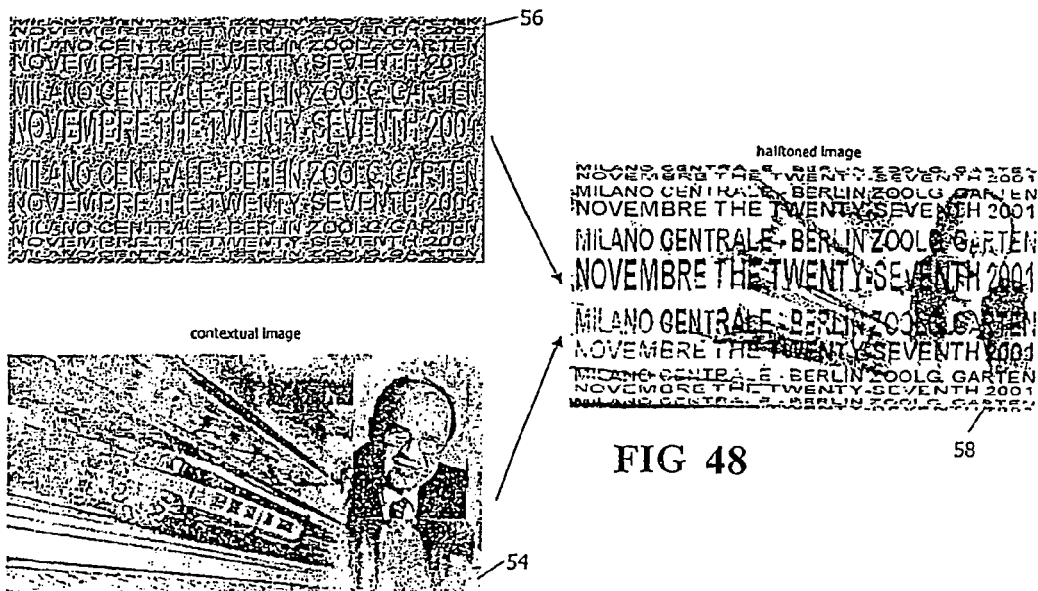
FIG. 48 is an illustration of a process of rendering a contextual image and a dither matrix by a halftoning process.

The results of standard halftoning is illustrated for example in FIG. 48, whereby the contextual image and microstructure image are subjected to the above described standard halftoning procedure resulting in a halftoned image 58. As may be noticed in this halftoned image, in the light areas of the contextual image, the microstructure characters are very thin (because of the low grey level value) and in the dark areas very thick (because of the high grey level value).

The grey level values of the dither matrix located between microstructure elements are preferably set at a low grey level value varying randomly such that the shape of the microstructure element remains visible (even in dark areas) after the halftoning process.

It may be further noticed that the thickness of the microstructure characters vary along portions thereof, depending on the grey level of the contextual image in the vicinity of the portion of character in question.

Figure 53:
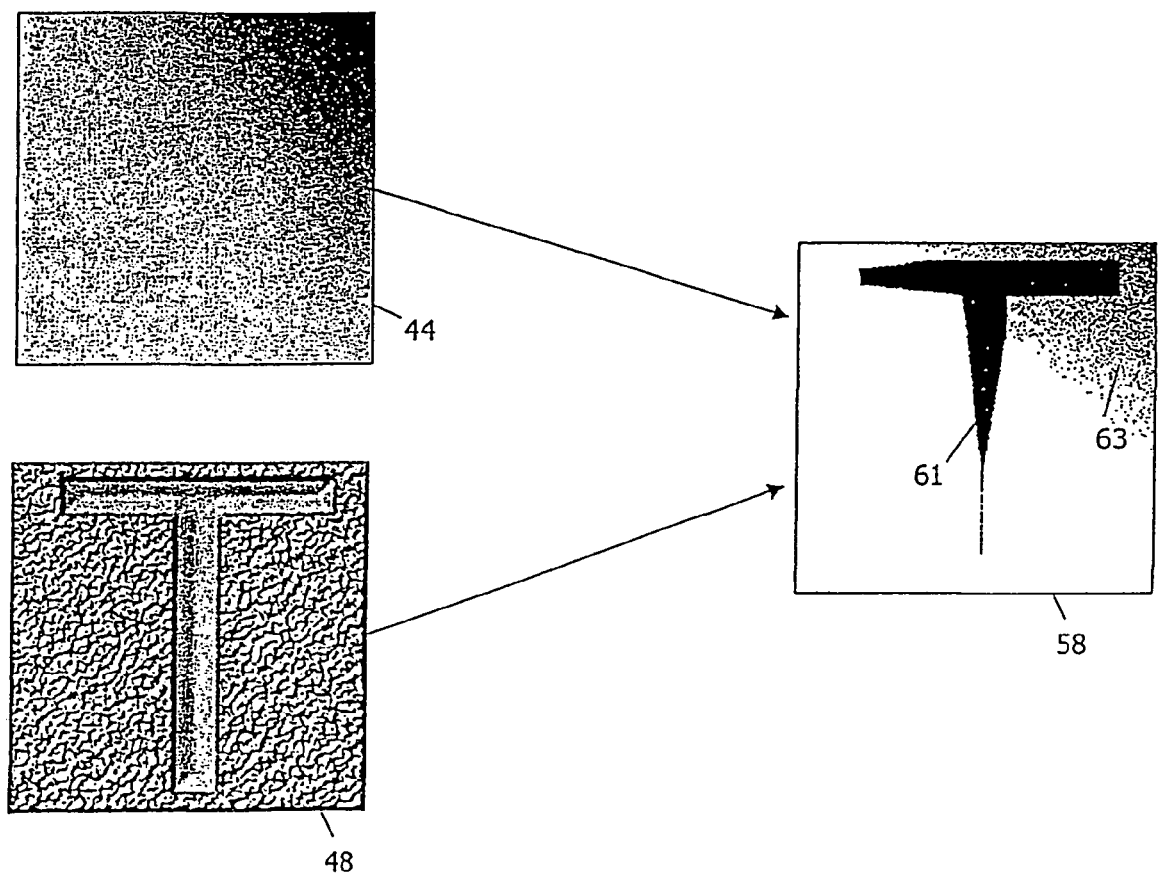
FIG. 53 is an illustration representing an example of the application of a microstructure dither matrix on an image.

Referring to FIG. 53, the effect of applying a microstructure dither matrix of a microstructure element 48' to an image 44' by a halftoning technique is illustrated. This halftoned image 58 shows the varying thickness of the character "T" 61 and the density of the background grain 63 as a function of the grey level of the image 44.

Figure 49:
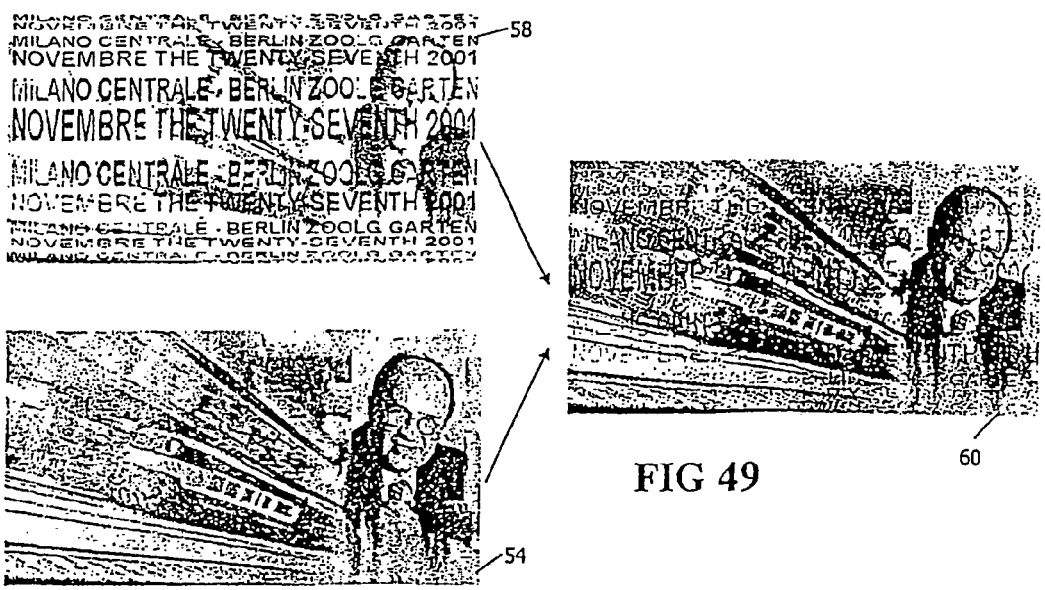
FIG. 49 is an illustration of the balancing of a halftoned microstructure image with the contextual image to form an image for printing according to this invention.

The visual quality of the computed halftoned image 58 is often not optimal due to the size of the microstructure elements composing the dither matrix. In order to improve the quality, the rendering procedure may further include an equilibration procedure as already described herein. Other equilibration or balancing techniques, for example which compare the halftoned image with the contextual image as illustrated in FIG. 49, may be used. A balancing or equilibration technique that may be employed includes examining the neighbourhood of each point of the halftoned image, subsequently counting the number of black points and white points which are then used to compute an average grey level value, for example the number of white points divided by the total number of points in the considered neighbourhood. These average grey level values are compared with the grey level value of the corresponding point of the contextual image and if the difference is small, (for example below a defined or approximated value), then it is considered that the halftoned image is a good approximation of the contextual image at that point. If the difference between the compared grey level values is large, then it is considered that the halftoned image is locally a bad approximation of the contextual image and that the considered point of the halftoned image should be inverted, in other words, set to white if originally black, or set to black if originally white. A probalistic function may be used to determine whether the difference between the compared grey level values is to be considered small or large.

While the halftoning and balancing or equilibration procedures have been described as separate procedures hereinabove, it would be possible to combine these two procedures in a single procedure, even if the terms "halftoning" and "balancing" are used separately.

Figure 51:
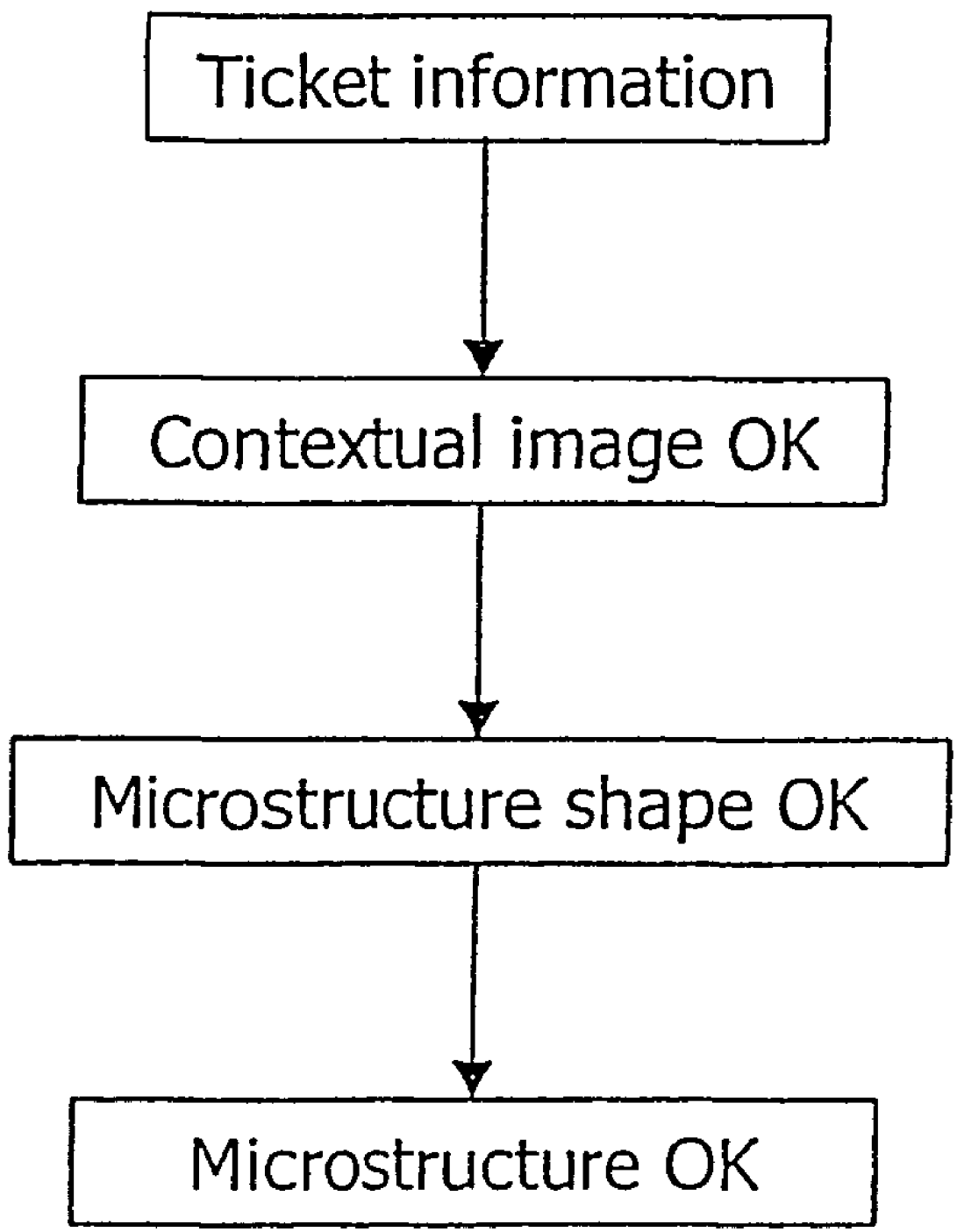
FIG. 51 is a flow-chart illustrating a procedure for visual verification of a printed commercial instrument according to this invention.
Figure 52:
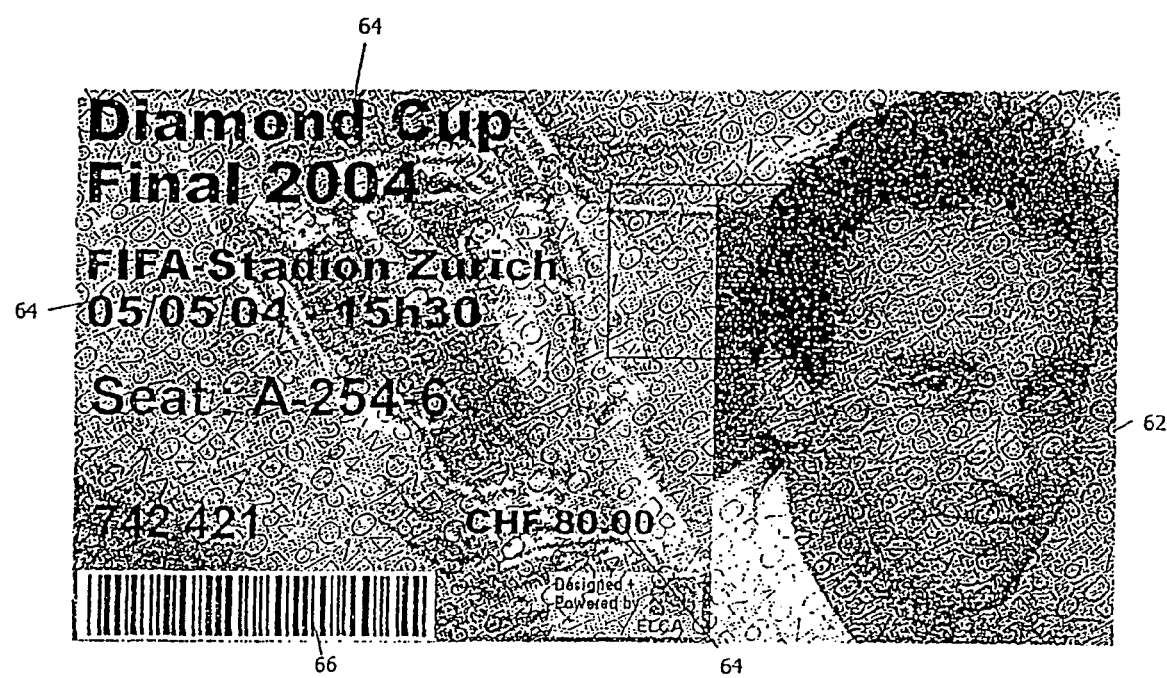
FIG. 52 is an illustration of an example of a printed commercial instrument generated with a method according to this invention.

A simple graphical product information layer 52 may be superposed 61 or otherwise merged with the rendered image 60 to result in the completed commercial instrument image 62, such as the sporting event ticket image illustrated in FIG. 52. As can be seen in FIG. 52, the simple product information layer 64 indicates the validity date, the event name, and the price in an easy to read format, at least a part of this product information also being present in the microstructure of the rendered image and easily readable at a normal document reading distance of say 20 to 50 cm from the eye. In this particular example, the microstructure layer also comprises the name of the sporting event attendee. At the same time, the contextual image which in this example includes a photograph of a trophy and a person's portrait, is well-defined at normal document reading distance, and even improves beyond the document reading distance, say at arms length from the eye where the microstructure characters become less apparent. Visual verification of a commercial instrument generated according to this invention may include the steps shown in FIG. 51, whereby a ticket controller would check the relevance of the ticket information by reading the product information layer 64, and the microstructure information, which should correspond to the product information. The controller may also verify the contextual image and the microstructure shape or pattern and in this regard should be informed of the background image and microstructure pattern that applies to the type of commercial instrument at its date of validity. A bar code 66 which preferably includes an encrypted code, may be used as an additional verification means in case of doubt of the authenticity of the ticket, or for other reasons, such as random checks.

Figure 52A:
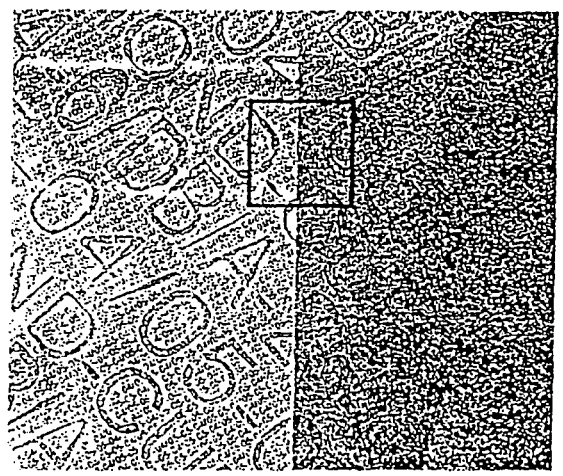
FIG. 52a is a detailed view of part of the image of FIG. 52.
Figure 52B:
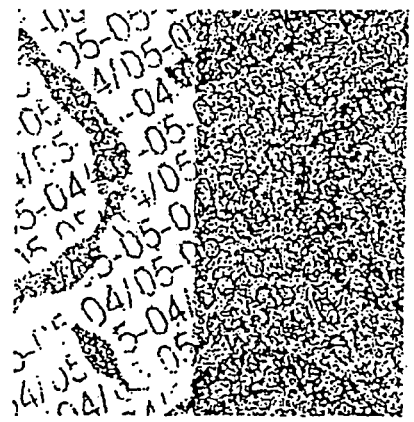

Referring to FIG. 52a, a detailed view of a portion of the printed ticket of FIG. 52 is shown. The smallest screen dots used for printing the image are conventional screen dots using traditional shapes, such as an ellipse or circle. The screen dots may however be provided with a special shape that could be changed on a regular basis to increase the security against forgery. This security technique may be taken further by introducing additional layers of microstructure elements having sizes intermediate the smallest printed screen dot and the microstructure elements verifiable at normal reading distance, using a rendering procedure as set forth above. Verification of the intermediate microstructure elements may be performed by close visual inspection of the printed instrument, for example at a distance of 10 to 20 cm from the eye. As best seen in FIGS. 52a and 52b, in this example a second layer of smaller microstructure elements comprising the characters "05–05–04" is provided, indicating the date of the event. In other words, a plurality of microstructure image layers formed by microstructure elements of a different size for each layer could be rendered with the contextual image with the rendering procedures described above.

It may be noted that commercial instruments or other security documents generated through a communications network as described above may also be displayed on an electronic screen, for example the screen of a portable electronic device, rather than being printed.

Distinctive Features and Document Protection Features

The present invention thus protects security documents comprising elements such as text, a photograph, graphics, images, and possibly a background motive by incorporating microstructures having shapes varying with the intensity of the document elements. Since, thanks to the dithering process, the target document image is built on top of microstructures, both document elements and microstructures cannot be erased or modified without significantly modifying the target document image. For example in FIG. 27, one can see that in this example, all the elements making up the image are microstructures. The global image is the girl's face. The first level microstructure is a dragon. The high-frequency dither array incorporates a second level microstructure in the shape of a greek graphic symbol (a frieze). Such a second level microstructure can incorporate simple second level microstructure shapes such as one or a few letters, numbers or symbols for additional protection. This second level microstructure embedded into the high-frequency dither array makes it even harder to create faked document images or document elements.

A key distinctive feature which characterizes the present invention is its ability to synthesize the microstructure in the form of a dither matrix starting from a bilevel bitmap incorporating the microstructure shape, the generated dither matrix being sufficiently sophisticated for making the chosen microstructure visible both at high and low image intensities. For example in FIGS. 33A and 33B, the microstructure is visible at a darkness of below 10% and higher than 90%. The hebrew letters in FIG. 34 are clearly visible between 10% and 90% darkness. Furthermore, the synthesis of the dither matrix can be carried out automatically by a computer program.

A second distinctive feature of the present invention is its ability to create geometrically transformed microstructures allowing to create variations of the security document, while keeping the global image intact and without modifying the information (e.g. text) carried at the global level and at the microstructure level. These geometrically transformed microstructures also allow to generate on a display an image, whose microstructure is animated. For example, FIG. 6 shows several instances of the same image and the same microstructure generated with different transformation parameters.

Figure 27:
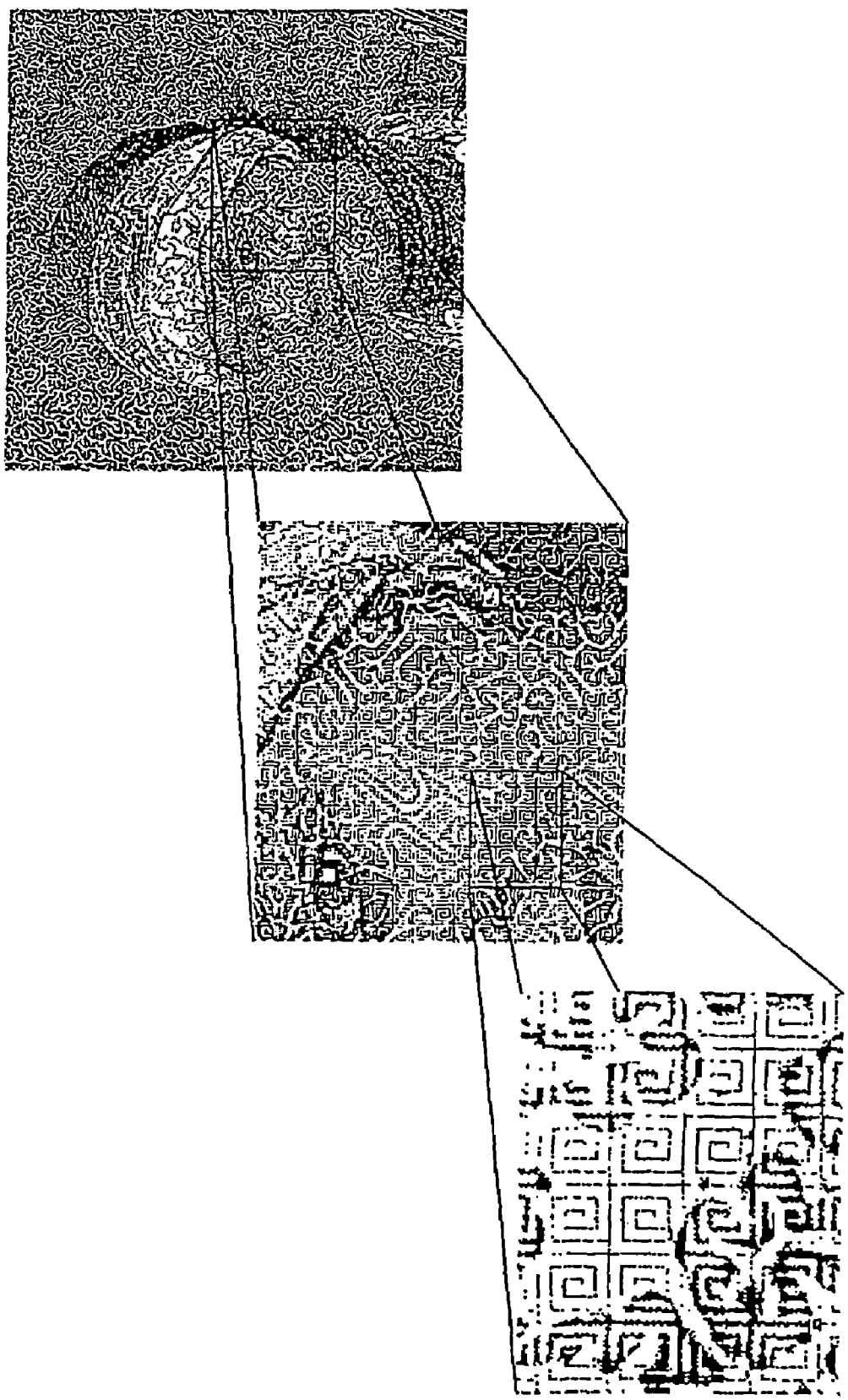
FIG. 27 shows an example of a high frequency artistic microstructure used to equilibrate the low frequency microstructure.

A third distinctive feature of the invention is its ability to carry out equilibration by making use of a high frequency dither matrix, possibly incorporating a second level microstructure (FIG. 27).

A fourth distinctive feature is the possibility of generating color documents with standard, non-standard and special inks, where one, several or all contributing inks are part of the microstructure. Considered inks are for example metallic, iridescent, fluorescent, phosphorescent and ultra-violet inks.

A fifth distinctive feature of the present invention is its ability of automatically synthesizing personalized security documents from information related to the document content.

Let us enumerate the main protective features. A first protection is ensured by the continuity of the microstructure when crossing adjacent element boundaries (pieces of text, graphic elements, images). This continuity makes it extremely hard for potential counterfeiters to replace given document elements by faked elements (for example replace a photograph by a faked photograph). As a second protective feature, text, represented in the original image as dark typographic characters can be protected by the microstructure. A third protection is offered by the dithering process used for microstructure image synthesis which ensures that the microstructure shape thickness varies according to the current image intensity or when colors are used, according to the dominant color intensities (or ink coverage). Counterfeiters cannot therefore simply incrust into a document by alpha blending a pseudo microstructure generated with standard desktop graphic packages. A fourth protection is offered by allowing text to be part of the microstructure, providing additional means of verifying the authenticity of the document. This allows to establish a correlation between information at the global document level and at the microstructure level. For example, the name of a document holder may be repeated all over the document by embedding it into a microstructure made of text (at the first or possibly at the second microstructure level). Modifying that name would require to modify the microstructure warped over all the document, an almost impossible task. A fifth protection is offered by the possibility of generating different instances of the microstructure on different documents using the parametrized transformation $T_t(u,v)$ and possibly the warping transform $T_w(x,y)$. A given instance of the microstructure image defined by a particular parametrized transformation $T_t(u,v)$ may be correlated with the document content, for example the value of the security document, the type of the document and the year when the document is issued.

Figure 36:
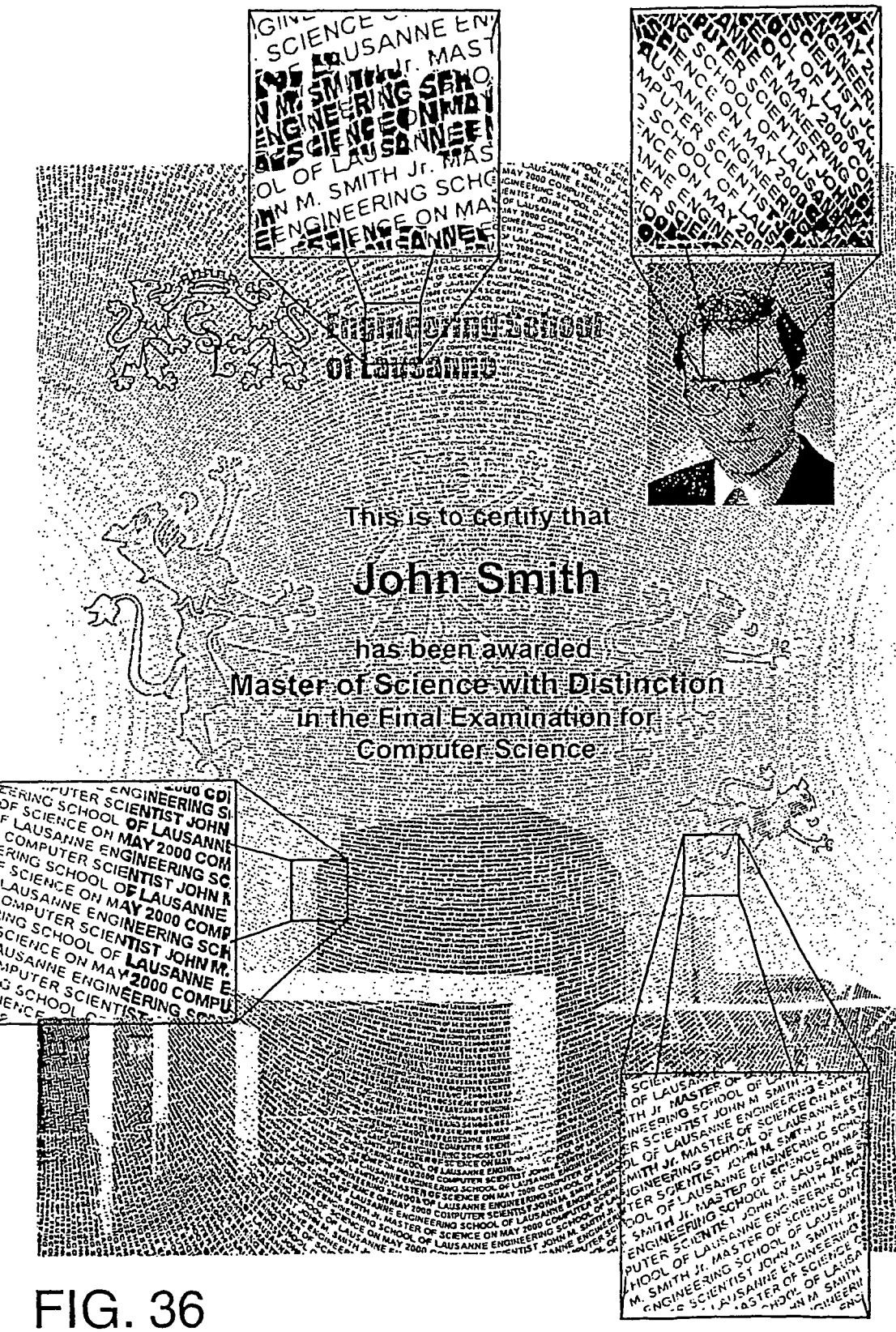
FIG. 36 shows a diploma incorporating a microstructure containing the name of the document holder and the name of the issuing institution.

FIG. 36 shows as an example of a security document a diploma incorporating a microstructure containing the name of the document holder and the name of the institution issuing the diploma. Since the microstructure covers all document parts, parts of it cannot be replaced. Furthermore, thanks to the geometric transformation which warps the microstructure across the picture at different orientations and sizes, and thanks to the fact that the thickness of the microstructure adapts itself to the local image intensity, microstructure elements cannot be simply copied from one location to many other locations. In addition, in dark (or color saturated) parts of the document, the very thin separations between microstructure shapes make the the unauthorized document reproduction very difficult.

Creating Security Documents with Microstructures Incorporating Special Inks

The document protection by microstructures is not limited to documents printed with black-white or standard color inks (cyan, magenta, yellow and possibly black). According to pending U.S. patent application Ser. No. 09/477,544 (Method an apparatus for generating digital halftone images by multi-color dithering, inventors V. Ostromoukhov, R. D. Hersch, filed Jan. 4, 2000, due assignee: EPFL), it is possible, with multicolor dithering, to use special inks such as non-standard color inks, metallic inks, fluorescent or iridescent inks (variable color inks) for generating security documents. In the case of metallic inks for example, when seen at a certain viewing angle, the microstructure appears as if it would have been printed with normal inks and at another viewing angle, due to specular reflection, the microstructure appears much more strongly. A similar variation of the appearance of the microstructure can be attained with iridescent inks. Such variations in the appearance of the microstructure completely disappear when the original document is either scanned and reproduced or photocopied.

Furthermore, one may incorporate non-standard inks only in certain parts of the security document and print the other parts with standard inks. Then, the effect of a metallic ink may only be visible within document parts selected by a mask, the mask itself being capable of representing a visual message such as a text, graphic symbols, a graphic design or a dithered image. For example, one may use as a mask the dragon of FIG. 27 and render within the target image with metallic ink only those parts of the microstructure which are covered by the dragon shape (the dragon shape is obtained by simple dithering of the original image, without equilibration). In such a target image the dragon shape is highlighted by the metallic ink, when seen at an angle allowing specular reflection of the incident light.

Creating Security Documents on Screens or Supports Other Than Paper

Document images incorporating microstructures may be used to generate security documents non only on paper but also on electronic displays (e.g. computer or mobile phone screens) or on other supports such as transparent or opaque plastic material, polymer material, packages of valuable products, optical disks such as CD-ROMs or DVDs, or in optical devices such as diffractive elements, holograms and kinegrams.

Creation of Artistic Images by Automatic Synthesis of the Microstructure

The automatic synthesis of microstructure images opens very efficient ways for designing artistic images such as illustrations, posters and publicity images. The designer only needs to create an original image and original microstructure shapes. With the help of a standard desktop graphic package, he can scan the microstructure shapes or draw them, retouch them so as to meet his aesthetic wishes and convert them into an original microstructure bitmap needed for the automatic synthesis of the corresponding dither matrix. This dither matrix incorporating the microstructure shapes is then used to dither the original image and produce the target artistic dithered image. Therefore, once integrated into a desktop software package, automatic dithering is a very effective tool for creating graphic designs, posters and publicity. In addition, large scale posters may be created easily where from far away the global image is visible and from nearby the microstructure becomes visible. This microstructure incorporates a second layer of information such as text, logos, a graphic design or publicity. Such large scale posters are specially effective when situated for example on highways, where car drivers see at first the global image and then, when coming closer they see microstructure information.

Creation of Images with Animated Microstructures

Images comprising animated microstructures can be used to create beautiful information and publicity sites attracting the attention of clients. Especially for clients visiting Web sites, images with animated microstructures are capable of forwarding a message incorporated into the animated microstructure. Parent patent application U.S. Ser. No. 09/902,227, filed Jul. 11, 2001, by R. D. Hersch and B. Wittwer discloses a method for generating animated microstructure images, i.e. image sequences and animations, where from where from far away mainly the image is visible and from nearby mainly the evolving microstructure is visible. That method makes use of a large dither matrix incorporating the microstructure. Microstructure evolution is obtained by successively regenerating new instances of the image with modified transformation parameters. Thanks to the method for the automatic synthesis of dither matrices disclosed in the present invention, aesthetic dither matrices can be easily and rapidly produced and hence greatly facilitate the creation of images with animated microstructures.

The disclosed methods have been described with respect to particular illustrative embodiments. It is to be understood that the invention is not limited to the above described embodiment and that various changes and modifications may be made by people skilled in the art without departing from the spirit and scope of the appended claims.

Computing System for Synthesizing Security Documents and Microstructure Images

Figure 37:
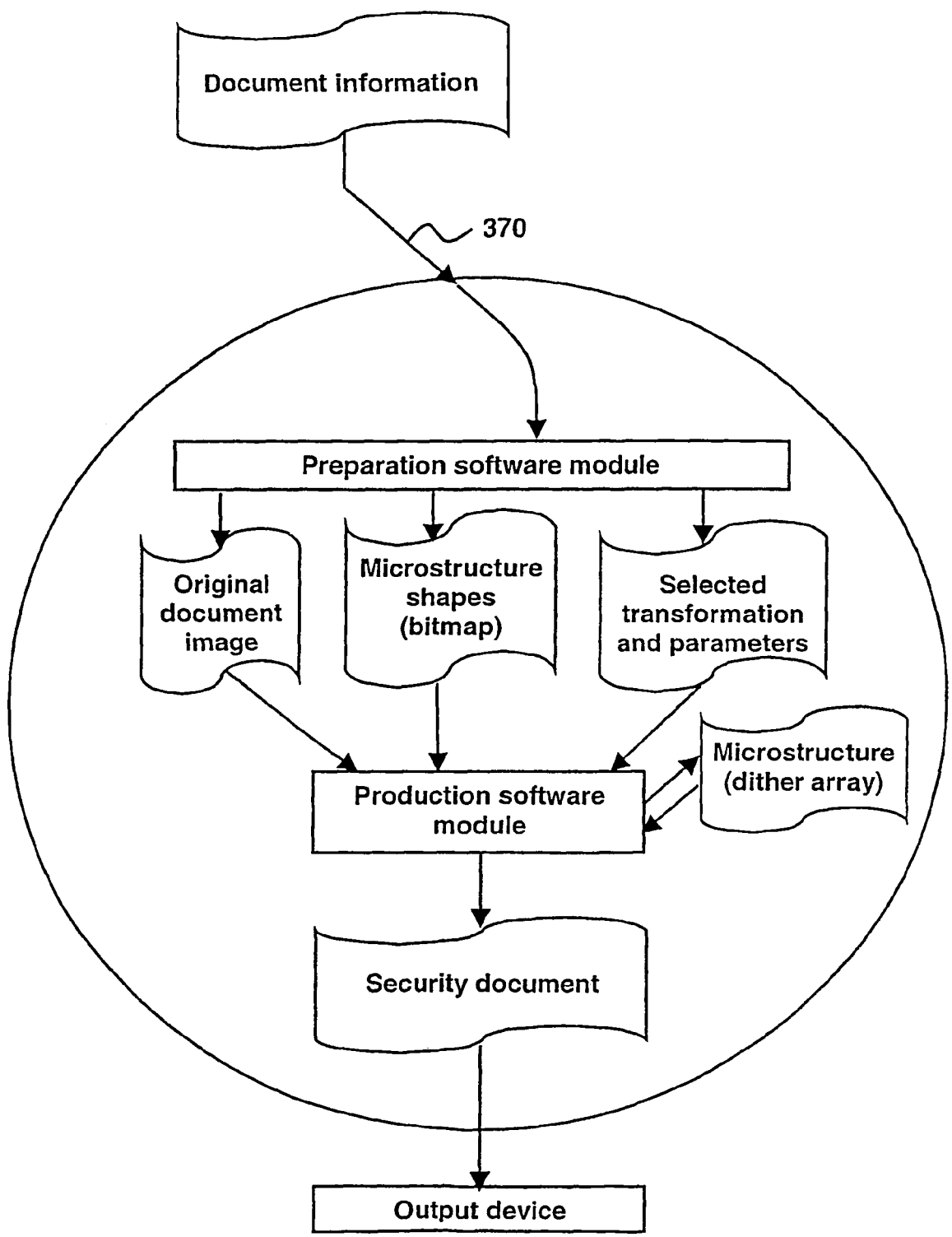
FIG. 37 shows a computing system comprising a preparation software module operable for the preparation and a production software module operable for the production of a security document.

A computing system (FIG. 37) for synthesizing security documents comprises an interface for receiving a request for generating a security document, for example the diploma shown in FIG. 36. Relevant information (370, FIG. 37) is received with that request for example the name of the document holder, the issue date and the type of document to be issued. The computing system also comprises a preparation software module operable for preparing the data used for the production of the security document and a production software module operable for producing said security document. The preparation software module running on the computing system may generate the original document image, the microstructure shapes and possibly transformation parameters according to information received together with the request. The production software module first synthesizes the microstructure to be used for generating the security document and then synthesizes the security document with that microstructure which is then transmitted to an output device.

In a preferred embodiment (FIG. 37, terms in parenthesis), the microstructure shapes are generated by producing a bitmap incorporating the microstructure shapes. The microstructure to be used for generating the security document is embodied in a dither array which is synthesized from said bitmap by applying to the bitmap mathematical morphology operations. Synthesizing the security document is carried out by dithering the original document image with the previously synthesized dither array.

Figure 38:
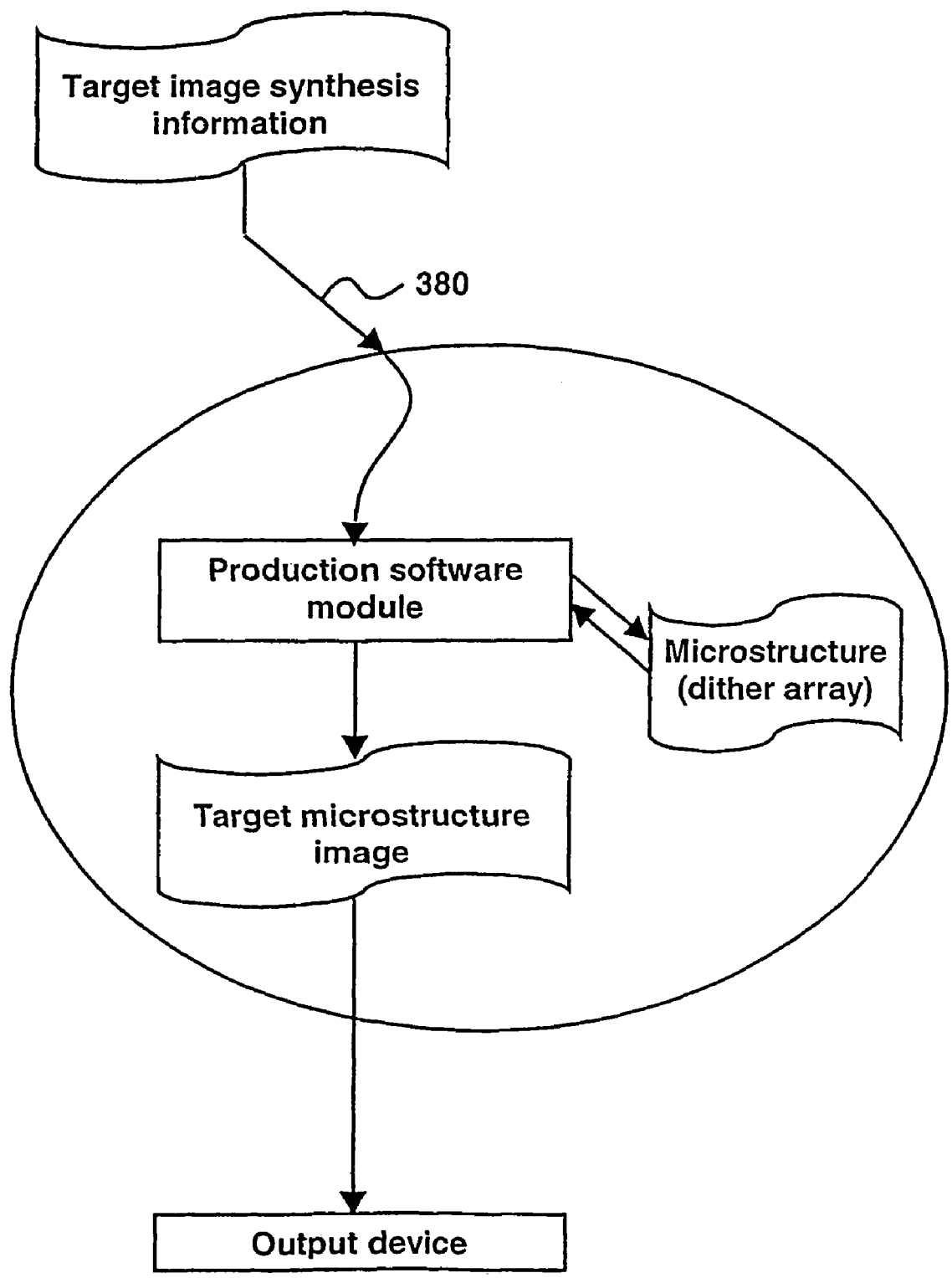
FIG. 38 shows a computing system comprising a production software module operable for the production of a microstructure image.

A similar computing system (FIG. 38) can be operated for synthesizing microstructure images such as microstructure images for graphic designs, information, publicity and posters. The computing system comprises an interface operable for receiving an original image, microstructure shapes, possibly a transformation selected from the set of available transformations and transformation parameters, as well as, in the case of color, a selection of the basic colors to be used for rendering the target dithered image (380, FIG. 38). The computing system also comprises a production software module operable for producing said artistic microstructure image. The production software module running on the computing system takes as input the microstructure shapes, synthesizes the microstructure, and produces the target microstructure image incorporating the microstructure.

In a preferred embodiment, the microstructure shapes are incorporated into a bitmap received by the computer system's interface. The microstructure to be used for generating the security document is embodied in a dither array which is synthesized by the production software module from said bitmap by applying to the bitmap mathematical morphology operations. Synthesizing the target microstructure image is carried out by dithering the original document image with the previously synthesized dither array and if in color, possibly according to specified basic colors, and possibly according to the transformation and transformation parameters received by the computing system's interface.

Computing System for Displaying Images with Animated Microstructure

Figure 39:
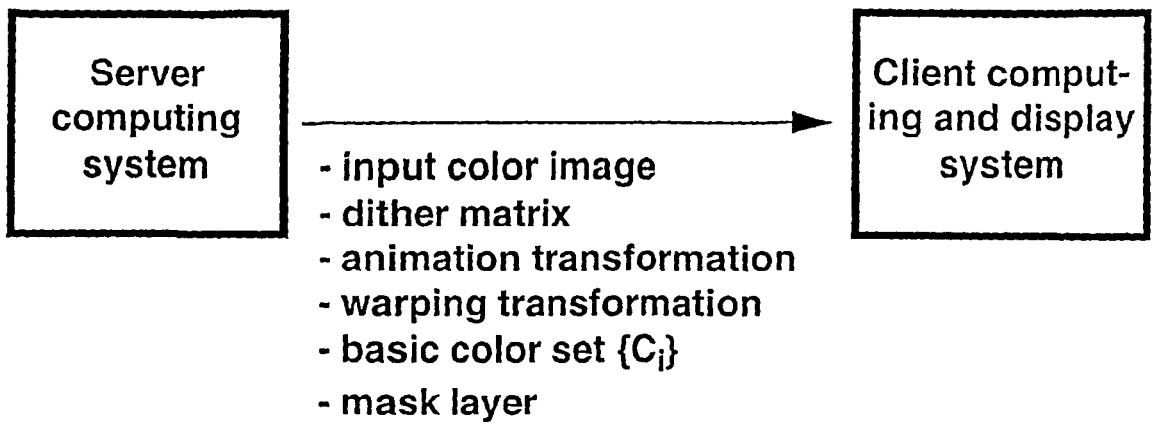
FIG. 39 shows a server computing system transferring to a client computing and display system an input color image, a dither matrix, an animation transformation, a warping transformation, a set of basic colors and a mask layer.

Images with animated microstructures can be synthesized offline by a computer running an animated microstructure image rendering software. The resulting image animation can be then incorporated into Web pages as animated images (e.g. animated GIF or MNG formats). An alternative consists in creating an image computing and display system, for example an applet, running the animated microstructure image rendering software. In that case, the image computing and display system will run on the client's computer and display the animated microstructure image or image animation. As a preferred embodiment, the image computing and display system will receive from the server computing system (FIG. 39) as input data the input color image, the dither matrix, the animation transformation, the warping transformation, the set of basic colors $\{C_i\}$ and a possible mask layer. With the present technology, the preferred embodiment of an image computing and display system is a Java applet. The image computing and display system's program (e.g. the program running as an applet) will then generate and display the target image by carrying out the initialization, image rendering and image display steps described above.

In addition, specific embodiments of the animated microstructure image rendering system may allow to tune some of the image rendering parameters according to user preferences or user profiles. For example one image selected from a set of images, one set of basic colors selected from various sets of basic colors, one dither matrix selected from different dither matrices, one animation transformation and possibly a warping transformation may be tuned according to user preferences or profiles. These specific embodiments allow to customize the animated microstructure images according to users or user categories.

Figure 40:
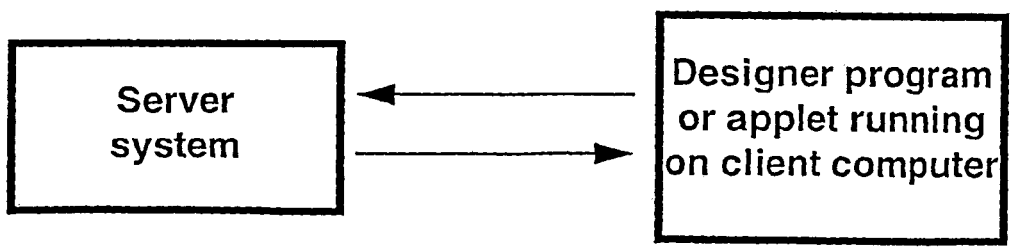
FIG. 40 shows a server system interacting with a designer program or a designer applet running on a client computer.
Figure 41:
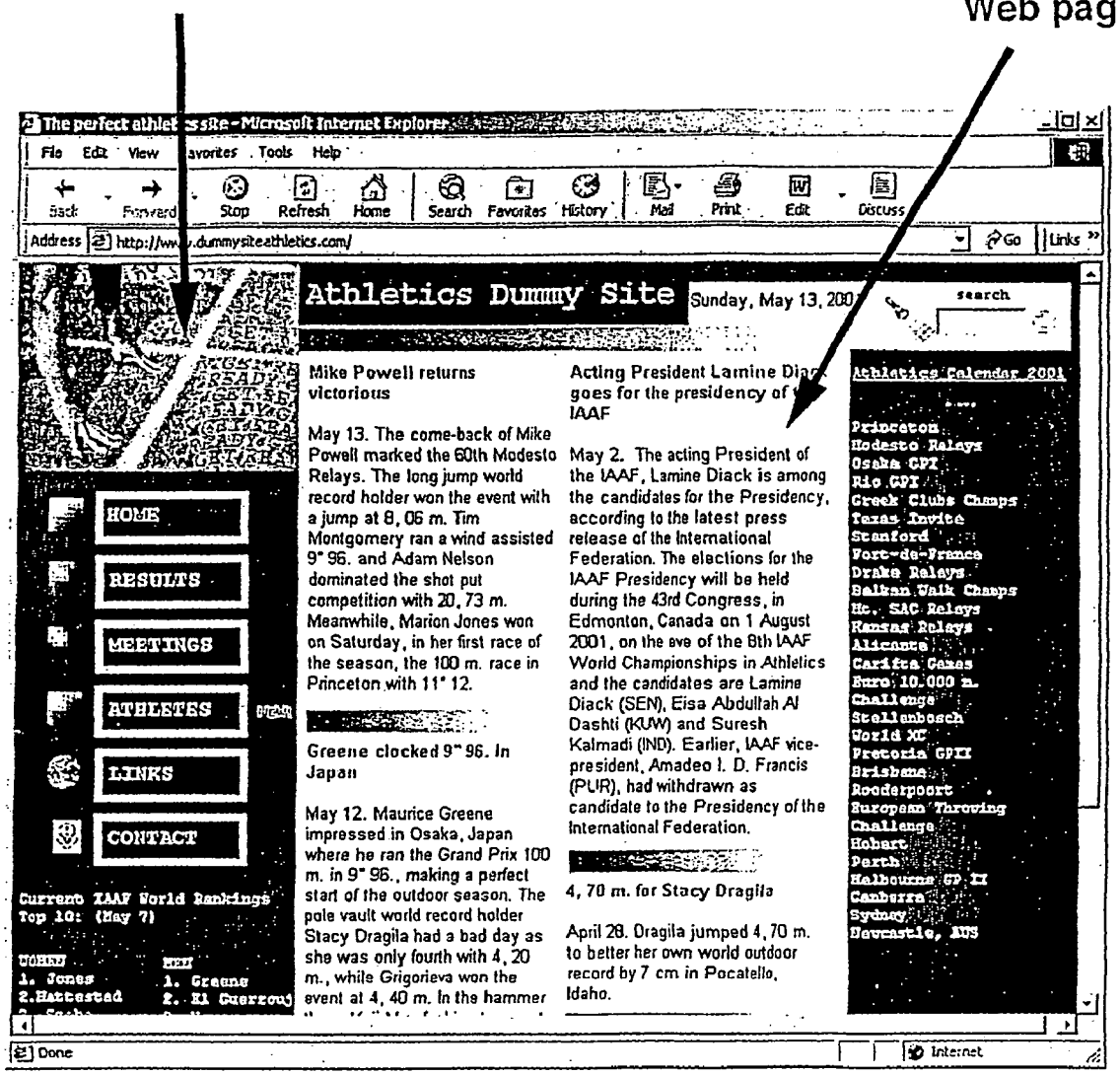
FIG. 41 shows a Web page incorporating an animated microstructure image.

Optionally, a specific server (e.g. a Web site) can be conceived which allows designers to create images with microstructures evolving over time (i.e. animated microstructure images) on their own computers (FIG. 40). The program interface running on their computers (e.g. dynamic Web page incorporating an applet) will exchange information with the server. With such a Web based design interface, graphic designers may specify or create the source image, the dither matrix, the basic colors, the animation transform, the warping transform and the image mask layer. By being able to modify interactively each of these parameters and elements, and immediately visualizing the results, designers may be able to interactively create appealing images with animated microstructures. Upon signing a licensing-agreement, they may then receive the authorization to transfer the animated microstructure rendering software (e.g. the applet's code) as well as the created data elements into their own Web pages. FIG. 41 shows an animated microstructure image incorporated into a Web page.

What is claimed is:

1. Method of generating an image incorporating a microstructure, comprising:
   obtaining an original image;
   automatically generating a dither matrix from original microstructure shapes; and
   rendering said original image with said dither matrix; where automatically generating dither matrix from original microstructure shapes comprises the application of mathematical morphology operations selected from the set of erosion and dilation operations to said microstructure shape and where the microstructure comprises a visual motif selected from the set of typographic character, text, graphical element, symbol, logo, and ornament.

2. Method according to claim 1 wherein the microstructure comprises a low frequency microstructure with low frequency microstructure elements generated from the original microstructure shapes, and a high frequency microstructure with high frequency microstructure elements, whereby the low frequency microstructure elements are larger than the high frequency microstructure elements.

3. Method according to claim 1 wherein the mathematical morphology operations comprise a shape thinning operation for operating on a bitmap shape foreground and an operation selected from a the set of alternated dilation and dual bitmap thinning for operating on a bitmap shape background.

4. Method according to claim 1 wherein rendering the original image with said dither matrix yields a bilevel image whose rendered microstructure elements vary in thickness according to original image intensity, said rendered microstructure elements being visible at both high and low intensities.

5. Method according to claim 1 wherein the visibility of the microstructure is tuned by a mask whose values represent relative weights of the original image halftoned with conventional methods and the original image synthesized with the microstructure.

6. Method according to claim 1 further comprising applying a parametrized geometric transformation to warp the microstructure incorporated in the image.

7. Method according to claim 6 wherein a plurality of image instances are successively generated by modifying parameters of the parametrized geometric transformation, said set of image instances forming a displayable image animation.

8. Method according to claim 7 wherein said parameters are modified smoothly as a function of time to yield a smoothly evolving animated microstructure.

9. Method according to claim 1 wherein the rendering said original image with said dither matrix comprises a multi-color dithering operation.

10. Method according to claim 1 further comprising applying a multi-valued mask expressing weights of original image colors and weights of a plurality of selected basic colors for generating said image incorporating said microstructure.

11. Method according to claim 1 wherein the microstructure comprises information personal to a user of said image incorporating said microstructure.

12. Method according to claim 1 wherein the microstructure comprises information identifying and specific to a particular event or transaction, such as date, venue, seating, destination, time.

13. Method according to claim 1 wherein the microstructure comprises alphanumerical characters at a size which allows reading them at a normal document reading distance.

14. Method according to claim 1, said method further comprising an operation of equilibration of said dithered image, said operation of equilibration comprising the steps of
   a) applying a dot gain simulation;
   b) applying a human visual system filtering; and
   c) performing a comparison between intensities of said original image and intensities of the resulting dot gain simulated and filtered dithered image.

15. Method according to claim 14 wherein said comparison yields a deltamap which is dithered by a high frequency dither array, the resulting dithered deltamap being in a further step composed with said dithered image.

16. Method according to claim 1 wherein a mask whose shape expresses a visual message specifies the part of the microstructure that is to be printed with special inks that enable, under certain observation conditions, the mask shape to remain hidden within the image and under other observation conditions, the mask shape to be clearly revealed.

17. Method according to claim 16 wherein parts of the image specified by the mask are printed with a special ink selected from a group of metallic and iridescent inks, whereby the mask shape is hidden at a certain observation angle and is visible at a different observation angle.

18. Method according to claim 16 wherein parts of the image specified by the mask are printed with a special ink invisible in daylight and visible in light at selected frequencies, such as ultraviolet light.

19. Method according to claim 1 further comprising defining colors to be used for rendering the target image; defining parameters of a parametrized transformation; traversing a target image positions (x,y) pixel by pixel and row by row, determining corresponding positions in the original image (x',y') and, according to the parametrized transformation, corresponding positions in the microstructure (x",y"); obtaining from the original image positions (x',y') the color Cr to be reproduced and from the microstructure positions (x",y") rendering information; rendering the target image by making use of the rendering information.

20. Method of generating a security document comprising producing an image incorporating a microstructure according to a method set forth in claim 1, wherein the original image rendered with the microstructure comprises information relevant to the purpose of the document and intended to be protected against counterfeiting.

21. Method of generating a security document for printing or display, comprising the steps of: selecting or retrieving an original image; selecting or retrieving information specific to a person, an event or transaction to which said security document relates; generating a microstructure comprising readable microstructure elements providing information on said person, event or transaction; rendering said original image with said microstructure using the method according to claim 1.

22. Method according to claim 1, wherein said original image rendered with said microstructure is printed or displayed on a support selected from the group comprising paper, plastics, polymers, product packages, optical disks, and optical devices, said optical devices comprising holograms, kinegrams and diffractive elements.

23. Method according to claim 21 wherein the security document is a commercial instrument bearing value or relating to a commercial transaction.

24. Method according to claim 21 wherein the security document is an certificate, title or deed.

25. Method according to claim 21 wherein the security document comprises information identifying a person or entity.

26. Method according to claim 21, wherein the image incorporating a microstructure is generated in a server system, said server system preparing and packaging a displayable file for printing said security document on a standard printer or for display on an electronic screen, such as a screen of a portable electronic device.

27. Method according to claim 26, wherein said security document is printed on said standard printer at a customer site remote from said server system and accessible to said server system via a communications network such as the internet.

28. Method according to claim 21 wherein some or all information included in the original image is retrieved from one or more databases via a global communications network such as the internet.

29. Method according to claim 21 wherein the original image comprises a portrait of a bearer selected from a customer database on the basis of information identifying said bearer.

30. An image incorporating a microstructure generated by a method according to claim 1 wherein the microstructure elements comprise information specific to a particular event, transaction, or person.

31. A security document comprising an image according to claim 30.

32. A computing system for synthesizing a security document, comprising:
   an interface operable for receiving a request for synthesizing the security document,
   a preparation software module operable for preparing data files according to document related information received with the request, where the preparation of data files comprises the generation of an original document image, the generation of microstructure shapes and the generation of transformation parameters, and
   a production software module operable for producing the security document, where producing the security document comprises an automatic synthesis of a dither matrix by applying mathematical morphology operators selected from the set of erosion and dilation operators to said microstructure shapes and further comprises rendering said a security document with said dither matrix, and where said microstructure shares comprises a visual motif selected from the set of typographic character, text, graphical element, symbol, logo, and ornament.

* * * * *